(12) United States Patent
Penilla et al.

(10) Patent No.: US 10,453,453 B2
(45) Date of Patent: Oct. 22, 2019

(54) METHODS AND VEHICLES FOR CAPTURING EMOTION OF A HUMAN DRIVER AND MODERATING VEHICLE RESPONSE

(71) Applicant: Emerging Automotive, LLC, Los Altos, CA (US)

(72) Inventors: Angel A. Penilla, Sacramento, CA (US); Albert S. Penilla, Sunnyvale, CA (US)

(73) Assignee: Emerging Automotive, LLC, Los Altos, CA (US)

( * ) Notice: Subject to any disclaimer, the term of this patent is extended or adjusted under 35 U.S.C. 154(b) by 63 days.

(21) Appl. No.: 15/787,677

(22) Filed: Oct. 18, 2017

(65) Prior Publication Data

US 2018/0061415 A1 Mar. 1, 2018

Related U.S. Application Data

(63) Continuation of application No. 15/470,881, filed on Mar. 27, 2017, which is a continuation of application
(Continued)

(51) Int. Cl.
*G10L 15/22* (2006.01)
*H04L 29/08* (2006.01)
(Continued)

(52) U.S. Cl.
CPC .......... *G10L 15/22* (2013.01); *B60R 16/0373* (2013.01); *G01C 21/3641* (2013.01);
(Continued)

(58) Field of Classification Search
CPC ...................................... G10L 15/22
(Continued)

(56) References Cited

U.S. PATENT DOCUMENTS 3,690,397 A 9/1972 Parker
3,799,063 A 3/1974 Reed
(Continued)

OTHER PUBLICATIONS

"Robust Recognition of Emotion from Speech," by Mohammed E. Hogue, from the Department of Electrical and Computer Engineering, The University of Memphis, published on 2006.
(Continued)

*Primary Examiner* — Susan I McFadden

(57) ABSTRACT

Methods and systems for determining an emotion of a human driver of a vehicle and using the emotion for generating a vehicle response, is provided. One example method includes capturing, by a camera of the vehicle, a face of the human driver. The capturing is configured to capture a plurality of images over a period of time, and the plurality of images are analyzed to identify a facial expression and changes in the facial expression of the human driver over the period of time. The method further includes capturing, by a microphone of the vehicle, voice input of the human driver. The voice input is captured over the period of time. The voice input is analyzed to identify a voice profile and changes in the voice profile of the human driver over the period of time. The method processes, by a processor of the vehicle, a combination of the facial expression and the voice profile captured during the period of time to predict the emotion of the human driver. The method generates the vehicle response that is responsive to the emotion of the human driver. The vehicle response is configured to make at least one adjustment to a setting of the vehicle. The adjustment is selected based on the emotion of the human driver. The vehicle response can be used to make the driver more calm and/or assist in reducing distracted driving. The prediction of the emotion may be additionally increased by capturing and analyzing touch and/or gesture characteristic
(Continued)

of the human driver when interfacing with a graphical user interface or surfaces of the vehicle or systems of the vehicle.

16 Claims, 45 Drawing Sheets

Related U.S. Application Data

No. 15/351,422, filed on Nov. 14, 2016, now Pat. No. 9,672,823, which is a continuation of application No. 14/949,883, filed on Nov. 24, 2015, now Pat. No. 9,493,130, and a continuation-in-part of application No. 14/275,569, filed on May 12, 2014, now Pat. No. 9,467,515, and a continuation-in-part of application No. 13/784,823, filed on Mar. 5, 2013, now Pat. No. 9,285,944, said application No. 14/949,883 is a continuation-in-part of application No. 13/842,158, filed on Mar. 15, 2013, now Pat. No. 9,229,905, said application No. 13/784,823 is a continuation-in-part of application No. 13/452,882, filed on Apr. 22, 2012, now Pat. No. 9,123,035.

(60) Provisional application No. 62/185,578, filed on Jun. 27, 2015, provisional application No. 62/254,858, filed on Nov. 13, 2015, provisional application No. 61/745,729, filed on Dec. 24, 2012, provisional application No. 61/478,436, filed on Apr. 22, 2011.

(51) Int. Cl.
| | |
|---|---|
| *G10L 25/63* | (2013.01) |
| *G10L 21/0208* | (2013.01) |
| *B60R 16/037* | (2006.01) |
| *G10L 15/30* | (2013.01) |
| *G01C 21/36* | (2006.01) |
| *G10L 15/00* | (2013.01) |
| *G10L 17/04* | (2013.01) |
| *G10L 17/06* | (2013.01) |
| *G10L 15/02* | (2006.01) |
| *G10L 25/84* | (2013.01) |
| *G06K 9/00* | (2006.01) |
| *G10L 15/06* | (2013.01) |
| *G10L 15/25* | (2013.01) |
| *G10L 25/45* | (2013.01) |
| *G10L 25/57* | (2013.01) |
| *G06F 3/01* | (2006.01) |
| *G10L 25/90* | (2013.01) |

(52) U.S. Cl.
CPC ..... *G06K 9/00302* (2013.01); *G06K 9/00845* (2013.01); *G10L 15/005* (2013.01); *G10L 15/02* (2013.01); *G10L 15/063* (2013.01); *G10L 15/25* (2013.01); *G10L 15/30* (2013.01); *G10L 17/04* (2013.01); *G10L 17/06* (2013.01); *G10L 21/0208* (2013.01); *G10L 25/45* (2013.01); *G10L 25/57* (2013.01); *G10L 25/63* (2013.01); *G10L 25/84* (2013.01); *H04L 67/1097* (2013.01); *H04L 67/12* (2013.01); *H04L 67/306* (2013.01); *G06F 3/013* (2013.01); *G06F 3/017* (2013.01); *G10L 25/90* (2013.01); *G10L 2015/223* (2013.01); *G10L 2015/227* (2013.01); *G10L 2015/228* (2013.01); *H04L 67/10* (2013.01)

(58) Field of Classification Search
USPC ....................................................... 704/275
See application file for complete search history.

(56) References Cited

U.S. PATENT DOCUMENTS

| | | |
|---|---|---|
| 3,867,682 A | 2/1975 | Ohya |
| 4,052,655 A | 10/1977 | Vizza |
| 4,102,273 A | 7/1978 | Merkle et al. |
| 4,132,174 A | 1/1979 | Ziegenfus et al. |
| 4,162,445 A | 7/1979 | Campbell |
| 4,309,644 A | 1/1982 | Reimers |
| 4,347,472 A | 8/1982 | Lemelson |
| 4,383,210 A | 5/1983 | Wilkinson |
| 4,389,608 A | 6/1983 | Dahl et al. |
| 4,405,891 A | 9/1983 | Galloway |
| 4,433,278 A | 2/1984 | Lowndes et al. |
| 4,450,400 A | 5/1984 | Gwyn |
| 4,532,418 A | 7/1985 | Meese |
| 4,789,047 A | 12/1988 | Knobloch |
| 4,815,840 A | 3/1989 | Benayad-Cherif et al. |
| 5,049,802 A | 9/1991 | Mintus et al. |
| 5,121,112 A | 6/1992 | Nakadozono |
| 5,132,666 A | 7/1992 | Fahs |
| 5,184,058 A | 2/1993 | Hesse |
| 5,202,617 A | 4/1993 | Nor |
| 5,297,664 A | 3/1994 | Tseng et al. |
| 5,306,999 A | 4/1994 | Hoffman |
| 5,315,227 A | 5/1994 | Pierson |
| 5,327,066 A | 7/1994 | Smith |
| 5,343,970 A | 9/1994 | Severinsky |
| 5,422,624 A | 6/1995 | Smith |
| 5,434,781 A | 7/1995 | Alofs |
| 5,441,122 A | 8/1995 | Yoshida |
| 5,449,995 A | 9/1995 | Kohchi |
| 5,487,002 A | 1/1996 | Diler et al. |
| 5,488,283 A | 1/1996 | Dougher et al. |
| 5,492,190 A | 2/1996 | Yoshida |
| 5,548,200 A | 8/1996 | Nor et al. |
| 5,549,443 A | 8/1996 | Hammerslag |
| 5,555,502 A | 9/1996 | Opel |
| 5,563,491 A | 10/1996 | Tseng |
| 5,585,205 A | 12/1996 | Kohchi |
| 5,594,318 A | 1/1997 | Knor |
| 5,595,271 A | 1/1997 | Tseng |
| 5,596,258 A | 1/1997 | Kimura et al. |
| 5,612,606 A | 3/1997 | Guimarin et al. |
| 5,627,752 A | 5/1997 | Buck et al. |
| 5,636,145 A | 6/1997 | Gorman et al. |
| 5,642,270 A | 6/1997 | Green et al. |
| 5,666,102 A | 9/1997 | Lahiff |
| 5,691,695 A | 11/1997 | Lahiff |
| 5,694,019 A | 12/1997 | Uchida et al. |
| 5,701,706 A | 12/1997 | Kreysler et al. |
| 5,736,833 A | 4/1998 | Farris |
| 5,760,569 A | 6/1998 | Chase, Jr. |
| 5,778,326 A | 7/1998 | Moroto et al. |
| 5,790,976 A | 8/1998 | Boll et al. |
| 5,892,598 A | 4/1999 | Asakawa et al. |
| 5,916,285 A | 6/1999 | Alofs et al. |
| 5,974,136 A | 10/1999 | Murai |
| 5,998,963 A | 12/1999 | Aarseth |
| 6,014,597 A | 1/2000 | Kochanneck |
| 6,049,745 A | 4/2000 | Douglas et al. |
| 6,067,008 A | 5/2000 | Smith |
| 6,081,205 A | 6/2000 | Williams |
| 6,085,131 A | 7/2000 | Kim |
| 6,151,539 A | 11/2000 | Bergholz et al. |
| 6,175,789 B1 | 1/2001 | Beckert et al. |
| 6,225,776 B1 | 5/2001 | Chai |
| 6,234,932 B1 | 5/2001 | Kuroda et al. |
| 6,236,333 B1 | 5/2001 | King |
| 6,252,380 B1 | 6/2001 | Koenck |
| 6,301,531 B1 | 10/2001 | Pierro |
| 6,307,349 B1 | 10/2001 | Koenck et al. |
| 6,330,497 B1 | 12/2001 | Obradovich et al. |
| 6,330,499 B1 | 12/2001 | Chou et al. |
| 6,370,475 B1 | 4/2002 | Breed et al. |
| 6,373,380 B1 | 4/2002 | Robertson et al. |
| 6,416,209 B1 | 7/2002 | Abbott |
| 6,434,465 B2 | 8/2002 | Schmitt et al. |

(56) References Cited

U.S. PATENT DOCUMENTS

| | | |
|---|---|---|
| 6,456,041 B1 | 9/2002 | Terada et al. |
| 6,466,658 B2 | 10/2002 | Schelberg, Jr. et al. |
| 6,480,767 B2 | 11/2002 | Yamaguchi |
| 6,487,477 B1 | 11/2002 | Woestmanm et al. |
| 6,498,454 B1 | 12/2002 | Pinlam |
| 6,511,192 B1 | 1/2003 | Henion |
| 6,586,866 B1 | 7/2003 | Ikedo |
| 6,614,204 B2 | 9/2003 | Pellegrino et al. |
| 6,629,024 B2 | 9/2003 | Tabata |
| 6,727,809 B1 | 4/2004 | Smith |
| 6,741,036 B1 | 5/2004 | Ikedo |
| 6,765,495 B1 | 7/2004 | Dunning et al. |
| 6,789,733 B2 | 9/2004 | Terranova |
| 6,794,849 B2 | 9/2004 | Mori et al. |
| 6,850,898 B1 | 2/2005 | Murakami |
| 6,915,869 B2 | 7/2005 | Botti |
| 6,922,629 B2 | 7/2005 | Yoshikawa et al. |
| 6,937,140 B1 | 8/2005 | Outslay |
| 6,940,254 B2 | 9/2005 | Nagamine |
| 7,013,205 B1 | 3/2006 | Hafner |
| 7,039,389 B2 | 5/2006 | Johnson, Jr. |
| 7,084,781 B2 | 8/2006 | Chuey |
| 7,201,384 B2 | 4/2007 | Chaney |
| 7,269,416 B2 | 9/2007 | Guthrie et al. |
| 7,289,611 B2 | 10/2007 | Iggulden |
| 7,376,497 B2 | 5/2008 | Chen |
| 7,379,541 B2 | 5/2008 | Iggulden et al. |
| 7,402,978 B2 | 7/2008 | Pryor |
| 7,532,965 B2 | 5/2009 | Robillard |
| 7,565,396 B2 | 7/2009 | Hoshina |
| 7,630,802 B2 | 12/2009 | Breed |
| 7,650,210 B2 | 1/2010 | Breed |
| 7,674,536 B2 | 3/2010 | Chipchase |
| 7,683,771 B1 | 3/2010 | Loeb |
| 7,693,609 B2 | 4/2010 | Kressner et al. |
| 7,698,078 B2 | 4/2010 | Kelty et al. |
| 7,740,092 B2 | 6/2010 | Bender |
| 7,751,945 B2 | 7/2010 | Obata |
| 7,778,746 B2 | 8/2010 | McLeod |
| 7,796,052 B2 | 9/2010 | Katz |
| 7,850,351 B2 | 12/2010 | Pastrick et al. |
| 7,869,576 B1 | 1/2011 | Rodkey et al. |
| 7,885,893 B2 | 2/2011 | Alexander |
| 7,949,435 B2 | 5/2011 | Pollack |
| 7,956,570 B2 | 6/2011 | Lowenthal |
| 7,979,198 B1 | 7/2011 | Kim et al. |
| 7,986,126 B1 | 7/2011 | Bucci |
| 7,991,665 B2 | 8/2011 | Hafner |
| 8,006,793 B2 | 8/2011 | Heichal et al. |
| 8,027,843 B2 | 9/2011 | Bodin et al. |
| 8,036,788 B2 | 10/2011 | Breed |
| 8,054,048 B2 | 11/2011 | Woody |
| 8,072,318 B2 | 12/2011 | Lynam |
| 8,103,391 B2 | 1/2012 | Ferro et al. |
| 8,256,553 B2 | 9/2012 | De Paschoal |
| 8,262,268 B2 | 9/2012 | Pastrick et al. |
| 8,265,816 B1 | 9/2012 | LaFrance |
| 8,266,075 B2 | 9/2012 | Ambrosio et al. |
| 8,294,420 B2 | 10/2012 | Kocher |
| 8,333,492 B2 | 12/2012 | Dingman et al. |
| 8,336,664 B2 | 12/2012 | Wallace et al. |
| 8,350,526 B2 | 1/2013 | Dyer et al. |
| 8,366,371 B2 | 2/2013 | Maniscalco et al. |
| 8,392,065 B2 | 3/2013 | Tolstedt |
| 8,405,347 B2 | 3/2013 | Gale |
| 8,482,255 B2 | 7/2013 | Crombez |
| 8,483,775 B2 | 7/2013 | Buck et al. |
| 8,483,907 B2 | 7/2013 | Tarte |
| 8,490,005 B2 | 7/2013 | Tarte |
| 8,508,188 B2 | 8/2013 | Murtha et al. |
| 8,521,599 B2 | 8/2013 | Rivers, Jr. et al. |
| 8,527,135 B2 | 9/2013 | Lowrey et al. |
| 8,527,146 B1 | 9/2013 | Jackson |
| 8,552,686 B2 | 10/2013 | Jung |
| 8,589,019 B2 | 11/2013 | Wallace et al. |
| 8,624,719 B2 | 1/2014 | Klose |
| 8,630,741 B1 | 1/2014 | Matsuoka et al. |
| 8,635,091 B2 | 1/2014 | Amigo |
| 8,643,329 B2 | 2/2014 | Prosser et al. |
| 8,660,734 B2 | 2/2014 | Zhu et al. |
| 8,686,864 B2 | 4/2014 | Hannon |
| 8,694,328 B2 | 4/2014 | Gormley |
| 8,706,394 B2 | 4/2014 | Trepagnier et al. |
| 8,713,121 B1 | 4/2014 | Bain |
| 8,717,170 B1 | 5/2014 | Juhasz |
| 8,725,551 B2 | 5/2014 | Ambrosio et al. |
| 8,751,065 B1 | 6/2014 | Kato |
| 8,751,271 B2 | 6/2014 | Stefik et al. |
| 8,760,432 B2 | 6/2014 | Jira et al. |
| 8,799,037 B2 | 8/2014 | Stefik et al. |
| 8,816,845 B2 | 8/2014 | Hoover et al. |
| 8,818,622 B2 | 8/2014 | Bergholz et al. |
| 8,818,725 B2 | 8/2014 | Ricci |
| 8,819,414 B2 | 8/2014 | Bellur et al. |
| 8,825,222 B2 | 9/2014 | Namburu et al. |
| 8,836,281 B2 | 9/2014 | Ambrosio et al. |
| 9,493,130 B2 * | 11/2016 | Penilla .............. H04L 67/12 |
| 9,672,823 B2 * | 6/2017 | Penilla .............. H04L 67/12 |
| 10,170,111 B2 * | 1/2019 | Puranik .............. G10L 15/22 |
| 2002/0064258 A1 | 5/2002 | Schelberg et al. |
| 2002/0085043 A1 | 7/2002 | Ribak |
| 2002/0133273 A1 | 9/2002 | Lowrey et al. |
| 2003/0137277 A1 | 7/2003 | Mori et al. |
| 2003/0153278 A1 | 8/2003 | Johnson |
| 2003/0205619 A1 | 11/2003 | Terranova et al. |
| 2003/0234325 A1 | 12/2003 | Marino et al. |
| 2004/0046506 A1 | 3/2004 | Mawai et al. |
| 2004/0064235 A1 | 4/2004 | Cole |
| 2004/0092253 A1 | 5/2004 | Simonds et al. |
| 2004/0093155 A1 | 5/2004 | Simonds et al. |
| 2004/0265671 A1 | 12/2004 | Chipchase et al. |
| 2005/0021190 A1 | 1/2005 | Worrell et al. |
| 2005/0044245 A1 | 2/2005 | Hoshina |
| 2005/0231119 A1 | 10/2005 | Ito et al. |
| 2006/0125620 A1 | 6/2006 | Smith et al. |
| 2006/0182241 A1 | 8/2006 | Schelberg et al. |
| 2006/0282381 A1 | 12/2006 | Ritchie |
| 2006/0287783 A1 | 12/2006 | Walker |
| 2007/0068714 A1 | 3/2007 | Bender |
| 2007/0126395 A1 | 6/2007 | Suchar |
| 2007/0282495 A1 | 12/2007 | Kempton |
| 2008/0039979 A1 | 2/2008 | Bridges et al. |
| 2008/0039989 A1 | 2/2008 | Pollack et al. |
| 2008/0040129 A1 | 2/2008 | Cauwels et al. |
| 2008/0040223 A1 | 2/2008 | Bridges et al. |
| 2008/0040295 A1 | 2/2008 | Kaplan |
| 2008/0052145 A1 | 2/2008 | Kaplan et al. |
| 2008/0086411 A1 | 4/2008 | Olson et al. |
| 2008/0097904 A1 | 4/2008 | Volchek |
| 2008/0155008 A1 | 6/2008 | Stiles et al. |
| 2008/0180027 A1 | 7/2008 | Matsushita et al. |
| 2008/0203973 A1 | 8/2008 | Gale et al. |
| 2008/0228613 A1 | 9/2008 | Alexander |
| 2008/0281663 A1 | 11/2008 | Hakim |
| 2008/0294283 A1 | 11/2008 | Ligrano |
| 2008/0312782 A1 | 12/2008 | Berdichevsky |
| 2009/0011639 A1 | 1/2009 | Ballard et al. |
| 2009/0021213 A1 | 1/2009 | Johnson |
| 2009/0021385 A1 | 1/2009 | Kelty et al. |
| 2009/0030712 A1 | 1/2009 | Bogolea |
| 2009/0043519 A1 | 2/2009 | Bridges et al. |
| 2009/0058355 A1 | 3/2009 | Meyer |
| 2009/0066287 A1 | 3/2009 | Pollack et al. |
| 2009/0076913 A1 | 3/2009 | Morgan |
| 2009/0082957 A1 | 3/2009 | Agassi et al. |
| 2009/0091291 A1 | 4/2009 | Woody et al. |
| 2009/0092864 A1 | 4/2009 | McLean |
| 2009/0144001 A1 | 6/2009 | Leonard et al. |
| 2009/0157289 A1 | 6/2009 | Graessley |
| 2009/0164473 A1 | 6/2009 | Bauer |
| 2009/0174365 A1 | 7/2009 | Lowenthal et al. |
| 2009/0177580 A1 | 7/2009 | Lowenthal et al. |
| 2009/0210357 A1 | 8/2009 | Pudar et al. |
| 2009/0287578 A1 | 11/2009 | Paluszek |

(56) References Cited

U.S. PATENT DOCUMENTS

| | | |
|---|---|---|
| 2009/0312903 A1 | 12/2009 | Hafner et al. |
| 2009/0313032 A1 | 12/2009 | Hafner et al. |
| 2009/0313033 A1 | 12/2009 | Hafner et al. |
| 2009/0313034 A1 | 12/2009 | Ferro et al. |
| 2009/0313098 A1 | 12/2009 | Hafner et al. |
| 2009/0313104 A1 | 12/2009 | Hafner et al. |
| 2009/0313174 A1 | 12/2009 | Hafner et al. |
| 2010/0013434 A1 | 1/2010 | Taylor-Haw et al. |
| 2010/0017045 A1 | 1/2010 | Nesler et al. |
| 2010/0017249 A1 | 1/2010 | Fincham et al. |
| 2010/0049396 A1 | 2/2010 | Ferro et al. |
| 2010/0049533 A1 | 2/2010 | Ferro et al. |
| 2010/0049610 A1 | 2/2010 | Ambrosio et al. |
| 2010/0049639 A1 | 2/2010 | Ferro et al. |
| 2010/0049737 A1 | 2/2010 | Ambrosio et al. |
| 2010/0057306 A1 | 3/2010 | Ishii et al. |
| 2010/0112843 A1 | 5/2010 | Heichai et al. |
| 2010/0141206 A1 | 6/2010 | Agassi et al. |
| 2010/0161481 A1 | 6/2010 | Littrell |
| 2010/0161482 A1 | 6/2010 | Littrell |
| 2010/0169008 A1 | 7/2010 | Niwa et al. |
| 2010/0198508 A1 | 8/2010 | Tang |
| 2010/0198513 A1 | 8/2010 | Zeng |
| 2010/0211340 A1 | 8/2010 | Lowenthal et al. |
| 2010/0211643 A1 | 8/2010 | Lowenthal et al. |
| 2010/0222939 A1 | 9/2010 | Namburu |
| 2010/0268426 A1 | 10/2010 | Pathak |
| 2010/0280956 A1 | 11/2010 | Chutorash et al. |
| 2010/0304349 A1 | 12/2010 | Kunin |
| 2011/0032110 A1 | 2/2011 | Taguchi |
| 2011/0074350 A1 | 3/2011 | Kocher |
| 2011/0074351 A1 | 3/2011 | Bianco et al. |
| 2011/0077809 A1 | 3/2011 | Leary |
| 2011/0106329 A1 | 5/2011 | Donnelly et al. |
| 2011/0112969 A1 | 5/2011 | Zaid et al. |
| 2011/0130885 A1 | 6/2011 | Bowen et al. |
| 2011/0187521 A1 | 8/2011 | Beruscha et al. |
| 2011/0191265 A1 | 8/2011 | Lowenthal et al. |
| 2011/0193522 A1 | 8/2011 | Uesugi |
| 2011/0202218 A1 | 8/2011 | Yano |
| 2011/0246252 A1 | 10/2011 | Uesugi |
| 2011/0279083 A1 | 11/2011 | Asai |
| 2011/0309929 A1 | 12/2011 | Myers |
| 2012/0013300 A1 | 1/2012 | Prosser et al. |
| 2012/0019204 A1 | 1/2012 | Matsuo |
| 2012/0025765 A1 | 2/2012 | Frey et al. |
| 2012/0028680 A1 | 2/2012 | Breed |
| 2012/0041624 A1 | 2/2012 | Stewart et al. |
| 2012/0053754 A1 | 3/2012 | Pease |
| 2012/0074903 A1 | 3/2012 | nakashima |
| 2012/0105197 A1 | 5/2012 | Kobres |
| 2012/0123670 A1 | 5/2012 | Uyeki |
| 2012/0136743 A1 | 5/2012 | McQuade et al. |
| 2012/0136802 A1 | 5/2012 | McQuade et al. |
| 2012/0158244 A1 | 6/2012 | Talty et al. |
| 2012/0179323 A1 | 7/2012 | Profitt-Brown et al. |
| 2012/0218128 A1 | 8/2012 | Tieman et al. |
| 2012/0229056 A1 | 9/2012 | Bergfjord |
| 2012/0229085 A1 | 9/2012 | Lau |
| 2012/0232965 A1 | 9/2012 | Rodriguez et al. |
| 2012/0233077 A1 | 9/2012 | Tate et al. |
| 2012/0262002 A1 | 10/2012 | Widmer et al. |
| 2012/0268068 A1 | 10/2012 | Jung et al. |
| 2012/0268076 A1 | 10/2012 | Danner |
| 2012/0268242 A1 | 10/2012 | Tieman et al. |
| 2012/0280654 A1 | 11/2012 | Kim |
| 2012/0296512 A1 | 11/2012 | Lee et al. |
| 2012/0303397 A1 | 11/2012 | Prosser |
| 2012/0306445 A1 | 12/2012 | Park et al. |
| 2012/0310713 A1 | 12/2012 | Mercuri et al. |
| 2012/0316671 A1 | 12/2012 | Hammerslag et al. |
| 2013/0002876 A1 | 1/2013 | Pastrick et al. |
| 2013/0020139 A1 | 1/2013 | Kim et al. |
| 2013/0021162 A1 | 1/2013 | DeBoer et al. |
| 2013/0037339 A1 | 2/2013 | Hickox |
| 2013/0099892 A1 | 4/2013 | Tucker et al. |
| 2013/0103236 A1 | 4/2013 | Mehrgan |
| 2013/0110296 A1 | 5/2013 | Khoo et al. |
| 2013/0110632 A1 | 5/2013 | Theurer et al. |
| 2013/0110653 A1 | 5/2013 | Rivers et al. |
| 2013/0127247 A1 | 5/2013 | Oh et al. |
| 2013/0135093 A1 | 5/2013 | Araki |
| 2013/0144520 A1 | 6/2013 | Ricci |
| 2013/0145065 A1 | 6/2013 | Ricci |
| 2013/0179057 A1 | 7/2013 | Fisher et al. |
| 2013/0204466 A1 | 8/2013 | Ricci |
| 2013/0241720 A1 | 9/2013 | Ricci et al. |
| 2013/0253746 A1 | 9/2013 | Choi et al. |
| 2013/0280018 A1 | 10/2013 | Meirer et al. |
| 2013/0300554 A1 | 11/2013 | Braden |
| 2013/0317693 A1 | 11/2013 | Jefferies et al. |
| 2013/0317694 A1 | 11/2013 | Merg et al. |
| 2013/0328387 A1 | 12/2013 | Venkateswaran |
| 2013/0338820 A1 | 12/2013 | Corbett et al. |
| 2013/0342363 A1 | 12/2013 | Paek et al. |
| 2014/0002015 A1 | 1/2014 | Tripathi et al. |
| 2014/0019280 A1 | 1/2014 | Medeiros et al. |
| 2014/0021908 A1 | 1/2014 | McCool |
| 2014/0042968 A1 | 2/2014 | hiroe |
| 2014/0047107 A1 | 2/2014 | Maturana et al. |
| 2014/0066049 A1 | 3/2014 | Cho et al. |
| 2014/0089016 A1 | 3/2014 | Smullin et al. |
| 2014/0106726 A1 | 4/2014 | Crosbie |
| 2014/0118107 A1 | 5/2014 | Almomani |
| 2014/0120829 A1 | 5/2014 | Bhamidipati |
| 2014/0125355 A1 | 5/2014 | Grant |
| 2014/0142783 A1 | 5/2014 | Grimm et al. |
| 2014/0163771 A1 | 6/2014 | Demeniuk |
| 2014/0163774 A1 | 6/2014 | Demeniuk |
| 2014/0164559 A1 | 6/2014 | Demeniuk |
| 2014/0172192 A1 | 6/2014 | Kato |
| 2014/0172265 A1 | 6/2014 | Funabashi |
| 2014/0172727 A1 | 6/2014 | Abhyanker et al. |
| 2014/0179353 A1 | 6/2014 | Simon |
| 2014/0200742 A1 | 7/2014 | Mauti et al. |
| 2014/0203077 A1 | 7/2014 | Gadh et al. |
| 2014/0207333 A1 | 7/2014 | Vandivier et al. |
| 2014/0214261 A1 | 7/2014 | Ramamoorthy et al. |
| 2014/0214321 A1 | 7/2014 | Kawamata et al. |
| 2014/0218189 A1 | 8/2014 | Fleming et al. |
| 2014/0232331 A1 | 8/2014 | Stamenic et al. |
| 2014/0236414 A1 | 8/2014 | Droz et al. |
| 2014/0236463 A1 | 8/2014 | Zhang et al. |
| 2014/0253018 A1 | 9/2014 | Kong et al. |
| 2014/0277936 A1 | 9/2014 | El Dokor et al. |
| 2014/0278089 A1 | 9/2014 | Gusikhin et al. |
| 2014/0300739 A1 | 10/2014 | Mimar |

OTHER PUBLICATIONS

"Emotion Recognition from Facial Expressions using Multilevel HMM" by Ira Cohen, et al., published by The University of Illinois at Urbana-Champaign, published in the year 2000.

"Human Emotion Recognition System," by Dilbag Singh, from the Computer Science and Engineering Dept. Guru Nanak Dev University Amritsar (Punjab) India, published in I.J. Image, Graphics and Signaling Processing, 2012, 8, 50-56.

"Detecting Emotions in Conversations Between Driver and In-Car Information Systems," by Christian M. Jones, et al. School of Mathematical and Computer Sciences, Heriot-Watt University, Edinburgh, UK, and Department of Communications, Sanford University, CA, 2005.

"Recognizing emotion in speech using neural networks", by Keshi Dai, et al., from College of Computer and Information Science, Northeastern University, Boston, MA, published by Telehealth/AT '08 Proceedings of the IASTED International Conference on Telehealth/Assistive Technologies, 2008, pp. 31-36.

"Speech Emotion Recognition Using Deep Neural Network and Extreme Learning Machine" by Kun Han et al., Department of Computer Science and Engineering, The Ohio State University, Columbus, OH, and Microsoft Research, published by Interspeech 2014.

(56) References Cited

OTHER PUBLICATIONS

"Emotion and Gender Recognition of Speech Signals Using SVM" by S. Sravan Kumar et al., published in the International Journal of Engineering Science and Innovative Technology, vol. 4, Issue 3, May 2015.

\* cited by examiner

Manufacturer API    130
Class:
HVAC

950

954 — Data declarations:
currentTempLeft = 60
currentTempRight = 70
StatusAC = True
isAuto = True
isDual = True
displaySkin = modern
scheduleAMtemp(time)
learnedTemp1 = 74
learnedTemp1Time = 803am
learnedTemp1Days = MTWTHF
learnedTemp2 = 60
learnedTemp2Time = 513pm
learnedTemp2Days = MTWTHF
learnedTemp2AC = on
IcePresent = false
fastefrostMode = off
Errors = false 956 — Function Declarations
updateTemp(left,right);
getTempRight(temp);
getTempLeft(temp);
setTempLeft(temp);
setTempLeft(temp);
toggleAC();
toggleAuto();
toggleDual();
toggleSkin(skinID);
scheduleAMTemp(temp, time, date, frequency);
schedulePMTemp(temp,time,date,frequency);
learnTempBackgroundRoutine(temp, time, date, frequency);
updateDisplay()

FIG. 9B

104 — EZ FUN HVAC APP

972 — updateTemp(80,76);
{
    setLeftTo = 80;
    setRightTo = 76;
    theCurrentTempR = getTempRight(temp);
    theCurrenTempL = getTempLeft(temp);
    if setLeftTo != theCurrentTempL
    {
        setTempLeft(left);
    }
    if setRightTo != theCurrentTempR
    {
        setTempRight(right);
    }
    updateDisplay()

If isError()
    {
        return isError();
    }

Vehicle dash interaction styles and screens

| | FACTORY | | SENIOR MODE | | FUN MODE | |
|---|---|---|---|---|---|---|
| CLIMATE | Vent | Seat Temp. HEAT 1 2 3 COOL 1 2 3 | Vent OPEN CLOSED | Vent Position FACE DEFROST FEET | Vent It's hot! Less air! Close it! | Vent Position Defog!! FACE please On my feat! |
| | | | Seat Temp. Warm Warmer Cool Cooler | Seat Position Seat up Seat down Seat Incline Seat Decline | Seat Temp. Luke warm Toasty Cool me! IM HOT! | Seat Position Sport pos. Relax Pos. Road Trip |
| SEATS | Seat Position | | | | | |
| WINDOWS | Window Position FL RL | Window Position FR RR | Window Position Driver UP DN Rear Left UP DN | Window Position Passenger UP DN Rear Right UP DN | Window Position Driver Fresh Air! \| Close it! Rear Left Fresh Air! \| Close it! | Window Position Passenger Fresh Air! \| Close it! Rear Rear Fresh Air! \| Close it! |
| LATCHES | Hood | Gas Tank | Trunk | Hood UNLOCK LOCK | Gas Tank UNLOCK LOCK | Trunk UNLOCK LOCK | Hood | Gas Tank | Trunk |

*TEXT CAN CHANGE with LANGUAGE SELECTION

FIG. 32

Touch Characteristics (TC)
Touch Accuracy: Medium
Touch Duration: Short
Touch Intensity: medium
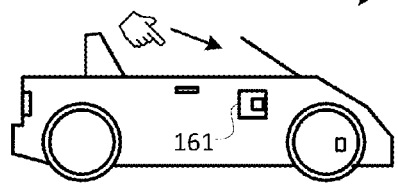
Session 1
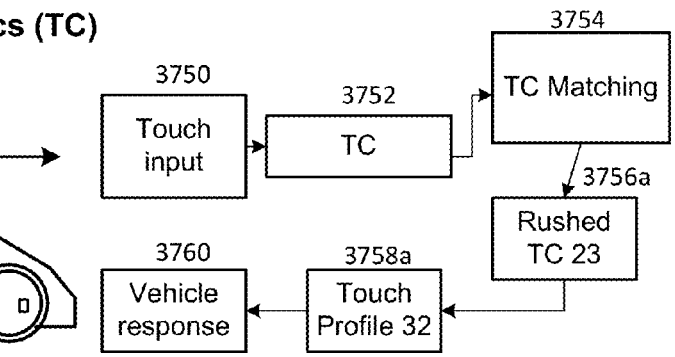
Touch Accuracy: Low
Touch Duration: Short
Touch Intensity: High
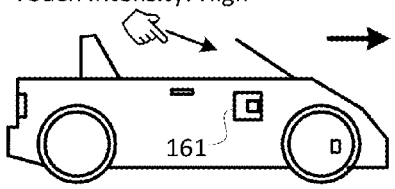
Session 2
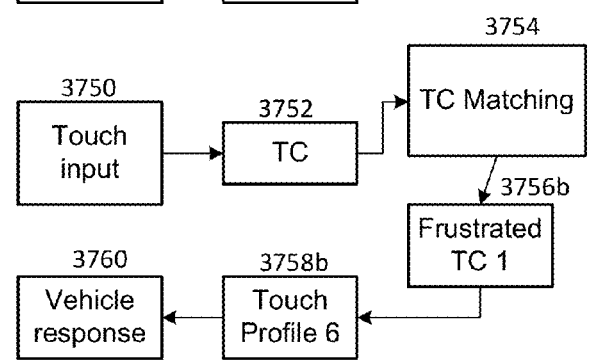
Touch Accuracy: High
Touch Duration: Medium
Touch Intensity: Medium
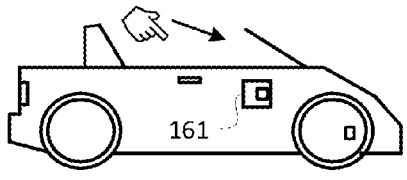
Session 3
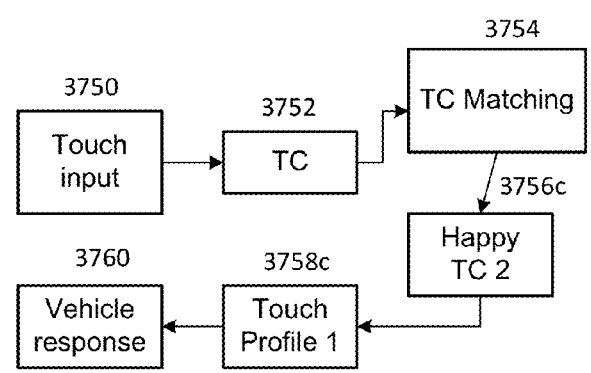
Touch Accuracy: High
Touch Duration: Long
Touch Intensity: High
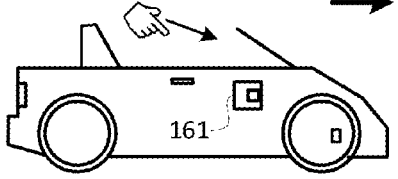
Session 4
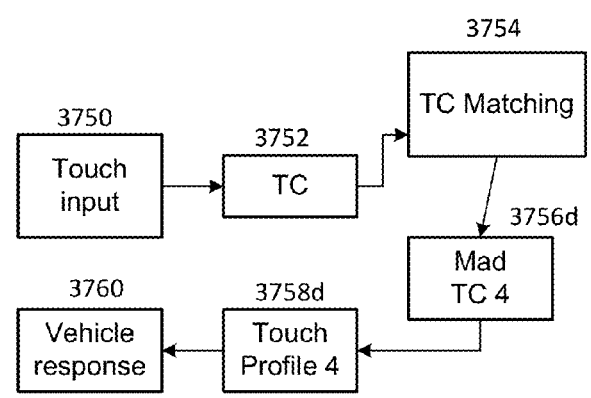
FIG. 37

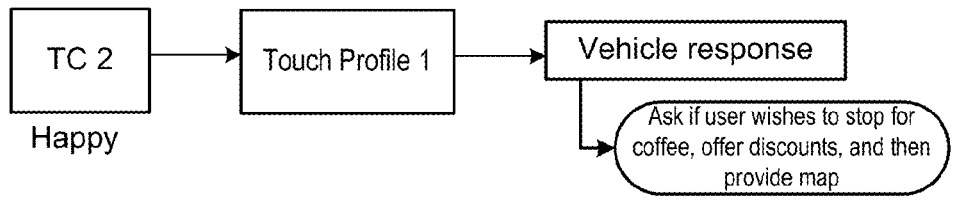
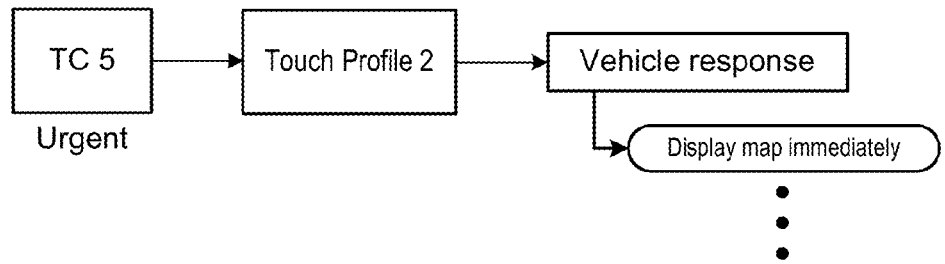
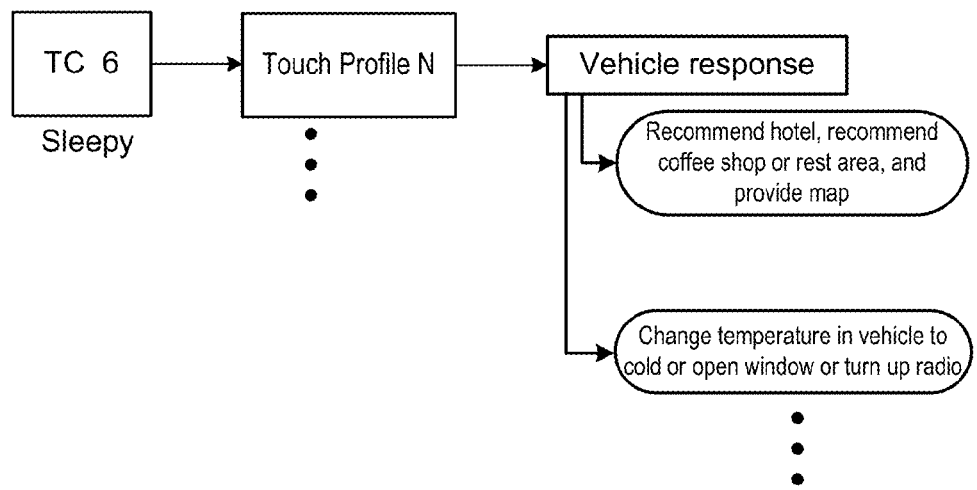
FIG. 39

METHODS AND VEHICLES FOR CAPTURING EMOTION OF A HUMAN DRIVER AND MODERATING VEHICLE RESPONSE

CLAIM OF PRIORITY

This application claims priority as a continuation from U.S. application Ser. No. 15/470,881, filed on Mar. 27, 2017, entitled "Methods and Vehicles for using Determined Mood of a Human Driver and Moderating Vehicle Response," which is a continuation of U.S. application Ser. No. 15/351, 422, filed on Nov. 14, 2016, (U.S. Pat. No. 9,672,823, issued on Jun. 6, 2017) entitled "Methods and Vehicles for Processing Voice Input and use of Tone/Mood in Voice Input to Select Vehicle Response," which is a continuation of U.S. application Ser. No. 14/949,883, filed on Nov. 24, 2015, (U.S. Pat. No. 9,493,130, issued on Nov. 15, 2016) entitled "Methods and Systems for Communicating Content to Connected Vehicle Users Based Detected Tone/Mood in Voice Input," which claims priority from U.S. Provisional Patent Application Numbers 62,185,578, filed on Jun. 27, 2015, entitled "Methods and Systems for Communicating Content to Connected Vehicle Users Based Detected Tone/Mood in Voice Input," and 62/254,858, filed on Nov. 13, 2015, entitled "Methods and Systems for Communicating Content to Connected Vehicle Users Based Detected Tone/Mood in Voice Input," which are incorporated herein.

U.S. application Ser. No. 14/949,883, filed on Nov. 24, 2015 is a continuation-in-part of application Ser. No. 14/275,569, filed on May 12, 2014 (U.S. Pat. No. 9,467,515, issued on Oct. 11, 2016) entitled "Methods and Systems for Sending Contextual Content to Connected Vehicles and Configurable Interaction Modes for Vehicle Interfaces," which is herein incorporated by reference.

U.S. application Ser. No. 14/949,883, filed on Nov. 24, 2015 is a continuation-in-part application of U.S. application Ser. No. 13/784,823, filed on Mar. 5, 2013 (U.S. Pat. No. 9,285,944, issued on Mar. 15, 2016) entitled "Methods and Systems for Defining Custom Vehicle User Interface Configurations and Cloud Services for Managing Applications for the User Interface and Learning Setting Functions," which claims priority to U.S. Provisional Patent Application No. 61/745,729, filed on Dec. 24, 2012, and entitled "Methods and Systems For Electric Vehicle (EV) Charging, Charging Systems, Internet Applications and User Notifications," and which are herein incorporated by reference.

U.S. application Ser. No. 14/949,883, filed on Nov. 24, 2015 is also a continuation-in-part of U.S. application Ser. No. 13/842,158, filed on Mar. 15, 2013 (U.S. Pat. No. 9,229,905, issued on Jan. 5, 2016) and entitled "Methods and Systems for Defining Vehicle User Profiles and Managing User Profiles via Cloud Systems and Applying Learned Settings to User Profiles," which is herein incorporated by reference.

U.S. application Ser. No. 13/784,823, filed on Mar. 5, 2013 is a continuation-in-part of U.S. application Ser. No. 13/452,882, filed Apr. 22, 2012 (U.S. Pat. No. 9,123,035, issued on Sep. 1, 2015) and entitled "Electric Vehicle (EV) Range Extending Charge Systems, Distributed Networks Of Charge Kiosks, And Charge Locating Mobile Apps," which claims priority to U.S. Provisional Application No. 61/478, 436, filed on Apr. 22, 2011, all of which are incorporated herein by reference.

FIELD OF THE EMBODIMENTS

The present invention relates to systems and methods for customizing vehicle response to user/driver voice input, and methods for processing voice input to detect tone and/or mood of user, and providing a vehicle response customized for the detected tone and/or mood of the user, and systems for exchanging information with cloud-based processing systems.

BACKGROUND

Vehicles, such as motorized vehicles and electric vehicles have been around for some time. Vehicles provide a way that enable humans to drive from place to place. In today's world, vehicles have become an indispensable mode of transportation, and provide the freedom to travel at any time of day and for various distances. Vehicles can be publically operated or can be privately owned. Humans most commonly operate vehicles, no matter the type, whether electric or combustion engine based. In recent years, technology has been advancing to allow for better wireless interfacing and networking with vehicles.

It is in this context that embodiments of the invention arise.

SUMMARY

The methods, systems and apparatus are provided, which include processing systems for executing vehicle responses to voice input. In various configurations, a user's tone of voice is analyzed to determine matches in predefined tones. The tones, in some embodiments, are matched to voice profiles that determine or correlate to a selected vehicle response. The vehicle response to voice input can include, for example, making a setting, finding a map, finding directions, setting entertainment functions, looking up information, selecting a communication tool, making a call, sending a message, looking up a contact, looking up a calendar event, performing an Internet search, controlling a system of the vehicle, etc.

Broadly speaking, the processing defined herein enables the vehicle response to be tailored to respond to the user's voice input in a way that respects or understands the user's possible mood or possible state of mind. For example, if the user's tone implies that the user is rushed, the system (e.g., vehicle electronics, software, cloud processing, and/or user connected devices) will process that tone in the voice and will provide a vehicle response in a more expedited manner, or without further queries. If the tone implies that the user is relaxed, the system may provide supplemental information in addition to responding to the voice input. For example, if the user asks for a dining spot near a park, the system may also recommend nearby coffee shops, discounts for parking, nearby valet parking, and/or promotions. However, if the user appears stressed or rushed, the supplemental information may be omitted and a response can be quick and to the point. In some embodiments, in addition to detecting a user's tone and/or detecting user mood, the system can identify a geo-location context and an environmental context. These additional contextual data points can be used to provide further customized vehicle response and/or recommendations to the user of the vehicle (i.e., driver and/or passengers).

In one embodiment, a method for determining a mood of a human driver of a vehicle and using the mood for generating a vehicle response is provided. One example method includes capturing, by a camera of the vehicle, a face of the human driver. The capturing is configured to capture a plurality of images over a period of time, and the plurality of images are analyzed to identify a facial expression and changes in the facial expression of the human driver over the period of time. The method further includes capturing, by a microphone of the vehicle, voice input of the human driver. The voice input is captured over the period of time. The voice input is analyzed to identify a voice profile and changes in the voice profile of the human driver over the period of time. The method processes, by a processor of the vehicle, a combination of the facial expression and the voice profile captured during the period of time to predict the mood of the human driver. The method generates the vehicle response that is responsive to the mood of the human driver. The vehicle response is configured to make at least one adjustment to a setting of the vehicle. The adjustment is selected based on the mood of the human driver. The vehicle response can be used to make the driver more calm and/or assist in reducing distracted driving.

In one embodiment, a method for processing voice inputs at a vehicle is provided. The method includes determining a profile for a user of the vehicle using electronics of the vehicle. The profile is part of a user account and the vehicle is provided with wireless communication circuitry for accessing a server over a network for exchanging information regarding the vehicle, use of the vehicle and use of the profile. The method includes receiving via a microphone of the vehicle a voice command from the user of the vehicle. The electronics of the vehicle processing the voice command to enable a two-way conversation exchange between the user and the vehicle. The method acts to access, by electronics of the vehicle, data for learned behavior of the user. The learned behavior is associated to the profile for the user. The method processes the voice command to identify a type command. The type of command is one of an instruction to make a change to a setting associated with the vehicle or a request for interfacing with a remote service over the network. The method includes identifying a vehicle response for implementing the type of command identified for the voice command and processing, by the electronics of the vehicle, the vehicle response. The vehicle response is moderated based at least in part on the learned behavior of the user.

In one embodiment, a vehicle having an on-board computer for processing voice input is provided. The vehicle has a microphone interfaced with the on-board computer and memory for storing a sample of audio data received from the microphone. The audio data is a voice input directed to the vehicle. A processor of the on-board computer is configured to process the sample of audio data to identify markers in frequency and/or magnitude. The markers are used to define an audio signature for the voice input, and the audio signature is used to identify a voice profile. The voice profile is used to identify a vehicle response for the voice input, and the voice profile is associated with tone of voice used in the voice input. The vehicle response acts to direct a vehicle system function to take an action based on the voice input and the vehicle response is adjusted based on the tone of voice. The tones of voice are associated to inferred moods of the user which include one or more of a normal mood, a frustrated mood, an agitated mood, an upset mood, a hurried mood, an urgency mood, a rushed mood, a stressed mood, a calm mood, a passive mood, a sleepy mood, a happy mood, or an excited mood, or combinations of two or more thereof. The action to be taken is based on the voice input and is one of a command to input a setting of the vehicle, a command requesting information, a request to access data, a request to communicate, or a combination thereof.

In one embodiment, a method for processing voice inputs at a vehicle is provided. The method includes sending, to a cloud processing server, data from the vehicle. The vehicle includes an on-board computer for processing instructions for the vehicle and processing wireless communication to exchange data with the cloud processing server. The method enables receiving, at the vehicle, data for a user account to use the vehicle. The cloud processing server uses the user account to identify a user profile of a user. The method further enables receiving, from the cloud processing server, voice profiles for the user profile. Each voice profile is associated with a tone identifier. The voice profiles for the user are learned from a plurality of voice inputs made to the vehicle by the user in one or more prior sessions of use of the vehicle. The method receives, by on-board computer, a voice input, for the voice input and processes, by on-board computer, the voice input to identify a voice profile for the voice input. The vehicle response is then generated for the voice input. The vehicle response is selected based on the tone identifier of the identified voice profile.

In some embodiments, the tone identifiers identify a mood of the user. In some embodiments, the mood of the user includes one or more of a normal mood, a frustrated mood, an agitated mood, an upset mood, a hurried mood, an urgency mood, a rushed mood, a stressed mood, a calm mood, a passive mood, a sleepy mood, a happy mood, an excited mood, or combinations of two or more thereof.

In some embodiments, the tone identifiers identify a dialect of the user.

In one embodiment, a tone identifier is descriptive or representative of an actual tone of voice used by the user when making a voice input to a vehicle's voice control interface, which includes at least one microphone used to capture the user's voice. The microphone may be integrated into the vehicle, e.g., near the steering wheel, dash, visor, a seat, etc., and can be connected to electronics of the vehicle. In one embodiment, the voice input is processed to capture an audio sample of the voice input. The audio sample may be the entire command, part of the command, or multiple commands, statements, one or more spoken words, verbal sounds, verbal gestures, grunts, moans, yells, expletives, and/or courteous statements words or the like. In general, the audio sample will include some audible sound that can be captured. The audio sample, in this example, refers to an amount of audio to cache or save to perform the analysis.

Once captured, the analysis can include frequency sampling. For instance, in one embodiment, the voice input can be in the transmitted voice frequency of about 300-3400 Hz, and the sampling frequency is about 8 kHz. In some embodiments, the transmitted bandwidth frequency can be in the range of 50-7000 Hz, and the sampling frequency can be about 16 kHz, and in other embodiments, the transmitted bandwidth frequency can be in the range of 20-20,000 Hz, and the sampling frequency can be in the range of about 44.1 kHz. For most voice inputs, the sampling frequency is typically about 8 kHz.

Optionally, the captured audio sample can be processed to remove noise, such as ambient noise, voice noise of other passengers, music playing in the vehicle, tapping noises, road noise, wind noise, etc. The audio sample is then processed to produce an audio signature. The audio signature may be in the form of an analog signal or digital code. The audio signature may identify certain frequencies in the spoken words, audio modulations, frequency peaks, peak-to-peak identifiable patterns, spikes, pauses, or other characteristics that can identify or distinguish when one spoken word, e.g., command, is said to have a particular tone. In some embodiments, in addition to voice input, other sensors can detect the magnitude of sensed touch inputs, physiological characterizes of the user's body, motions, demeaned, and combinations thereof.

By way of example, when a user says, "find me a hotel", that statement can be said in a normal voice, e.g., if the driver is not tired. If the driver is tired or sleepy, the user may voice these words at a slower pace, or with less emphasis on different words. The tone of voice is thus viewed as a tone identifier. The tone identifier, in one configuration, can be identified from the audio signature produced from the voice input. The audio signature can then be used to identify a type of vehicle response that is most appropriate for the tone in which the voice input is made. As described below, depending on the tone used to provide the voice input, different types of vehicle response can be made for the same grammatical input. In some cases, the vehicle response can be expedited to avoid delay. In some cases, the vehicle response can include additional information, e.g., recommendations, extra information, advertisements, etc.

In some embodiments, the dialect of the user includes one or more of a language dialect, a country dialect, a geographic region dialect, an age dialect, or combinations of two or more thereof.

In some embodiments, the user account is accessed by receiving login data at the vehicle.

In some embodiments, the login data includes one or more of a password, a wireless login code, a biometric identifier, a gesture, a pairing between a device of the user and logic of the on-board computer.

In some embodiments, the on-board computer is configured select the vehicle response from among a plurality of alternate vehicle response for the voice input and associated tone identifier.

In some embodiments, the voice profiles and associated tone identifiers are stored in storage of the cloud processing server and a copy of the voice profiles and associated tone identifiers is stored in storage of the vehicle.

In another embodiment, a method to be executed by a processor of a computer of a vehicle is provided. The method includes receiving voice input of a user at the vehicle to command input or request information from a voice input interface of the vehicle. The method further includes analyzing the voice input of the user to identify a tone of the voice input. The method then functions to identify a voice profile of the user for the identified tone. The voice profile is used to select a vehicle response that is moderated for the tone of the voice input.

In some embodiments, the voice profile identifies a type of vehicle response that is customized for the user, based on the identified tone in the voice input by the user.

In some embodiments, a plurality of voice profiles are associated with the user, each voice profile identifies a preferred vehicle response for the user based on the tone.

In some embodiments, a method can include receiving the voice input, sampling the received voice input and then identifying a frequency and magnitude in the voice sample. The frequency and magnitude identifying markers in the voice input. The method includes identifying a tone that best matches the identified markers. The tone that best matches the identified markers is for the user. The method also includes identifying a voice profile for the identified tone. The voice profile is used to select a type of vehicle response. The vehicle response includes one of an input to the vehicle or a system input, or a response requested from the vehicle or setting to be set by the vehicle.

In some embodiments, the identifying the tone identifies when additional information is to be provided or not provided to the user based on the tone.

In some embodiments, the additional information includes advertising data, or discount data, or related information that is in addition to the requested information or instructed command found in the voice input.

In some embodiments, the voice profile use based on the tone assists in moderating when to provide additional information to the user or when to avoid providing additional information to the user.

In some embodiments, the tone identifies a mood or condition of the user.

The contextual relevance can be based on information associated with the geo-location of the vehicle, the state/condition of the vehicle, learned preferences, information in user online accounts, information from social networks, information from patterns of use by the user, information based on the time of day, week, month or based on when certain inputs or data that is requested or looked up by the user, or combinations of one or more of the foregoing. The intersection or analysis of these information points allow for the system to provide contextually relevant information to the vehicle, when the user needs the information and/or when it is anticipated that the information will be consumed, used, accessed, viewed, or desired. In one embodiment, these processing acts to filter out information that is not useful or relevant for the particular time, circumstances, state of the vehicle, geographic location, time of day, etc., and as a result, reduced or un-needed or un-desired information is provided or sent to the vehicle for presentation, which beneficially acts to reduce driver distraction. For instance, the vehicle may determine that the user is highly distracted based on the tone of the voice the user is providing as an input to the vehicle. Thus the vehicle may elect to limit interaction with the user until the user appears to be less distracted. However, the vehicle can monitor the context and environmental inputs to determine that the user seems distracted but is in fact only having a conversation with a passenger and may still want to interact with the vehicle with a high level of detail. The vehicle would be able to understand that a conversation is taking place in the vehicle and learn that the user still wants to be interacted with even though indicators suggest the user is not requiring more interaction. The vehicle and learn and store this contextual environmental input for the next time the user seems distracted but is only having a conversation with a passenger and would still like additional interaction with the vehicle.

In one embodiment, an interaction mode can define a single setting, or a plurality of settings. If a plurality of settings is defined for one interaction mode, individual settings of that interaction mode may be modified by the user or automatically in view of learned patterns, learned behavior, or the like. In some embodiments, the learned patterns can be identified from a collection of similar users. For example, if other users are registered with a cloud service for connected vehicles, typical settings, changes, control modifications, preferences, demographic preferences, regional/cultural preferences, language preferences, etc. can be mined to identify patterns. In one embodiment, these patterns can be mined without requiring the actual identify of a user, so that privacy protection can be maintained for all user accounts.

In some implementations, the learning and predicting embodiments may utilize learning and prediction algorithms that are used in machine learning. In one embodiment, certain algorithms may look to patterns of input, inputs to certain user interfaces, inputs that can be identified to biometric patterns, inputs for neural network processing, inputs for machine learning (e.g., identifying relationships between inputs, and filtering based on geo-location and/or vehicle state, in real-time), logic for identifying or recommending a result or a next input, a next screen, a suggested input, suggested data that would be relevant for a particular time, geo-location, state of a vehicle, and/or combinations thereof. In one embodiment, use of machine learning enables the vehicle to learn what is needed by the user, at a particular time, in view of one or more operating/status state of the vehicle, in view of one or more state of one or more sensors of the vehicle. Thus, one or more inputs or data presented to the user may be provided without explicit input, request or programming by a user at that time. Overtime, machine learning can be used to reinforce learned behavior, which can provide weighting to certain inputs.

In one implementation, the at least one aspect of one of the preferences is data obtained from an internet service, wherein the internet service is one of a website, or a calendar, or social network website, or a news site, or a dictionary site, or mapping service, or a to-do list, or a phone list, or a merchant website, or a shopping website, or a coupon site, or a discount site, or gasoline price site, or an electric vehicle (EV) charge locator service, or an EV charge reservation service, or an e-payments site, or an energy pricing site, or a route mapping service, or a traffic service or site, or a movie site, or a music site, or travel site, or a vehicle site, or vehicle manufacturer site, or a rental car site, or an airline reservation site, or a restaurant finding site, or a review site, or a weather site, or a loyalty rewards site, or a database, or a historical driving database, or a vehicle-to-vehicle database, or a holiday calendar, or the internet.

In one embodiment, a method is provided. The method includes receiving geographic locations of a vehicle over time, at a server configured to execute cloud services for a user account. The user account identifying the vehicle and the user account further includes a profile for a user of the vehicle. The method also includes accessing the profile to identify a history of use of the vehicle for the user. The method also includes generating, from time to time, a plurality of learned preferences that are associated to the profile of the user by examining the history of use of the vehicle for the user. The history of use of the vehicle includes geographic locations of the vehicle, inputs made to a user interface of the vehicle at particular times or when the vehicle is at particular geographic locations. The method also includes, for a current geographic location and for a current time, identifying supplemental content for display on the user interface. The supplemental content is contextually related and filtered based on the current geographic location of the vehicle, the current time, and the learned preferences. Then, sending the supplemental content to the vehicle over a wireless network. The supplemental content is configured for display on the user interface of the vehicle; the method is executed by a processor.

In one implementation, the user interface of the vehicle is integrated in one or more display screens of the vehicle, the one or more display screens being configured to display a level of information items based on an interaction mode. In one implementation, settings of the interaction mode define a style of user interfaces of the display screens of the vehicle, the style of user interfaces of the display screen identify one or more text format, text size, icon types, simplicity of interface features, types of gauges, clutter levels, skins, wallpaper, styles, designs, colors, and/or voice input/output display features. In one implementation, some of the supplemental content includes identification of goods or services proximate to at least one of the geographic locations of the vehicle, the goods or services identified being filtered to include goods or services predicted to be of interest for display based on examination of the profile of the user account, and the profile of the user account further includes data regarding user preferences and context information regarding likelihood of interest for goods or services at other times similar to a current time.

In some embodiments, the vehicle display of the vehicle includes any one or more of a main dashboard display, or a center console display, or a combined main dashboard and center console display, or a glass surface, or a windshield display, or a window display, or a touch surface display, or a headrest display, or a movable display, or a wireless display, or a wire-connected display, or combinations of one or more thereof.

In one embodiment, the custom configuration is generated using tools and programs made available on a website. The tools and programs may be executed by computers, such as computers of a data center to provide cloud based processing. The data centers can be distributed geographically and the communication to specific vehicles can be dynamically assigned to various geographic data centers, as the vehicles move around geographically.

In some embodiments, the mood of the user could be used to determine through algorithmic, ambient, stored and learned conditions, a state of intoxication.

In some embodiments, the vehicle systems can be allowed to listen to in vehicle conversations between a driver and a passenger or between passengers. The vehicle parses the main data points in the conversation to determine an appropriate response. For example, if a passenger in the front seat is expressing that he or she is hot; the vehicle could ask the passenger if a lower temperature is desired. If the system detects that a passenger in the rear seat is mentioning that they would like more air conditioning, the vehicle can either ask the driver to grant additional AC to the rear of the vehicle or automatically send more AC to the rear of the vehicle. The vehicle responses can be tailored to the user by not only learning but also by allowing the user to set the level of response.

In some embodiments, the vehicle system can be set by the user to function with varying levels of autonomy. If the user of the vehicle would like the vehicle to ask for less permissions to change vehicle settings and just perform the actions the vehicle seems fit, a user can set the vehicle to a high level of autonomy. Conversely, if a user wants the vehicle system to ask more confirmations and more permissions, the vehicle system can be set by the user to run with less autonomy. Varying levels of autonomy between very minimum autonomy and maximum antinomy can be set by the user.

In some embodiments, the vehicle can learn over time the level of autonomy it should operate under based on learning in past decision points. For instance, the user can tell the vehicle system by voice or touch that it is not necessary to ask for permission to lower the vehicle temperature when it is deemed too hot for the user. After a data set has been compiled where the system attains a level of certainty, the system will no longer ask for permission to lower the temperature because it has learned that, for instance, in 4 of the last 4 times the system asked to lower the temperature, the user told the system not to ask for permission. Consequently, the $5^{th}$ time the system determines it is time to lower the temperature in the vehicle it will not ask for permission. Alternatively, the vehicle may become too autonomous for a user's liking, so the user can ask the system to ask for permission next time it sets the seat warmer for example. This aids the vehicle system in determining the environmental inputs present when the user was ok with autonomy and when the user was not only with autonomy. For example, the vehicle system will incorporate into learning history and algorithms for future decision making that the user likes not asking for permission to set the seat heater when the ambient temperature in the vehicle is below 45 degrees Fahrenheit. However, the user does not like the vehicle to automatically set the seat heater without asking when the ambient temperature in the vehicle is above 45 degrees.

The methods, systems and apparatus are provided, which include processing systems for executing vehicle responses to touch input. In various configurations, a user's touch characteristic is analyzed to determine matches in predefined touch characteristics. The touch characteristic, in some embodiments, is matched to touch profiles that determine or correlate to a selected vehicle response. The vehicle response to touch input can include, for example, making a setting, finding a map, finding directions, setting entertainment functions, looking up information, selecting a communication tool, making a call, sending a message, looking up a contact, looking up a calendar event, performing an Internet search, controlling a system of the vehicle, etc.

Broadly speaking, the processing defined herein enables the vehicle response to be tailored to respond to the user's touch input in a way that respects or understands the user's possible mood or possible state of mind. For example, if the user's touch characteristic implies that the user is rushed, the system (e.g., vehicle electronics, software, cloud processing, and/or user connected devices) will process that touch characteristic in the touch and will provide a vehicle response in a more expedited manner, or without further queries. If the touch characteristic implies that the user is relaxed, the system may provide supplemental information in addition to responding to the touch input. For example, if the user elects to look for a dining spot near a park via the graphical interface using a touch input, the system may also recommend nearby coffee shops, discounts for parking, nearby valet parking, and/or promotions if the system determines that the touch characteristic indicates a relaxed or normal user mood. However, if the system determines that the user appears stressed or rushed based on the touch characteristic the user's touch, the supplemental information may be omitted and a response can be quick and to the point. In some embodiments, in addition to detecting a user's touch characteristic and/or detecting user mood, the system can identify a geo-location context and an environmental context. These additional contextual data points can be used to provide further customized vehicle response and/or recommendations to the user of the vehicle (i.e., driver and/or passengers).

In one embodiment, a method for processing touch inputs at a vehicle is provided. The method includes sending, to a cloud processing server, data from the vehicle. The vehicle includes an on-board computer for processing instructions for the vehicle and processing wireless communication to exchange data with the cloud processing server. The method enables receiving, at the vehicle, data for a user account to use the vehicle. The cloud processing server uses the user account to identify a user profile of a user. The method further enables receiving, from the cloud processing server, touch profiles for the user profile. Each touch profile is associated with a touch characteristic identifier. The touch profiles for the user are learned from a plurality of touch inputs made to the vehicle by the user in one or more prior sessions of use of the vehicle. The method receives, by on-board computer, a touch input, for the touch input and processes, by on-board computer, the touch input to identify a touch profile for the touch input. The vehicle response is then generated for the touch input. The vehicle response is selected based on the touch characteristic identifier of the identified touch profile.

In some embodiments, the touch characteristic identifiers identify a mood of the user.

In some embodiments, the mood of the user includes one or more of a normal mood, a frustrated mood, an agitated mood, an upset mood, a hurried mood, an urgency mood, a rushed mood, a stressed mood, a calm mood, a passive mood, a sleepy mood, a happy mood, an excited mood, or combinations of two or more thereof.

In some embodiments, the touch characteristic identifiers identify a physical profile of the user. For example, a user may touch a graphical user interface and the vehicle learns the size of the user's touch print and in doing so stores the touch characteristic. This touch characteristic may indicate that the user has large fingers with large surface area and this tells the vehicle not to misinterpret a touch by the user as a user touching hard, but simply the size of the touch print is relative to the size of the user's finger.

In some embodiments, the accuracy of a user's touch characteristic can be measured. For instance, a graphical user interface may provide a button for the user to touch. The vehicle can measure using on board electronics and screen mapping coordinates or other known touch screen coordinate tracking methods, how close to the center of the button the user's touch was registered. Varying degrees of accuracy can be then recorded after every touch to determine how consistently accurate or inaccurate the user is being during a session of driving in terms of touching the button. The vehicle can compare the touch characteristics of the user in terms of accuracy with known touch characteristic profiles stored on the vehicle or in the cloud to determine how accurate the user is being. For instance, if the user is consistently 5 coordinate points or less away from the center of the button during a current driving session, and stored touch characteristic profiles suggest that 5 coordinate points or less is quite accurate, the vehicle will determine that the user is being quite accurate. This data is helpful for identifying how focused or distracted the user is. In the last example, the user is quite accurate which may suggest that the driver is not rushed, is relaxed and does not have a lot of distractions. Additionally, this may aid in determining the state or mood of the user to the converse. If the user is determined to be consistently quite inaccurate, this may indicate that he user is rushed, agitated, tired, sleepy, or distracted. Based on the determination the vehicle has made using touch, touch characteristics and comparing touch profiles to known touch profiles, an inference can be made on the part of the vehicle on how to respond. If the user is rushed, a clutter free GUI may appear. If a user is sleepy, a brighter LCD screen may be set or alerts may sound.

In some embodiments the duration of a user's touch characteristic can be measured. For instance, a graphical user interface may provide a button for the user to touch. The vehicle can measure using on board electronics, screen capacitive sensors touch screen touch duration capturing methods, how long the user's finger was touching the button on the screen. Varying degrees of duration can be then recorded after every touch to determine touch duration patterns during a session of driving. The vehicle can compare the touch characteristics of the user in terms of touch duration with known touch characteristic profiles on the vehicle computer or stored in the cloud to determine the average duration of a user's touch and what the duration of touch could mean. For instance, if the user is consistently registering GUI touch inputs that last less than one second during a current driving session, and stored touch characteristic profiles suggest that touches lasting on average less than one second is very brief, the vehicle will determine that the user is being quite brief with their touch inputs. This data is helpful for identifying how focused or distracted the user is. In the last example, the user is touching input screens with a high level of brevity which may suggest that the driver is rushed, is not relaxed and may be distracted. Additionally, this may aid in determining the state or mood of the user to the converse. If the user is determined to be consistently making touch inputs that have a duration of an average of more than 1 second, this may indicate that he user is not rushed, is relaxed, could be tired, or sleepy. Based on the determination the vehicle has made using touch, touch characteristics and comparing touch profiles to known touch profiles, an inference can be made on the part of the vehicle on how to respond. If the user is rushed, a clutter free GUI may appear. If a user is sleepy, a brighter LCD screen may be set or alerts may sound.

In some embodiments the intensity of a user's touch characteristic can be measured. For instance, a graphical user interface may provide a button for the user to touch. The vehicle can measure using on board electronics, screen capacitive sensors touch screen touch intensity capturing methods, how much pressure the user's finger was exerting on the button on the screen. Varying degrees of intensity can be then recorded after every touch to determine touch intensity patterns during a session of driving. The vehicle can compare the touch characteristics of the user in terms of touch duration with known touch characteristic profiles on the vehicle computer or stored in the cloud to determine the average touch intensity pressure of a user's touch and what the pressure reading of a touch could mean. For instance, if the user is consistently registering GUI touch inputs that are light in pressure during a current driving session, and stored touch characteristic profiles suggest that touches with light pressure are below average in touch pressure, the vehicle will determine that the user is being lighter than usual or lighter than normal with their touch inputs. This data is helpful for identifying how focused or distracted the user is. In the last example, the user is touching input screens with a low level of pressure which may suggest that the driver is not rushed, is relaxed and may not be distracted. Additionally, this may aid in determining the state or mood of the user to the converse. If the user is determined to be consistently making touch inputs that have a high degree of pressure intensity, this may indicate that he user is rushed, is angry, or could be distracted. Based on the determination the vehicle has made using touch, touch characteristics and comparing touch profiles to known touch profiles, an inference can be made on the part of the vehicle on how to respond. If the user is rushed, a clutter free GUI may appear. If a user is sleepy based on very light pressure, a brighter LCD screen may be set or alerts may sound.

In some embodiments the position of a user's touch characteristic can be measured. For instance, a steering wheel may be equipped with electronic and sensors that can register not only where the steering wheel is being grasped but also by how many hands. The vehicle can measure using on board electronics, screen capacitive sensors touch screen touch intensity capturing methods, how defensively or offensively the user is grasping the stealing wheel, stick shift knob and other graspable areas in a vehicle such as an arm rest. Varying positions can be then recorded after every touch to determine touch position patterns during a session of driving. The vehicle can compare the touch characteristics of the user in terms of touch position with known touch characteristic profiles on the vehicle computer or stored in the cloud to determine the normal position of hands on a steering wheel for instance and what the position reading of a touch could mean. For instance, if the user is consistently grasping the steering while at a "10 and 4" position current driving session, and stored touch characteristic profiles suggest that a "10 and 4" steering wheel grasp means the user is using two hands, the vehicle will determine that the user is being more cautious than usual or more cautious than normal with their steering while grasp position. Touch intensity and touch duration may further help to identify how hard the user is grasping the steering while and how long an intense steering while grasp at "10 and 4" as transpired.

In one embodiment, this data is helpful for identifying how focused or distracted the user is. In the last example, the user is touching input positions suggesting the driver is being cautious and may be trying to focus. Thus based on the determination the vehicle has made using touch, touch characteristics and comparing touch profiles to known touch profiles, an inference can be made on the part of the vehicle on how to respond. In this example, the vehicle has determined it is not a good time to distract the user so a clutter free GUI may appear and less vehicle to user interaction may transpire. In another example, the touch characteristics of the user may indicate that the position of the user's hands on the steering while show that the user is using consistently using one hand to steer the vehicle and with light pressure. The vehicle may determine that the user is relaxed and may be in need of more interaction with the vehicle.

In some embodiments, the vehicle may user only one touch characteristic to make an inference on how to tailor responses to inputs based on touch characteristics and the comparison with touch characteristic profiles on the vehicle computer or stored in the cloud In some embodiments a combination of touch characteristics such as touch accuracy, touch duration and or touch intensity may be computed by the vehicle system to make in inference on how to tailor responses to the user based on touch characteristics.

In some embodiments, the vehicle may user only one voice tone to make an inference on how to tailor responses to inputs based on tone and the comparison with tone profiles on the vehicle computer or stored in the cloud.

In some embodiments a combination of voice tones may be computed by the vehicle system to make in inference on how to tailor responses to the user based on tone.

In some embodiments a combination of touch characteristics such as touch accuracy, touch duration and or touch intensity may be used in conjunction with a combination of voice tones computed by the vehicle system to make in inference on how to tailor responses to the user based on tone and touch characteristics.

In some embodiments, the on-board computer is configured select the vehicle response from among a plurality of alternate vehicle response for the touch input and associated touch characteristic identifier.

In some embodiments, the touch profiles and associated touch characteristic identifiers are stored in storage of the cloud processing server and a copy of the touch profiles and associated touch characteristic identifiers is stored in storage of the vehicle.

In another embodiment, a method to be executed by a processor of a computer of a vehicle is provided. The method includes receiving touch input of a user at the vehicle to command input or request information from a touch input interface of the vehicle. The method further includes analyzing the touch input of the user to identify a touch characteristic of the touch input. The method then functions to identify a touch profile of the user for the identified touch profile. The touch profile is used to select a vehicle response that is moderated for the touch characteristic of the touch input.

In some embodiments, the touch profile identifies a type of vehicle response that is customized for the user, based on the identified touch characteristic in the touch input by the user.

In some embodiments, a plurality of touch profiles are associated with the user, each touch profile identifies a preferred vehicle response for the user based on the touch characteristic.

In some embodiments, a method can include receiving the touch input, sampling the received touch input and then identifying accuracy, duration, pressure intensity, or position in the touch sample. The accuracy, duration, pressure intensity, or position identifying markers in the touch input. The method includes identifying a touch characteristic that best matches the identified markers. The touch characteristic that best matches the identified markers is for the user. The method also includes identifying a touch profile for the identified touch characteristic. The touch profile is used to select a type of vehicle response. The vehicle response includes one of an input to the vehicle or a system input, or a response requested from the vehicle or setting to be set by the vehicle.

In some embodiments, the identifying the touch characteristic identifies when additional information is to be provided or not provided to the user based on the touch characteristic.

In some embodiments, the additional information includes advertising data, or discount data, or related information that is in addition to the requested information or instructed command found in the touch input.

In some embodiments, the touch profile use based on the touch characteristic assists in moderating when to provide additional information to the user or when to avoid providing additional information to the user, or when to interact with the user or when to avoid interaction with the user.

In some embodiments, the touch characteristic identifies a mood or condition of the user.

In one embodiment the user of a vehicle may elect to determine or pre-program how the vehicle should respond based on user defined voice or touch inputs. The user may elect to draw a connection manually between certain tones and or touch characteristics and manually determined vehicle responses.

In one embodiment, a vehicle may be set by a user to only automatically respond based on learning to a user's voice or touch inputs only, only respond based on user defined vehicle responses to user voice or touch inputs, or respond in a combination of learned and user defined preferences dictating how a vehicle should respond based on tone or touch characteristics.

BRIEF DESCRIPTION OF DRAWINGS

FIG. 9B describes one example of how stored data and function declarations may be compiled to provide intermediary access to a vehicle's computer controlling vehicle systems, in accordance with one embodiment.

FIG. 9C describes a set of computer readable and executable code that can be compiled together by a third party APP developer in the form of an APP, in accordance with one embodiment.

FIG. 32 illustrates an example of a car dashboard having interaction styles and screens and settings therefore, in accordance with one embodiment.

FIG. 37 illustrates several examples of using touch characteristics (TC) in order to determine the mood, state, or mental state of the user while driving, in accordance with one embodiment.

FIG. 39 illustrates an example of various touch inputs that identify touch characteristics of happy, urgent, and sleepy.

DETAILED EMBODIMENTS

Figure 1:
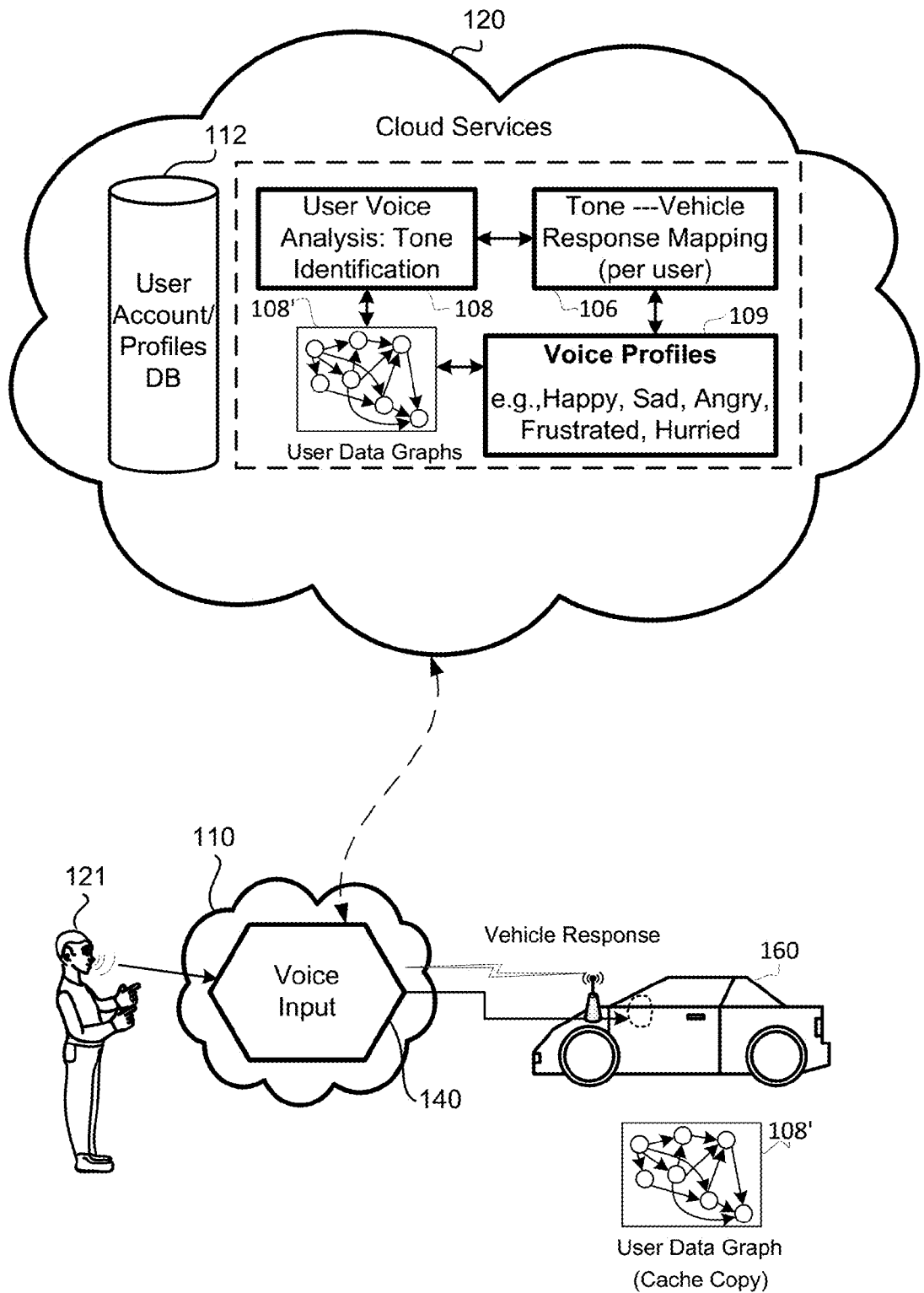
FIG. 1 illustrates an example of a user interfacing with a vehicle, via voice input, in one embodiment.

Embodiments of the present invention define methods, systems and apparatus for use in vehicles. The methods, systems and apparatus include electronics of vehicles that drive display devices in vehicles. In some embodiments, computer systems and displays are integrated with the vehicle and in other embodiments, vehicle electronics communicate with portable devices, and in other embodiments, portable devices and the electronics of the vehicle work together to exchange information, user interface data, data for applications, data for displays, etc. In some embodiments, internet connections provided by the vehicle are used, and in other embodiments, internet connections provided by a portable device is used, and in still other embodiments, communication to the internet can be via the vehicle communication systems and also those of a portable device. The vehicle, in one embodiment, is referred to as a connected vehicle, as the vehicle uses data and communication information from a remote server or service or cloud system, etc. In the various embodiments described in this document, it should be understood that embodiments may be combined to define specific implementations, and in some cases, implementations can be defined by combining only specific elements described herein.

In each of the implementations, the systems provide physical technical results. These technical results are not results that can be manually produce by paper and pencil, but instead require processing by client devices, servers, and distributed internet systems, so as to provide intelligent data that can be used in an efficient manner via the connected vehicle. Furthermore, the processing operations described herein provide useful solutions the problems associated with distracted driving. Distracted driving occurs most often when users are required to provide input to a vehicle while driving. The vehicle inputs can include touch inputs, voice inputs, gesture inputs, and any other type of input that requires the user to remove his or her primary concentration from driving. Therefore, improving the recognition of voice input and allowing the vehicle to provide a vehicle response that is most appropriate to the mood, mental state, and/or desires of the user while driving will improve the ability of the driver to continue to concentrate on driving. The less the user is required to focus on providing the correct input to the vehicle, the more the driver is able to concentrate on driving and avoiding potential disastrous accidents. These technical operations are performed by specific processing circuits of the vehicle, enter specialized to communicate with application-specific interfaces to control functions of the vehicle. These control functions can include navigation functions, entertainment functions, safety functions, operational functions, and communication functions. These operations, when returned to the driver as vehicle responses should be as desired by the user, to avoid having the user to re-program or read provide instruction to the vehicle. Accordingly, the analysis of voice, analysis of touch, analysis of gestures, analysis of facial recognition, and other combined biometric analysis will allow the vehicle to provide the most optimal vehicle response, and input.

The methods, systems and apparatus are provided, which include processing systems for executing vehicle responses to voice input. In various configurations, a user's tone of voice is analyzed to determine matches in predefined tones. The tones, in some embodiments, are matched to voice profiles that determine or correlate to a selected vehicle response. The vehicle response to voice input can include, for example, making a setting, finding a map, finding directions, setting entertainment functions, looking up information, selecting a communication tool, making a call, sending a message, looking up a contact, looking up a calendar event, performing an Internet search, controlling a system of the vehicle, etc. In general, the vehicle response is tailored to respond to the user's voice input in a way that respects or understands the user's possible mood or possible state of mind. For example, if the user's tone implies that the user is rushed, the system (e.g., vehicle electronics, software, cloud processing, and/or user connected devices) will process that tone in the voice and will provide a vehicle response in a more expedited manner, or without further queries. If the tone implies that the user is relaxed, the system may provide supplemental information in addition to responding to the voice input. For example, if the user asks for a dining spot near a park, the system may also recommend nearby coffee shops, discounts for parking, nearby valet parking, and/or promotions. However, if the user appears stressed or rushed, the supplemental information may be omitted and a response can be quick and to the point. For example, the response can be to show five restaurants near the park, and associated contact/map info, reservations links, or the like. For the relaxed inquiry, the system may attempt to refine the request and as, what type of food are you interested in, or identify coupons available for certain nearby restaurants, before providing a list of four restaurants near the park, and associated contact/map info, reservations links, or the like.

In some embodiments, in addition to detecting a user's tone and/or detecting user mood, the system can identify a geo-location context and an environmental context. These additional contextual data points can be used to provide further customized vehicle response and/or recommendations to the user of the vehicle (i.e., driver and/or passengers).

One example method for processing voice inputs can include sending, to a cloud processing server, data from the vehicle. The vehicle includes an on-board computer for processing instructions for the vehicle and processing wireless communication to exchange data with the cloud processing server. The method enables receiving, at the vehicle, data for a user account to use the vehicle. The cloud processing server uses the user account to identify a user profile of a user. The method further enables receiving, from the cloud processing server, voice profiles for the user profile. Each voice profile is associated with a tone identifier. The voice profiles for the user are learned from a plurality of voice inputs made to the vehicle by the user in one or more prior sessions of use of the vehicle. The method receives, by on-board computer, a voice input, for the voice input and processes, by on-board computer, the voice input to identify a voice profile for the voice input. The vehicle response is then generated for the voice input. The vehicle response is selected based on the tone identifier of the identified voice profile.

In some embodiments, the tone identifiers identify a mood of the user, and the mood of the user can include, without limitation, one or more of a normal mood, a frustrated mood, an agitated mood, an upset mood, a hurried mood, an urgency mood, a rushed mood, a stressed mood, a calm mood, a passive mood, a sleepy mood, a happy mood, an excited mood, or combinations of two or more thereof.

In some embodiments, the tone identifiers identify a dialect of the user, and the dialect of the user includes one or more of a language dialect, a country dialect, a geographic region dialect, an age dialect, or combinations of two or more thereof.

The contextual relevance can be based on information associated with the geo-location of the vehicle, the state/condition of the vehicle, learned preferences, information in user online accounts, information from social networks, information from patterns of use by the user, information based on the time of day, week, month or based on when certain inputs or data is requested or looked up by the user. The intersection of these information points allows for the system (e.g., server, vehicle computer, user device, or combinations thereof) to provide contextually relevant information to the vehicle, when the user needs the information, so that distracted driving can be reduced.

Further, the vehicle can be customized or the user account/profile can be customized for vehicles to allow interaction modes to be used. Interaction modes define the way of access-input, look and feel, content, simplicity, complexity, skins, etc. of the user interfaces or controls of the vehicle. By enabling this level of customization, vehicles can be configured or customized over time to the way each user is most comfortable, thus reducing distracted driving. This customization can also extend to physical inputs, such as knobs, switches, buttons, dials, etc. The customization can be, in one embodiment, by adding display screens to physical inputs to define hybrid inputs. The display screens can be on the physical inputs or beside the inputs, so that the content displayed can change, thus changing the functionality of each or some or one of the physical input based on an interaction mode or setting. By providing this level of customization, distracted driving can be reduced, as the vehicle is customized to what the user is most comfortable with and can thus concentrate on driving.

The Internet services provide access to cloud services. The cloud services provide access to user accounts and access to settings, configurations, applications and other customization defined by the user. Customization can include user interface customization of a vehicle display or displays. The customization can include the ability to select specific applications (APPS) to be activated by the vehicle and interfaced via the display or displays, voice input, touch input, etc. The customization is also provided with a learning engine that learns use by the user, and automatically implements settings or programming to aspects of the user interface. The programming can include automatic programming at certain times, days, months, years, etc., and can be updated or molded over time as the user continues to use the vehicle UI.

The user's saved UI configuration may also be transferred to the display of the rented (or other vehicle) vehicle. A best-fit configuration can also be generated using the user's profile selections, so that the configuration provided for the other vehicle will closely resemble or appear as it does for the configured vehicle. In other embodiments, the user's use metrics can be monitored. The use metrics can include use of APPS, use be of system components of the vehicle, use of the vehicle, environment conditions, and historical actions taken by the user via the input/output controls of the vehicle (e.g., buttons, levers, keys, fobs, display selections, display interface actions, communication actions, etc.).

These historical actions can then be used to define learned actions. The learned actions can be analyzed to change configuration settings in the user's saved profile. For instance, if the user uses a particular APP every day at a particular time, that APP icon can be surfaced to the display or preset to start. The APP can then provide information to the user at about the same time the user normally needs the information. Other historical use patterns can be monitored and such data can be saved to the user's profile. The data can then be used by algorithms that build assumptions based on historical inputs by a user as well as environmental inputs, location inputs, vehicle diagnostic inputs; internet connected marketing deals, the user's calendar, traffic conditions as well as news. The assumptions the algorithm builds are then processed into decisions and actions by an additional algorithmic process to activate local or remote audio and visual alerts, change vehicle systems, display information on a vehicle's displays and request a decision from a user locally or remotely to complete an action.

A number of embodiments are described below, with reference to specific implementations that refer to vehicles, but such implementations should be broadly construed to include any type of vehicle, structure or object. Without limitation, vehicles can include any type of moving object that can be steered, and can include vehicles that are for human occupancy or not. Vehicles can include those that are privately owned, owned by corporations, commercially operated vehicles, such as buses, automobiles, trucks, cars, buses, trains, trolleys, etc. Example vehicles can include those that are combustion engine based, electric engine (EV) based, hybrids, or other types of energy source vehicles.

A cloud processing system, as described herein, will include systems that are operated and connected to the Internet or to each other using local networking communication protocols. A cloud processing system can be defined as interconnected and distributed physical or virtual software defined network that utilizes virtual or physical processing and storage machines that enable various applications and operating systems to facilitate the communication with and between various client devices (vehicles, user devices, structures, objects etc.). The communication with and between the various client devices will enable the cloud processing system to deliver additional processing information, data, and real-time metrics concerning data obtained from other processing systems as well as client feedback data. The distributed nature of the cloud processing system will enable users of various vehicles, structures and objects to access the Internet, and be presented with more flexible processing power that will provide the requested services in a more effective manner.

The processing systems can be defined from various data centers that include multiple computing systems that provide the processing power to execute one or more computer readable programs. The processing of the computer readable programs can produce operations that can respond to requests made by other processing systems that may be local to a vehicle's electronic system. For example, a vehicle can include electronics that utilize memory and a processor to execute program instructions to provide services.

In other embodiments, the electronics of a vehicle can synchronize with a user's portable electronics. The user's electronics can include, for example mobile devices that include smartphones, tablet computers, laptop computers, general-purpose computers, special purpose computers, etc. The various computing devices of the vehicle, and or the computing devices of the user (smart devices) can be connected to the Internet or to each other. Provided that a user has access or account access to the cloud service, the cloud processing services on the Internet can provide additional processing information to the electronics of the vehicle.

The wireless communication can include cellular tower communication that couples and communicates through various networks to the Internet, to provide access to cloud processing 120. Other methods can include providing Wi-Fi communication to local Wi-Fi transmitters and receivers, which communicate with cloud processing 120. Other types of communication can include radio frequency communication, such as 802.11.ac, 802.11ad and subsequent wireless networking protocols, Bluetooth communication or combinations of Wi-Fi and Bluetooth. It should be understood that vehicle electronics 161 can communicate with cloud processing 120 via any number of communication methods, so long as exchanges of data can be made with cloud processing 120 from time to time.

The communication can be made by vehicle electronics 161 while the vehicle is on or when the vehicle is off, so long as communication and processing circuitry of vehicle electronics 161 has a power source. The power source can include battery power that powers vehicle electronics to communicate with cloud processing 120 when vehicle is turned off. When vehicle is turned on, the battery that drives vehicle electronics 161 can be recharged.

FIG. 1 illustrates an example of a user 121 interfacing with a vehicle 160, via voice input 140. In this example, the voice input is provided to electronics of the vehicle to provide a command, setting, request data, request information, make changes, adjustments or communicate with others or the vehicle. In one embodiment, the vehicle is in communication with cloud processing 120. Cloud processing 120 includes cloud services. In one embodiment, a database 112 is managed by cloud services. User accounts and profiles can be saved in the database 112. In some embodiments, cloud services includes user voice analysis module 108 for tone identification. In one embodiment, voice analysis module 108 may use voice stress analysis (VSA) to record psychophysiological stress responses that are present in the human voice when a person suffers psychological stress in response to a stimulus (e.g., a question), and the consequences of the person's answer may be dire. In one embodiment, recorded "micro tremors" in a person's voice are converted via the algorithm into a scorable voice gram, e.g., audio signature. Overtime, the system learns a user's voice and micro-tremors, inflections, emotional sounds and/or repeating patterns. In some embodiments, a person's gender can also be used to adjust vehicle response to sensed input. In still other embodiments, the cloud processing system, as it manages user accounts for many users, can tap into the learning of individual users to find similarities to improve mappings for vehicle responses to detected user moods, stress, physiological condition, heart rate, person's body heat, eye gaze patterns, etc.

In one embodiment, a pitch detection algorithm (PDA) may be used to estimate the pitch or fundamental frequency of a quasiperiodic or virtually periodic signal, usually a digital recording of speech or a musical note or tone. This can be done in the time domain or the frequency domain or both the two domains. A PDA may be used in various contexts (e.g. phonetics, intensity of command, stress identification, and/or mood detection) and so there may be different demands placed upon the algorithm. In one embodiment, a variety of algorithms may be used to identify different data determining factors in a person's produced pitches in voice output.

Detecting emotional information can also use passive sensors which capture data about the user's physical state or behavior without interpreting the input. The data gathered is analogous to the cues humans use to perceive emotions in others. For example, a video camera might capture facial expressions, body posture and gestures, while a microphone might capture speech. Other sensors can detect emotional cues by directly measuring physiological data, such as skin temperature and galvanic resistance. In some embodiments, a camera or IR camera can detect temperature changes in a person's skin. For instance, if a user is stressed, the blood rushing to a person's face may elevate the heat pattern or sensed heat from that person's face.

Recognizing emotional information requires the extraction of meaningful patterns from the gathered data. This can be done using machine learning techniques that process different modalities, such as speech recognition, speech waveforms, natural language processing, or facial expression detection, and produce either labels (i.e. "sad," "mad," "happy," "hurried," "stressed," etc.).

In the embodiments described herein, mood and emotions can be used to modify the response provided by a vehicle, e.g., in response to a voice driven input. In one embodiment, sensors can be used to detect changes in the autonomic nervous system that are exposed by a user's speech. For instance, the way a user alters his or her speech can be used as information to produce systems capable of recognizing affect based on extracted features of speech. For example, speech produced in a state of fear, anger or joy becomes faster, louder, precisely enunciated with a higher and wider pitch range. Other emotions such as tiredness, boredom or sadness, lead to slower, lower-pitched and slurred speech. In one embodiment, emotional speech processing recognizes the user's emotional state by analyzing speech patterns. Vocal parameters and prosody features such as pitch variables and speech rate may be analyzed through pattern recognition, e.g., using one or more microphones of a vehicle. As noted, in addition to detecting sound/voice of a user, one or more cameras may also detect facial patterns, which may be used to detect mood or reinforce a determination that a particular mood is present in the driver or occupant of the vehicle.

In still other embodiments, one or more cameras internal to the vehicle may be used for facial detection, gesture detection, breach of security, intruder detection, motion detection, light detection, color detection, moving object detection, and motions of objects and passengers in the vehicle. In one configuration, cameras may be embedded in a dash board of a vehicle, on a display screen of a vehicle, on a roof liner, on a seat, on a glove box, on a touch panel, or in several of these places. In one embodiment, stereo cameras may be used to detect a volume or monitor a volume of space in the vehicle. In one configuration, the volume of space may be located where gesture detection is to take place. For example, one or more cameras may be placed so that a location near the center console, display screen or some user interface is monitored. In monitoring this volume of space, the cameras can capture multiple video frames, which can be analyzed to determine what gesture the user is making with his or her hand. For instance, the user may make a swipe gesture, and the direction of the swipe gesture many be monitored, and based on processing and matching to know gestures, the swipe gesture can be translated to a specific input command for the vehicle. In some cases, the motion and number of fingers used to make certain gestures can be captured.

If one finger is used, the motion and direction of the tracked finger, using the cameras, can be used to determine whether a specific input is desired. In some cases, when two fingers are used, the two fingers are identified. In still other cases, when one or select fingers are placed in the volume of space monitored by cameras, the motions, changes in finger positions, surfaces touched, tapped, slid, contacted, etc., may be monitored to determine what type of gesture input is desired. In still other embodiments, the gesture detection using cameras may be performed in combination with other tracking, sensor or detection functions. For example, the gesture camera tracking/detection can be performed in combination with voice input processing, face detection, and other biometric detection systems. By combining sensed and detected actions by the user, wherein said actions can be sound, voice, motion, gestures, voice tones, voice level, force used when making touch inputs, swipe and input profiles, environmental air detection, gas detection, eye detection, gaze detection, retina scan sensing, etc., it is possible to identify false positives and also optimize the vehicle response to what the user actually intended as the input.

In some embodiments, training can be performed, wherein a user is asked to show a sad face, a mad face, a frustrated face, a surprise face, and urgent face, etc., and images of the users face can be added to a database as templates. These templates can be used during real-time processing to perform matching against detected facial expressions made by the user when inputting information to a vehicle. For example, if in addition to voice analysis of the user to detect whether the user is frustrated, image data can also be used to confirm the frustrated state against saved templates. The templates can be saved in memory of the vehicle, and utilized when determining whether the user is in a particular state of mood. The templates can identify facial characteristics, such as the placement of the user's mouth, the way that eyes are opened or closed, the cheekbone characteristics, and other biometric determining of features. Thus, facial templates of the user can be made during operational use of the vehicle, during training, or calibration. As such, the templates used to identify the users face can be used in conjunction with analysis of the voice input to better identify a match of the user's mood.

In one configuration, a user may provide training input data to calibrate use of the voice analysis module 108. The user may be asked to read phrases, stories, ask questions, respond to questions, or asked to respond to emotionally charged questions. In some examples, the system may produce a training session that askes the user to respond to multiple questions using different intentional tones. For instance, the user may be asked to say "open the door" in a normal mode, an excited mode, in a mad mode, in a stress mode, etc. In a similar manner, the user may be asked to say, "change the station," "map address," "get help," "call home," "find a gas station," "find a charge station," "sound alarm," etc. As can be appreciated, these phrases can be intentionally exaggerated by the user when asked to do so in training, and this training can be transferred as a starting calibration for the vehicle. In one embodiment, the training and calibration can be processed via an online application, such as one that can identify a user account and administer the training. The training and/or calibration data can then be transferred to the vehicle as a setting update, e.g., via the internet using a wireless connection. Once the vehicle is in normal use, as commands, inputs or response are provided to the vehicle, the vehicle can refine the response for the user, e.g., the user profile.

In one embodiment, a tone-vehicle response mapping module is also provided, for each user. For example, cloud processing manages information for registered users, and information for specific users is process and learned, and used to develop a user data graph 108'. The user data graph 108' is formed based on user settings made by the user, behavior, historical actions, etc. A voice profile module 109 is also provided. The voice profile 109 receives tone information from module 106, in order to assist in selecting a voice profile, such as happy, sad, angry, frustrated, hurried, etc. Over time, the mapping of tones to voice profiles can change, and this information is reinforced and saved to the user data graph 108'. In one embodiment, the user data graph 108' is used by vehicle electronics to make determinations as to a vehicle response, for the voice input. In one embodiment, the user data graph 108' may be constructed and refiled by cloud processing 120. In other embodiments, the user data graph 108' may be constructed and refiled by vehicle electronics. In still other embodiments, the user data graph 108' may be processed and formed by the cloud processing 120 and transferred to the vehicle as a cached copy. In one configuration, if the vehicle has a cached copy, the vehicle can more quickly process voice inputs, determine tone and apply the response based on the identified voice profile. In some embodiments, as inputs are made at the vehicle, updates are sent to cloud processing 120 to update or refine the user data graph 108'.

Figure 2:
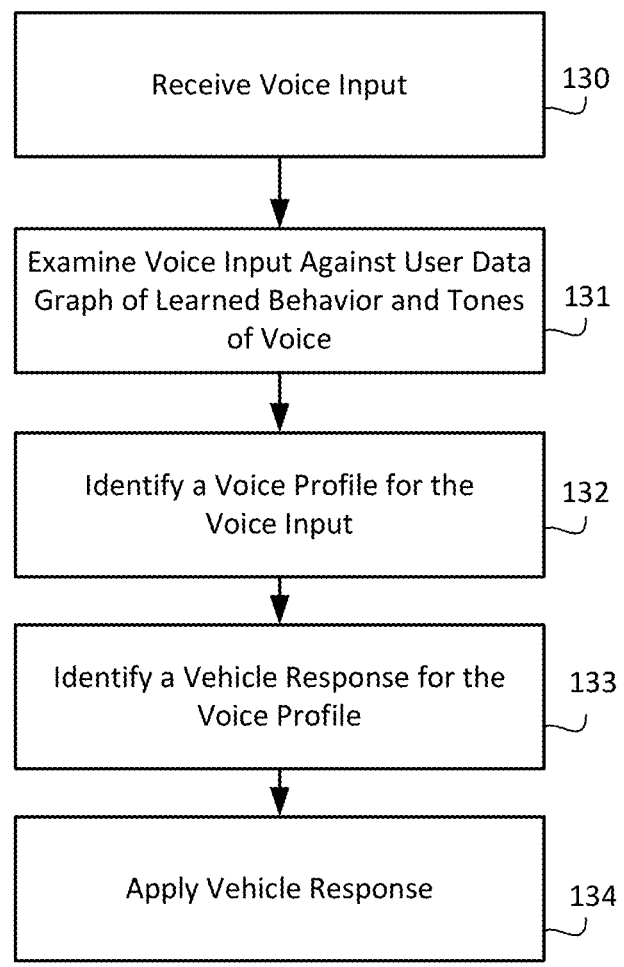
FIG. 2 illustrate a flow diagram of processing performed (e.g., by the vehicle), to identify a tone of voice and/or other user behavior to determine the vehicle response, which will be applied by the vehicle electronics, in one embodiment.

FIG. 2 illustrates an example of processing of voice input, in one embodiment. For example, the vehicle receives voice input 130. The voice input is examined in operation 131 against user data graph 108' of learned behavior and/or tones of voice. Based on this processing, in operation 132, a voice profile is identified for the voice input. In operation 133, the voice response is identified for the voice profile. As described throughout the specification, the voice profile may be customized for the specific user, and the vehicle response applied in operation 134 is based on the user's data graph 108'. As a result, the vehicle response conforms to the user's voice profile, so that the response will be received well by the user or throttled.

In some embodiments, various user states can be detected. In addition to user's tone of voice and mood, other conditions can be detected, in some embodiments.

For example, fatigue can be determined in numerous ways or combination of ways, for example, (1) length of driving, (2) GPS destination distance, (3) how long has the car been on last time since the car stopped, (3) driving patterns, (4) hitting road dividers, (5) not staying in the lines, (6) impaired speech, (7) car can give driver a test and measure accuracy, tone, slurring, seated position, (8) known angles of the head vs the body suggesting sleeping, (9) measuring nodding off, (10) audio detection, (11) listening for snoring, (12) listening for delirious speech.

In one embodiments, if threshold percentage of conditions exist, the electronics/systems of the vehicle can provide verbal feedback/output to the user (e.g., via speakers of the vehicle or speakers of a portable device, or combinations thereof). This audio output can say, for example, "Would you like me to open the windows for some fresh air?", "Big Coffee down the road has coffee on sale," "SLEEP-E hotel is in 10 miles, book hotel room?". In some embodiments, if no passenger is present, and driver fails to respond, sound audio noise to wake driver up, turn AC on to stimulate driver, etc.

In some embodiments, Low Fuel or battery level/range prediction can be provided. This can be determined in numerous ways. For example, a fuel or battery measurement is taken, a calculation of range vs. destination, a calculation of range vs. next available fueling or battery/charging station. If a threshold percentage of conditions exist, e.g., greater than 50%, or greater than 80%, etc. If the threshold is met, as preset, the systems of the vehicle can provide a visual and/or auditory alert. A verbal query may be provided, e.g., "Your fuel is low, would you like directions to your favorite "SHELL" or "CHEVRON" or the closer?", "Your driving range is 60 miles, however no fueling stations or charging stations are available after the next fueling station located 5 miles from your location", "Highly advisable, stop at "kwick-E Gas" located at 123 main street. Map this fueling station?".

In some embodiments, GPS and Gyroscope data may be used to determine level of interaction. For example, if speed is low or car is stopped, more interaction will appear or be audible. If vehicle is on a windy road, the car asks less questions or more simple questions. If vehicle is in heavy traffic, the vehicle moves most important GUI to the screen closest to the windshield line or sight or projects. In one embodiment, important GUI information is moved onto the windshield.

In one embodiment, mood can be detected in various ways or combined ways as described throughout this application. For example, and without limitation, mood may be automatically detected. In one embodiment, a rushed mood is sensed. Rushed moods may be sensed when user is short with answers, user lets car to leave user alone, rate of speech is faster than normal, distress sensed in the voice, visual confirmation user is very focused on the road, grip intensity on wheel, user's seated position is upright, or combinations thereof. In one embodiment, the vehicle can react in various ways, for example, the vehicle queries are clear, the vehicle queries are brief, the GUI on all screens change to limit distractions, routes are changed to quickest based on traffic, and not most direct, accident information is automatically displayed, etc.

In one embodiment agitated mood may also be sensed. For example, sensing can include, without limitation, user is short (e.g., curt), user is using known expletives, user is yelling, user asks vehicle to stop asking questions, driving is erratic compared to normal driving patterns, biometric sensors, blood pressure, position of hands on steering wheel, how hard the wheel is being grasped. In one embodiment, if user's heart rate is high, the vehicle may react in various ways. Heart rate may be sensed from user devices that are worn or from devices of the vehicle, e.g., sensors on the steering wheel, or some vehicle service, or optically (non-touch) sensing. In one embodiment, the vehicle may react by scaling back the number of questions posed to the user while in the vehicle. In another embodiment, the vehicle suggests turning off queries visually instead of verbally. In another embodiment, the vehicle GUI becomes more standard and easy to read. In still another embodiment, the vehicle changes ambient lighting to a calming hue.

In still other embodiments, good mood may also be sensed. For example, the user is jovial, the user's seated and wheel grasp position is relaxed, user's heart rate is at rest, user is asking more questions of the vehicle, user driving very normally as compared to historical driving, or combinations of two or more thereof. The vehicle may react in various ways, for example, a number of queries increase, more questions about settings, and more convenience based settings and questions asked, suggest coupons and asks to route to redeem, GUI offers more metrics and feedback, etc.

In some embodiments, biometrics may be used to sense other parameters of a user. For example, surfaces on a vehicle that the user/driver may come into contact may be analyzed. For instance, door surfaces may be monitored, floor surfaces may be monitored, dashboard surfaces may be monitored, and seat surfaces may be monitored. The surfaces may be configured with various sensors, e.g., biometric sensors. The sensors may or may not be visible or may be covered by liners, cloths, plastics, steel, metals, glass, etc. The materials, in some embodiments, are configured based on the sensing surface. For example, if the surface a door panel, the surface may be covered with leather, glass, plastic, transparent materials, heat sensitive materials, and/or tactile materials. In some embodiments, when a user is in contact with some surface of the vehicle, e.g., the driver, or passenger or both, particular users maybe be optionally monitored for mood and/or wellness. For instance, for the driver, it would be a benefit to monitor a driver to see if the driver is getting tired, sleepy, over agitated, stressed, high energy, lower energy, or simply non-responsive. This monitoring can occur over time, e.g., over a period of a trip or multiple trips, wherein some trips having similar patterns can be used to establish reference points. The reference points can be used to build a user profile and learning curves, which assist a vehicle system to make better identification of mood and/or wellness. Using this information, which can be shared and/or co-processed in the cloud, the vehicle can be configured to apply responsive action. The responsive action may be, for instance, waking up the driver with sound, air, warnings, and/or signals. Suggesting that the driver relax. Notifying a third party that the driver is tired (e.g., an employer of a vehicle driver), notifying the driver to change the temperature, automatically change the temperature, etc.

In one embodiment, a biometric broadly refers to metrics related to human characteristics. Biometrics authentication is used also usable as a form of identification and access control. In some embodiments, biometrics can also be used to identify individuals in groups that are under surveillance. Biometric identifiers are the distinctive, measurable characteristics used to label and describe individuals. Biometric identifiers are often categorized as physiological versus behavioral characteristics. Physiological characteristics are related to the characteristics of the body. Examples include, but are not limited to fingerprint, palm veins, face recognition, DNA, palm print, hand geometry, iris recognition, retina and odor/scent. Behavioral characteristics are related to the pattern of behavior of a person, including but not limited to typing rhythm, gait, and voice, voice tone, voice inflections, voice speed or slowness, sharp voice harmonics, or voice identifiers/patterns. Based on the detected biometric, e.g., voice, automatic detection can point to one or more emotions. As noted above, various sensors can be used to detect a driver's affect, including camera, microphone, and heart rate, blood pressure and skin conductance sensors.

In further embodiments, mood may directly affect intensity of feedback. If Angry "turn DOWN the music," then then vehicle lowers music by 10×, for example. If happy "turn down the music," then vehicle lowers music by 3×.

In still other embodiments, mood sensor and vehicle reactions are refined over time with more use. For instance, if a user is angry, yet still wants more interaction and more questions from the vehicle, the vehicle learns that the user does not mind queries and will adjust the number of queries based on how the user reacts over time.

In further embodiments, vehicle personality can be refined. For example, the vehicle can have personality attributes. For example, what can change a vehicle personality automatically may vary from user to user and vehicle to vehicle, over time and based on learned behaviors. In one embodiment, user's login or profile information may be used. For instance or in addition, users age, users accent, etc. In some embodiments, the vehicle can determine or predict what the user's native language is based on the type of accent, users language, users use of slang, user's level of confusion, user's ability to hear, etc. In some embodiments, the vehicle can conduct a hearing test for automatic calibration of interaction voice. The hearing test can include sound outputs from various speakers, various tones, graphic displays, or combinations thereof. In other embodiments, a user's current region, e.g., part of a country or world can be detected and used to make determinations and/or learn behavior or match behaviors from third parties. In some embodiments, historic GPS data can be used to determine if user lives in a certain area or just driving by. In these various examples, vehicles communicate with cloud processing to exchange data. In some embodiments, processing is conducted by the server or serves of cloud processing. In some embodiments, processing is conducted by electronics of a vehicle. In some embodiments, processing is conducted by a smart device in or associated with the vehicle. In still other embodiments, processing may be shared between the server and vehicle, the server and a user's smart device, or between or among multiple devices that are local and/or remote.

Figure 3:
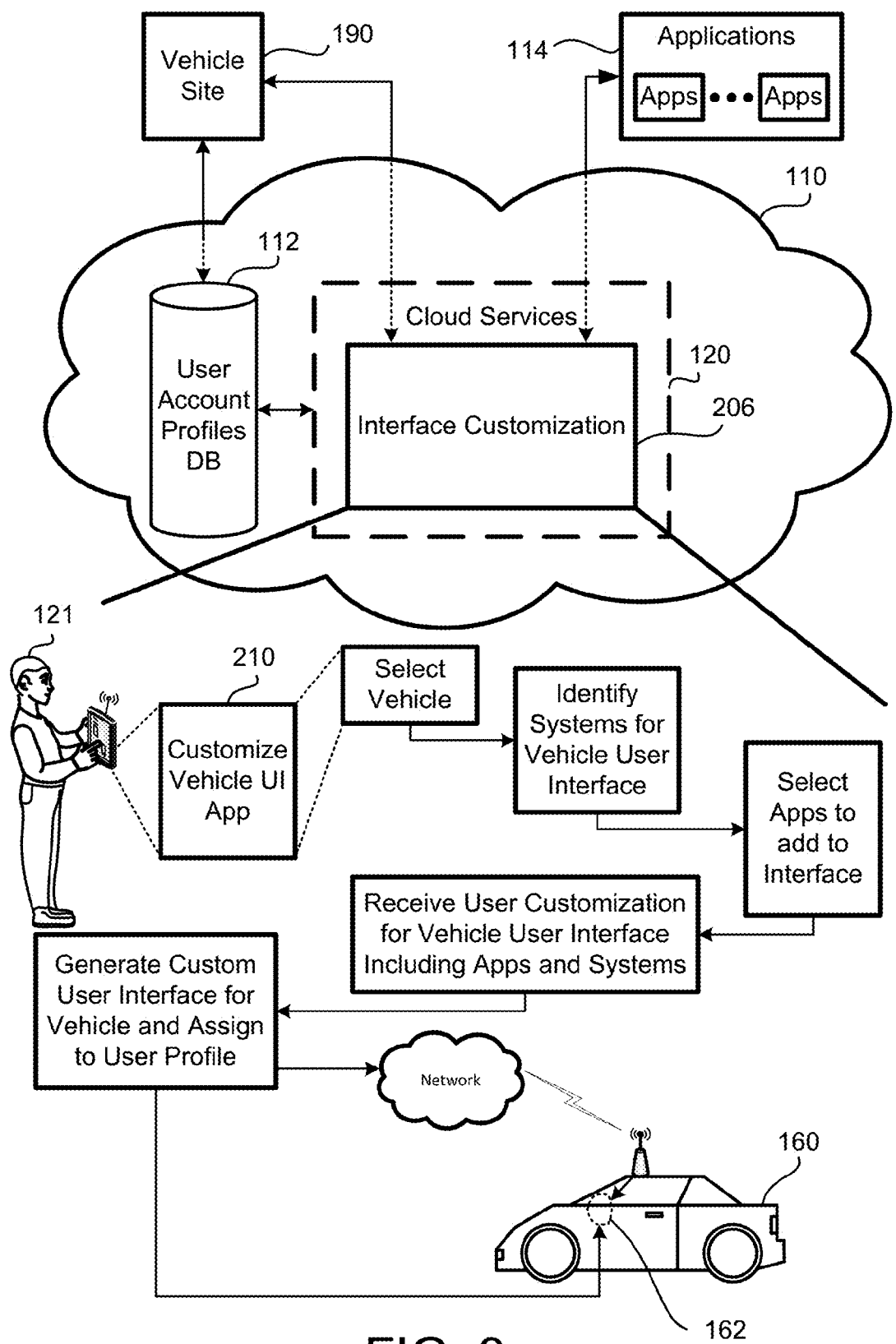
FIG. 3 illustrates a system and use diagram, of the configuration of the user interface, in accordance with one embodiments of the present invention.

FIG. 3 illustrates a system and use diagram, of the configuration of the user interface, in accordance with one embodiments of the present invention. As shown, applications 114 may be selected by a user that wishes to generate a custom configuration for a vehicle. In one embodiment, the user may go to a vehicle website 190 where the user may select a vehicle system component that matches the vehicle that the user wishes to customize In one embodiment, the user would establish a user account in a cloud service of the vehicle manufacturer, or a third-party site that provides customization features for the vehicle manufacturer.

The cloud services 120 may provide interface customization 206 tools that will allow the user to select the application 114, select the system component for the vehicle, and arrange the selected applications, arrangement of the applications on the display screen, settings for the different applications, etc., to thus define a custom configuration for the user interface. The custom configuration will then be saved to a user profile database 112, which saves the custom configuration and provides access to the custom configuration for updates from time to time by the user, or for updates provided by the vehicle manufacturer.

In one specific example, a user 121 can visit a website, an app, or a portal to customize a vehicle display 210 using tools provided by a website that allows the customization. The tools can include pull-down menus, selection icons, text entries, radio buttons, arrangement and customization feature selectors, program settings, etc. The user can access the website using any user device. The user device can also include setting the custom configuration via a vehicle 160. In general, the configuration can be made using any device that has access to the Internet.

In operation 220, the user will select a vehicle using the tools provided by the website. Selecting the vehicle will allow the correct selection of the system component for that vehicle, and any other updates or parameters defined by the vehicle manufacturer. The systems for the vehicle user interface will then be identified in operation 222. A tool than be provided to allow selection of the apps to add to the interface in operation 224. As mentioned in this disclosure, the user can select any number of applications to add to the custom configuration. From time to time, the user can select additional applications to add to the custom configuration or removed from the custom configuration. In operation 226, the user customization for the user interface will be received including the defined applications and systems.

In operation 228, the custom configuration will then be generated and can be assigned to the user profile of a user account, in a database(s) of websites handling the cloud services 220. In some embodiments, the website may be hosted in a distributed manner, using virtualization and distributed data centers. The distributed data centers can then communicate data and process operation to the vehicle to execute the applications and system components, and provide resources from third-party applications and applications over the Internet.

The generated custom configuration can then be transferred to the vehicle 160 and operated using vehicle electronics 161. Vehicle electronics 161 can also include a display. As mentioned above, the display can be a single display or a plurality of displays. The displays are configured to generate images for various screens, selections, icons, buttons, controls, and received touch input and communicate text information and other data to users.

Figure 4:
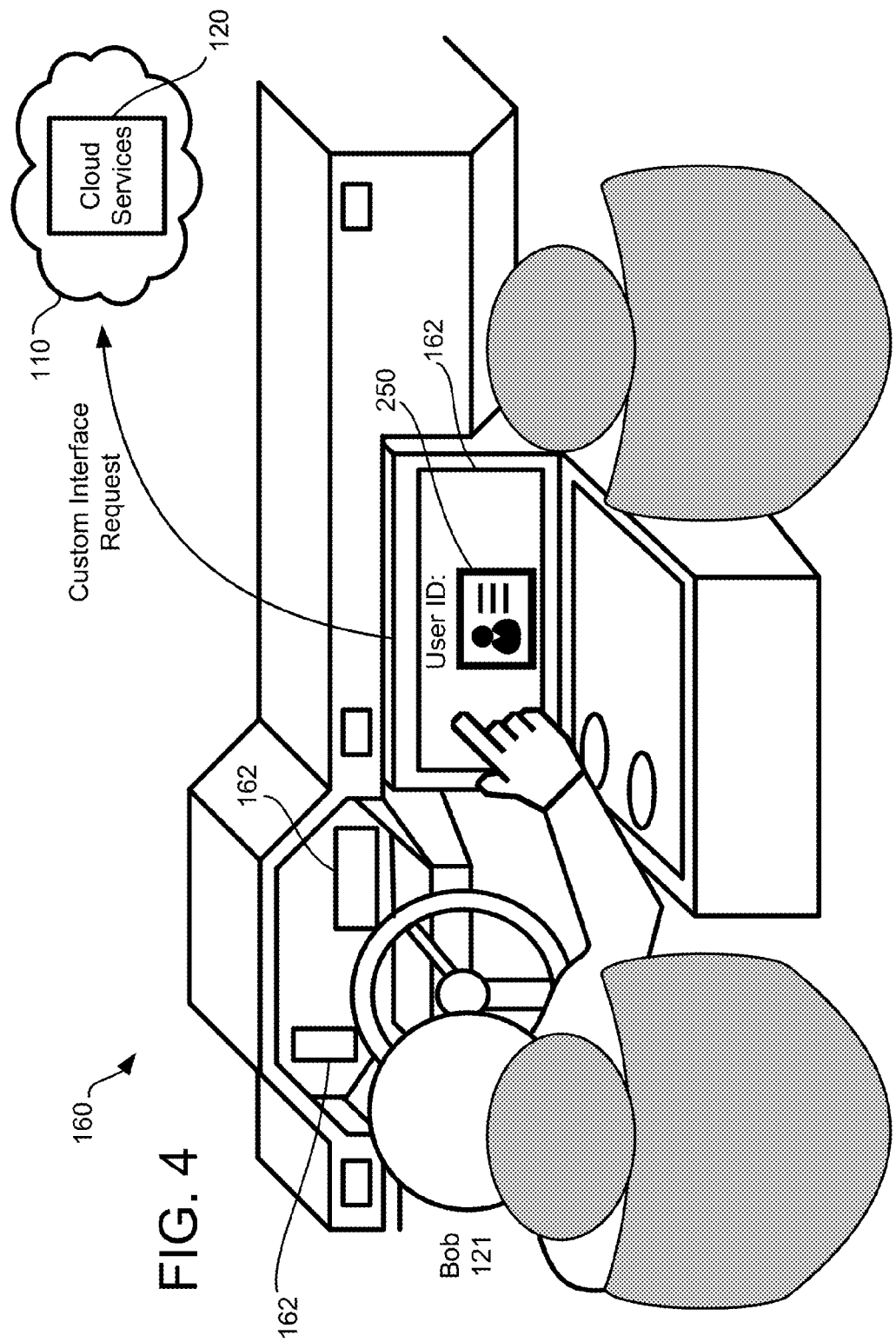
FIG. 4 illustrates an example of user interfacing with a display in the dashboard of vehicle, in one embodiment.

FIG. 4 illustrates an example of user 121 interfacing with a display 162 in the dashboard of vehicle 160. In this example, the display 162 will produce a user interface 250 that requests the user to input a user ID. The user ID can be any credentialing type input. The credentials can include usernames and passwords, keys, alphanumeric entries, biometric inputs, voice inputs, retina scan inputs, fingerprints, face recognition, etc.

In one embodiment, fingerprint readers may be integrated into electronics of the vehicle. The electronics may perform analysis of fingerprints for matching purposes generally by comparison of several features of the print pattern. These include patterns, which are aggregate characteristics of ridges, and minutia points, which are unique features found within the patterns. It is also necessary to know the structure and properties of human skin in order to successfully employ some of the imaging technologies. A fingerprint sensor, which may be integrated into a vehicle surface, vehicle interface, or the like, is an electronic device used to capture a digital image of the fingerprint pattern. The captured image is called a live scan. This live scan is digitally processed to create a biometric template (a collection of extracted features) which is stored and used for matching. Some technologies that are usable include optical, capacitive, RF, thermal, piezoresistive, ultrasonic, piezoelectric, and MEMS.

In one embodiment, retina scan inputs use scanners that are integrated into a surface of the vehicle. In one embodiment, the scanner may be integrated into a rear-view mirror of a vehicle, a dash-board of a vehicle, a steering wheel of a vehicle, or some surface that can have some directional light of sight toward a face of a driver. The human retina is a thin tissue composed of neural cells that are located in the posterior portion of the eye. Because of the complex structure of the capillaries that supply the retina with blood, each person's retina is unique. The network of blood vessels in the retina is not entirely genetically determined and thus even identical twins do not share a similar pattern. A retinal scan is performed by casting an unperceived beam of low-energy infrared light into a person's eye as they look through a scanner's eyepiece. This beam of light traces a standardized path on the retina. Because retinal blood vessels absorb light more readily than the surrounding tissue, the amount of reflection varies during the scan. The pattern of variations is digitized and stored in a database of the vehicle and/or a database of the cloud processing system. If stored on the cloud processing system, this identifier may be shared or used with a user account to access multiple vehicles, e.g., in accordance with permissions set in a profile of a user having the identified biometric.

In FIG. 4, user 121 will enter the user ID which would then send a custom interface request to cloud services 120, over the Internet. As mentioned above, vehicle 160 is connected to the Internet, or is connected to the Internet at particular times. When the vehicle 160 is connected to the Internet, the request can be sent to cloud services 120, to request the custom configuration for the user.

A user having an account with cloud services 120 will have previously defined custom configurations that may be downloaded or accessed without download for the specific vehicle. The vehicle ID would be sent to the cloud services 120 by the vehicle upon sending the request for the custom configuration.

Figure 5:
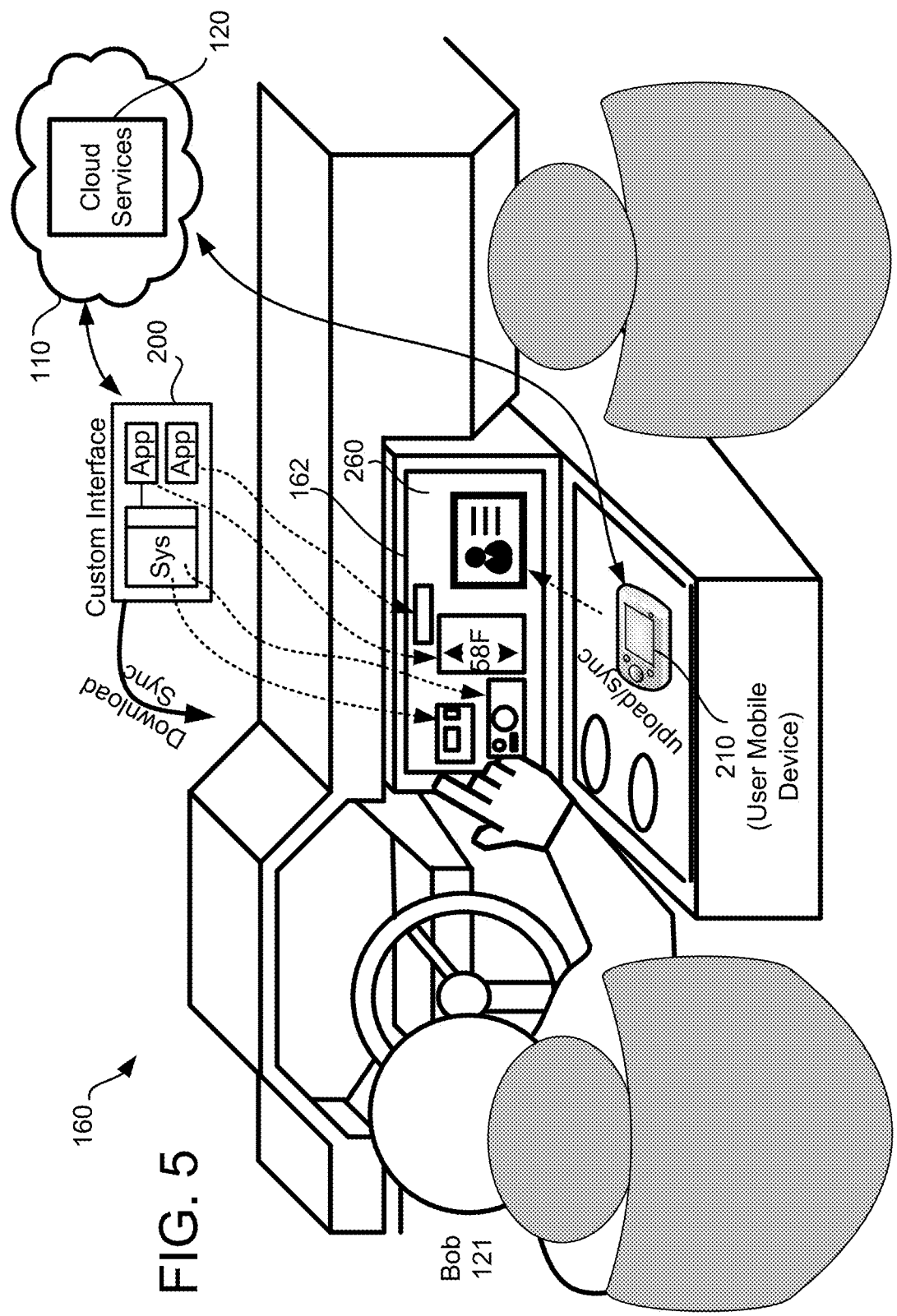
FIG. 5 illustrates how the custom configuration that provides the interface defined by the user is downloaded to the vehicle electronics and the display of the vehicle in one embodiment.

FIG. 5 illustrates how the custom configuration 200 that provides the interface defined by the user is downloaded to the vehicle electronics 161 and the display 162 of the vehicle 160. The display 162, as noted above, is only an example display, and display can be of any size and can include multiple displays. For simplicity, a single display is shown in FIG. 5.

In this example, the display 162 is populated with user interfaces for the system as well as the applications. As shown, app interfaces may be presented in specific locations in the user interface as well as system interfaces that are provided in other specific locations in the user interface. In one embodiment, the definition of where the specific user interfaces for the systems and the apps are to be defined is set by the user during the configuration process.

In other embodiments, the positioning and layout or arrangement of the specific components of the user interface, whether they are system interfaces or app interfaces, may be custom arranged by the system over time based on use patterns. The use patterns of the user can be learned by the system so as to arrange the various system components and app components in various locations of the display 162. In other embodiments, certain interfaces will be surfaced (e.g., shown or presented) on the display at certain times of day, certain times of the week, certain times of the month, certain times of the year, etc. Better placement of the app components and system components, and programming of data into the components can be optimized over time based on learning the input patterns provided by the user to user interface.

For example, if the user always views the weather in the mornings at 8 o'clock or 9 o'clock and a.m., then the weather icon or interface will automatically start to be surfaced (e.g., show or displayed, or illustrated (visually or audibly) on the display during those times. If the user plays rock'n roll rock music on the weekends and classical music during the weekdays, this preference will also be learned. Learning of these preferences will act to custom define the layouts and placement of the icons and user interfaces on the display over time. In still other embodiments, the specific placement, location, and arrangement of the apps, system components, buttons, controls, etc., will be preset and fixed by the user based on predefined settings.

These predefined or learned settings can be saved to the database in cloud services and associated with the user account. Updates to the settings can then be made at any time by accessing cloud services over the Internet using any device, whether the devices are in the car, of the car, a portable device, a home computer, a work computer, a tablet, a smart phone, a smart watch computer, etc. Also shown in FIG. 5 is an embodiment where a user's smart phone or mobile device is synchronized with the user interface of the vehicle 160. In this embodiment, the user's portable device 210 can synchronize and upload content and UI controls from applications stored and running on the portable device 210. This provides for safer driving, as the controls shown on the vehicle display can be restricted based on driving or operation status.

In one embodiment, the user can custom configure to have content from applications running on the portable device 210 to be displayed in the vehicle displayed 162 in a specific location. This location on the display can then be synchronized or mirrored to that part of the display based on the configuration. In still other embodiments, the custom configuration can determine to synchronize an application running on the portal device to occupy the entire display 162. For example, if the user wishes to use his own telephone calling interface and contacts that are stored on the portable device 210, that information can be populated and mirrored to the display device 162, while still using other system components or other applications of the vehicle in the background or in a separate screen that is not currently active. In this example, the portable device 210 as well as the vehicle electronics 161 can communicate with cloud services 120 at the same time, or when specific functions, data or communication is required.

As noted above, systems can be configured to enable local communication with mobile devices that may be in the vehicle. The embodiment may be provided by allowing synchronization with the computing system of the vehicle, or with the computing communications of the portable device. For example, the local communication can be paired automatically, based on a preset pairing process where pairing keys are entered or present. This provides for automatic settings and synchronization when the user enters the vehicle with the portal device. In some embodiments, user interfaces associated with applications loaded on the user's portal device can also synchronize to the display screens of the vehicle, as predefined by the user.

Figure 6:
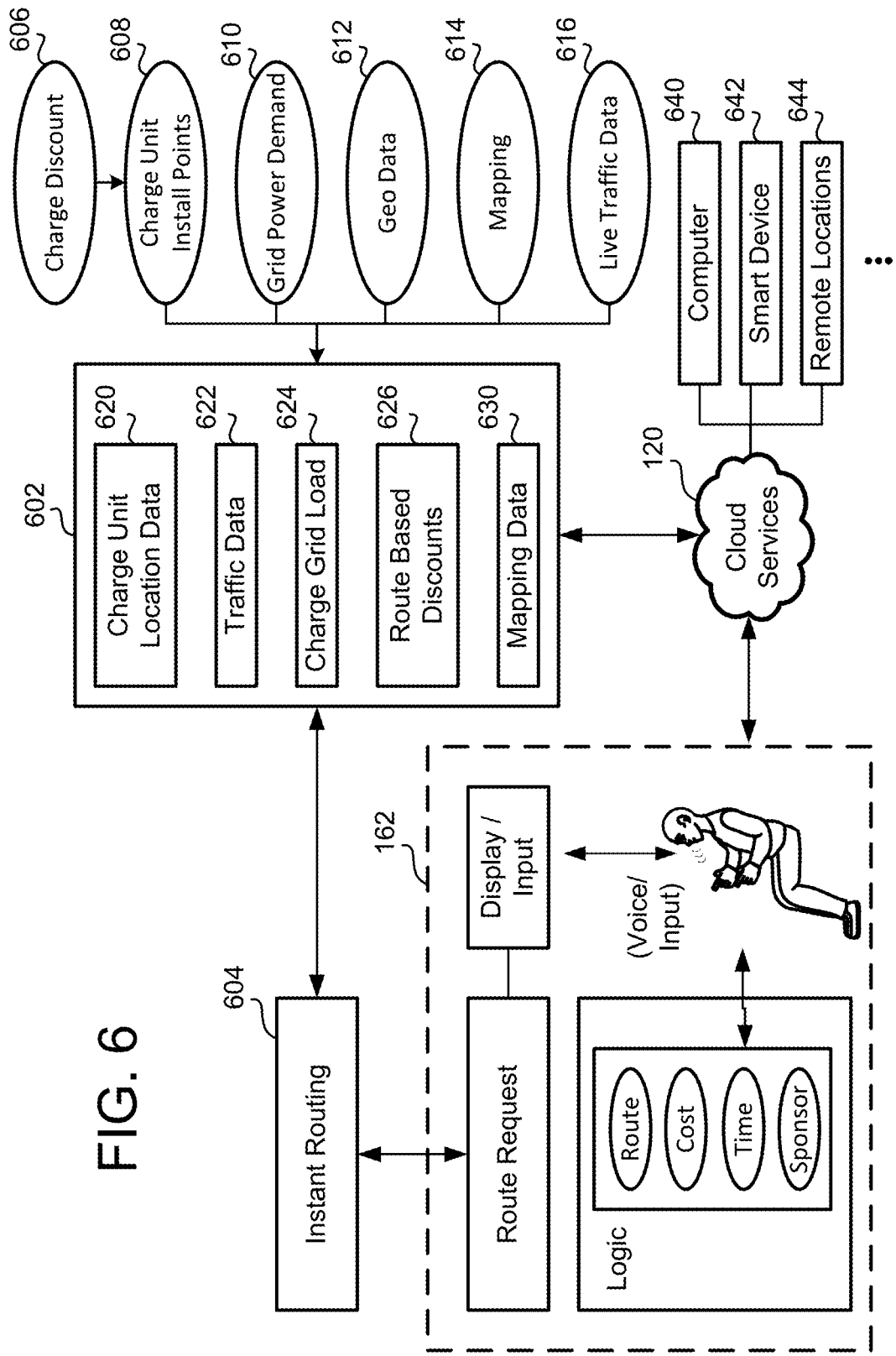
FIG. 6 illustrates an example of synchronizing other applications to a vehicle display, which may be customized by the user, for one embodiment.

FIG. 6 illustrates an example of synchronizing other applications to a vehicle display, which may be customized by the user. As shown, 602 shows a number of data collection and data interface modules, that can interface with third-party applications or applications executed on the Internet by cloud services or third-party cloud services. As shown, in the case of an electric vehicle, data associated with charge unit location data 620 can be collected from charge unit install points 608. The charger unit install points can also be providing charging discounts 606, which can then be transferred to data manager 602. Traffic data 222 can also be collected, whether the vehicle is electric or nonelectric.

Charge grid load 624 data can also be collected, for example for electric vehicle data. Charge grid load 624 can obtain data from a grid power demand source 610, which can include power company's local utilities and the like. Route based discounts 626 can also be provided to the user, by collecting mapping data 614 as well as discounts provided by goods and services providers in the marketplace. Mapping data 630 can also be managed, to monitor the location of the vehicle in relation to goods and services that may be provided when the vehicle is in proximity In some embodiments, discount data, advertisements, sales, goods and services offers, etc., can be provided to the user automatically based on the vehicle's location.

In other embodiments, the user can provide settings in the user interface that identifies which type of offers or discounts or information the user wishes to receive. In some embodiments, alerts regarding offers and discounts can be provided to the user in an audio manner, to avoid driving distractions. Live traffic data 616 can also be provided to the data manager 602, as well as geo-data 612. The data manager 602 is in communication with cloud services 120, to provide these services to computer 640, smart devices 642, remote location 644, and a display of the vehicle 162.

The display the vehicle can be interfaced with logic that runs on vehicle electronics 161. The vehicle of products can include memory and processors that execute instructions, operating systems, API processing, application management, telecommunications, network accessing, local communication with wireless devices, and general communication with the Internet. Route request can also be provided at the demand of the user via the display 162, and instant routing 604 can provide routes to the user based on data collected and managed by data manager 602.

Figure 7:
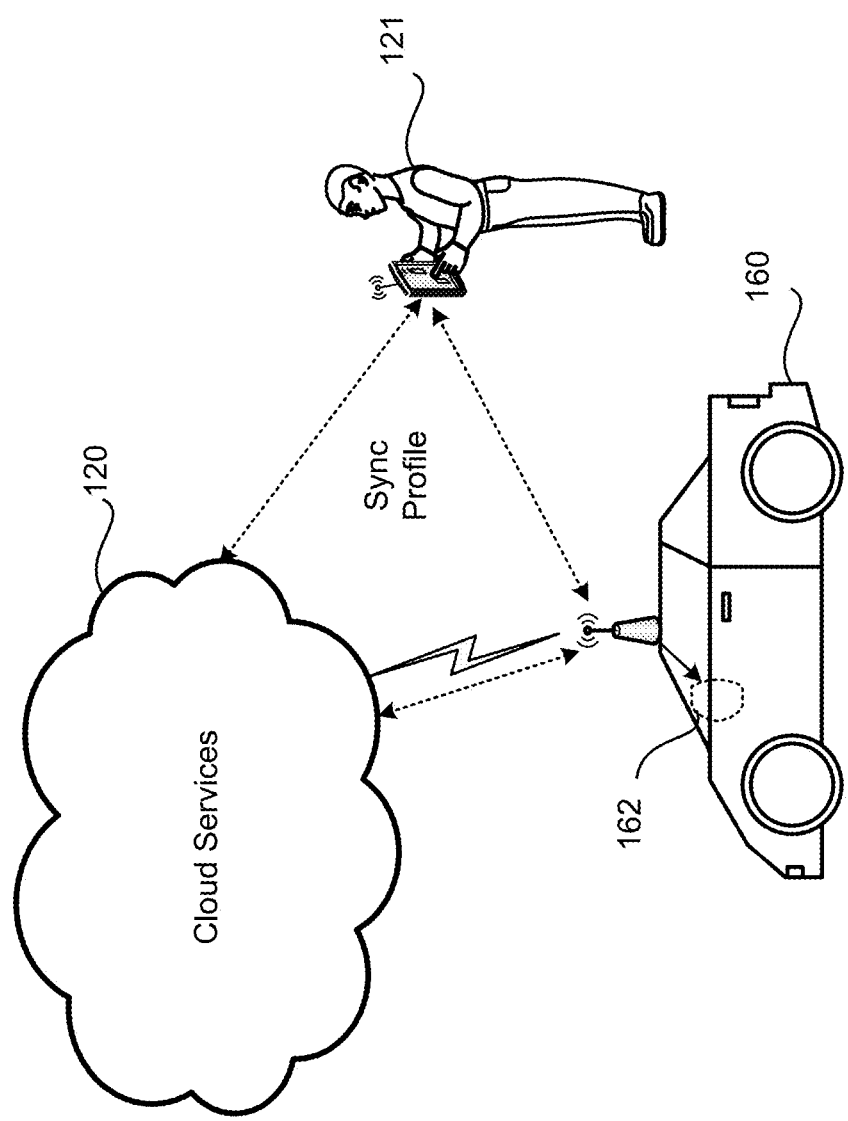
FIG. 7 illustrates example where the user holding a portable device can synchronize data from the portable device directly with the display of the vehicle, in one embodiment.

FIG. 7 illustrates example where the user 121 holding a portable device can synchronize data from the portable device directly with the display 162 of the vehicle. The display the vehicle can be a display on the dash of the vehicle, or any other location as mentioned in this disclosure. As mentioned herein, the vehicle electronics 161 will be provided with communication with cloud services 120 provide access to the customize displays, customize settings, and customized services provided to the user as a vehicle drives.

Figure 8:
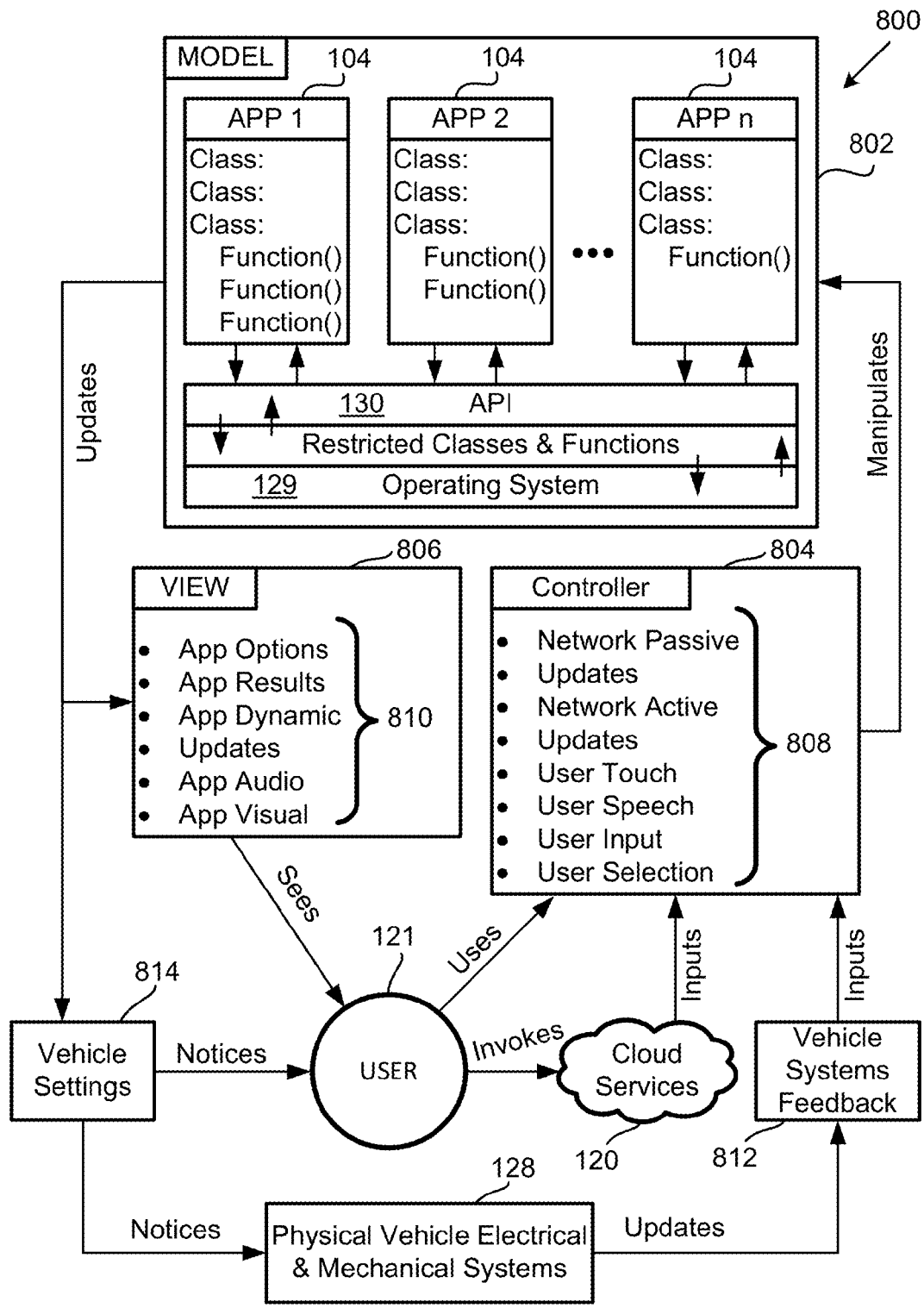
FIG. 8 describes a system in which a user interacts with a model view controller software environment useful for processing APPS using APIs on vehicles with vehicle operating systems capable of processing computer code, in accordance with one embodiment.

FIG. 8 describes a system in which a user interacts with a model view controller software environment 800 useful for processing APPS using APIs 130 on vehicles with vehicle operating systems 129 capable of processing computer code. The model view controller paradigm 800 shows basic interaction, control, processing, and updating of data useful for manipulating and viewing resulting actions by to vehicle running an APP in such a system. Such a system useful for running APPS on vehicle operating systems will accept inputs by a user 121, cloud services 120 via data streams, vehicle systems feedback and data streams 812 used by a controller 804 that may constantly poll electrical, capacitive and physical sensors, and input streams to detect if interactions 808 such as network passive updates, network active updates, user touch, user speech, user input, user selection among others has been triggered.

Each input 804 will then trigger manipulation of the system's model 802 portion of the APP software paradigm thus invoking stored routines within APPS 104 which then in turn interact with the vehicle's API system 130 built upon the vehicle's operating system 129. Depending on the app presented to the user 121, the input may trigger stored routines or functions on APP software or operating system level restricted stored routines or functions.

After the processing of stored procedure code is manipulated with arguments provided by the controller 1804 inputs, visual and or sensory results are presented to the user in the view 1806 portion of the model view controller paradigm. These sensory outputs, data streams, electrical signals may all be translated as additional options, results, dynamic updating, and audio or visual graphical user interface changes 810 on any of the user's connected display devices. The user will notice these results visually or audibly but may also feel or detect changes in the vehicle's mechanical systems. Updates from the model 802 may also be used to toggle vehicle settings 814 which in turn may invoke changes in the vehicle's physical, mechanical and electrical systems 128.

Then, the system controller 804 may receive additional updates from the vehicle systems affected or additional user 121; cloud services 120, vehicle systems feedback inputs 812 to re-engage the user in a cyclical fashion. If no inputs are sensed, the system's controller will continue to poll it's electrical and data I/O systems for input on a continuous basis.

The model view controller paradigm 800 described is one example of the software input output lifecycle that may be used to invoke, manipulate, process, update portions of computer readable code such as APPS 104 using an intermediary API 130 to communicate with the vehicle's operating system 130. However, APPS 104 may be run on physically wired, wirelessly connected or remote devices having processing abilities to translate the computer readable code in APPS into actionable invocations on one or more vehicles in order to facilitate or utilize the vehicle's electrical and mechanical systems in prescribed or customizable fashions.

Figure 9A:
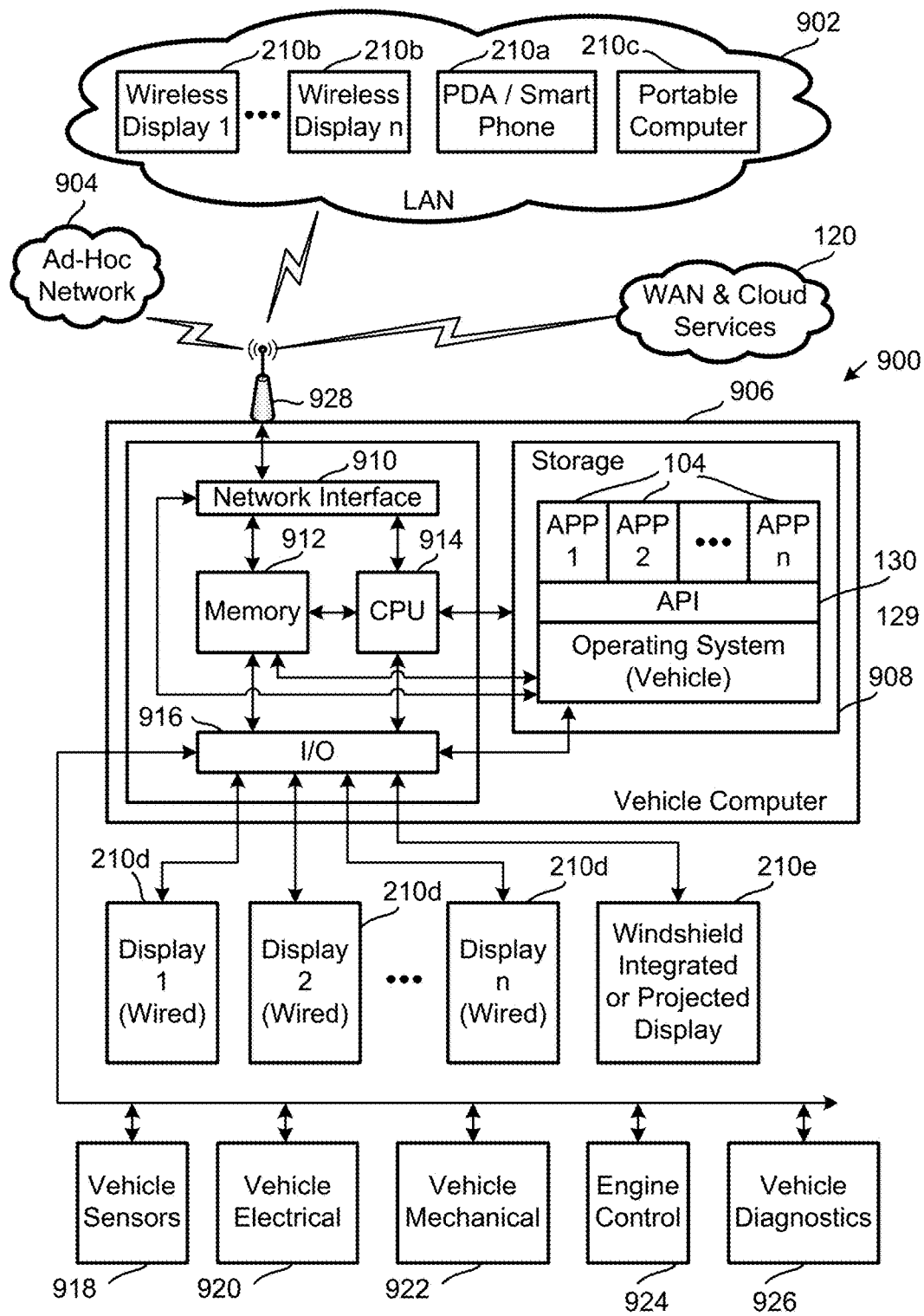
FIG. 9A describes how vehicle on board computer with input out/put system useful for accepting input, processing input and displaying results in conjunction with stored computer readable programs or functions in the forms of APPs may be structured, in accordance with one embodiment.

FIG. 9A describes how vehicle on board computer with input out/put system 1900 useful for accepting input, processing input and displaying results in conjunction with stored computer readable programs or functions in the forms of APPs 104 may be structured. Although system 900 describes one way to provide vehicle on board computing power to run APPs 104, the arrangement of the vehicle computer 906 may be altered or arranged in differing fashions with differing connection routing in order to achieve the same. In this example, vehicle on board computer 906 may be comprised of components such as the network interface 910, memory 912, a central processing unit 1914, an input output buffer useful for streaming data 916, storage 908 having the ability to store computer data in long term or short term fashion useful for stored computer code procedures in the form of an operating system 129, intermediary stored procedure code in the form of APIs 130, stored subsets of computer code procedures APPs 104 interacting with API 130 as an intermediary to the operating system 129.

In this example, the vehicle computer 906 has the ability to transmit, receive and process information using wired or wireless connections. One such wireless connection is provided by a wireless data sending and receiving antenna 928 connected to a network interface 910 useful for pairing with and communicating data with portable or stationary wireless devices which may or may not be part of a network 902. Such wireless devices include but are not limited to wireless displays 210b, portable smart phones 210a, portable computers, 210c and even stationary objects, structures, buildings, toll bridges, other vehicles etc. The vehicle's network interface 910 through antenna 928 may also communicate with cloud services 120 to receive instructions from a remote location that invokes stored programs such as APPs 104 on the vehicle's computer.

The vehicle may also send and receive data wirelessly in order to establish a connection with a peer-to-peer ad-hoc network. Invocations may result in output data streams interpreted by wireless devices 210b, 210a, 210c as well as wired devices such as wired displays 210d or vehicle integrated display devices such as windshield heads up projected display or integrated glass displays 210e. All data streams generated by APPs 104 stored on the vehicle's computer may also be triggered by wired devices such as vehicle sensors 918, vehicle electrical systems 920, vehicle electrical systems 922, engine control systems 924, vehicle diagnostics systems 926, user input as well as environmental input.

A user and or vehicle may find system 900 useful in one example, where the user drives the vehicle past an electronic toll bridge where a fee is required to pass the toll bridge. The vehicle's computer will communicate wirelessly as it passes the stationary structure transmitting and receiving information with it as it drives by. The user's vehicle may have an APP 104 installed on the vehicle computer 906 that can process the input using the computer's wireless antenna 928, network interface 910, input output system, 916 automatically responding to the toll bridge with payment information. Once the payment is received and processed, the APP 104 receives information from the stationary wireless toll taking device which is then stored either locally on the vehicle's storage 908 or remotely using cloud services 120. The results of the transaction are then sent via data stream from the compute code running on the APP 104 to a display device(s) where the user can visually confirm that the toll was paid, accepted and show the user's remaining balance all through the GUI displayed for APP 104.

FIG. 9B describes one example of how stored data and function declarations may be compiled to provide intermediary access to a vehicle's computer controlling vehicle systems 950. Such routines, data and functions may be arranged in such a way that limited access is given to third party code on APPs 104 to manipulate certain unrestricted operating system functions and vehicle systems. Such a method of providing the intermediary allowed stored function set to third party code can be referred to as an API 130.

In this example of an API 130, computer readable code is arranged in such a fashion that the type of API is described and in this case, an API that allows third party control of the vehicle's HAVC system is declared. A declaration may be useful for reserving the vehicle's computer long term and short-term memory in order to run stored procedures. The shown declaration 954 describes an example set of data that may reference memory locations and their contents. The contents of this memory location may be modified by stored procedures 956 or functions.

This HVAC API 130 has the ability to store data relating to the vehicle's temperature, status, target temperature, split zone temperate, data from electrical and mechanical sensors, calendar dates, and error information among others. Invocable functions 956 are the methods by which a third party APP 104 may manipulate data 954 on board a computer. Free access is not given to the restricted data on a vehicle's computer, thus a structured method or methods are described for user by third party APP developers. These functions 956 that may or may not take arguments in order to execute may include functions in the example HVAC API that update temperatures for both the left and right or given zones of the vehicle, toggle are conditioning, allow visual skins on the APP GUI, manipulate schedules and displays etc. The HVAC API 130 described is one example of how one API can control one vehicle system. There may be variations of the APIs for multiple vehicle systems or one superset API that allows access to all of the vehicle's systems through stored procedures or methods.

FIG. 9C describes a set of computer readable and executable code 970 that can be compiled together by a third party APP 104 developer in the form of an APP. The APP 104 uses structured programming languages to execute stored functions allowed by the vehicle's system API 130. In this example, the APP is a third party HVAC app that allows a GUI to be displayed to a user giving them the option to adjust the temperature on the left or right side of the vehicle up or down. In this case, the APP's GUI has provided a data stream to the APP letting it know that the user has selected to set the temperature on the left side of the vehicle to 80 degrees and the right side of the vehicle to 76 degrees. The APP 104 will then use functions available from the vehicle's API 130 to manipulate the data on the vehicle's storage system which in turn will be electrically polled by sensors, data streams etc. to manipulate the vehicle's electrical and mechanical HVAC systems. The user will notice the result visually by the data provided by the APP to the GUI as well as environmentally as the temperature is changed in the vehicle.

Figure 10:
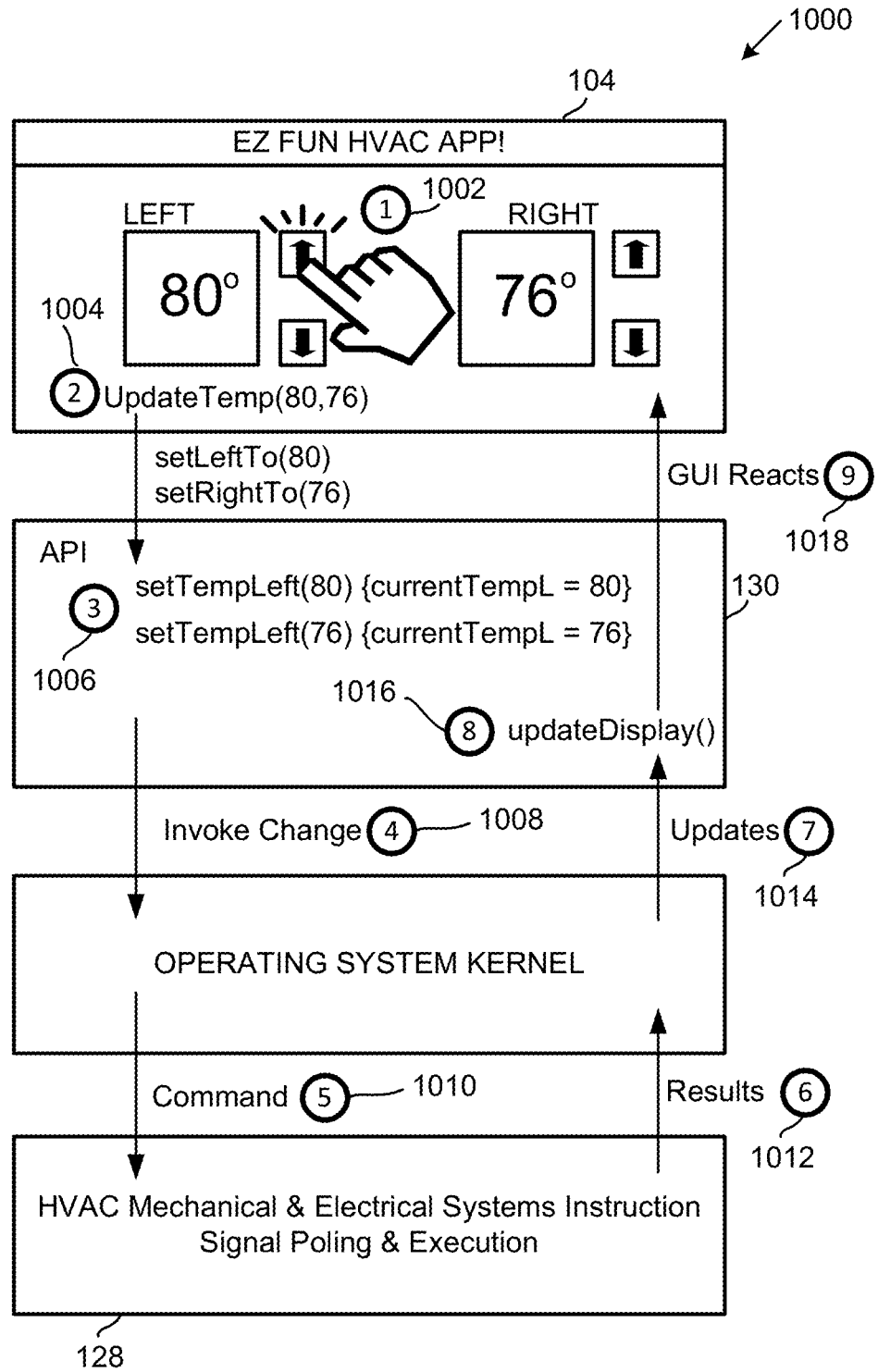
FIG. 10 describes the stepped flow of events as a user interacts with an APP, in this case, an HVAC APP, in accordance with one embodiment.

FIG. 10 describes the stepped flow of events 1000 as a user interacts with an APP 104, in this case, an HVAC APP 104. The GUI shown for APP 104 describes the first step 1002 where a user physically interacts with a sensor, screen, voice system etc. polling to see if an input has been received. The user's input in 1002 has been interpreted by the app to raise the temperature on the left hand side of the vehicle to 80 degrees and maintain the temperature on the right hand side of the vehicle at 76 degrees. This input invokes step 1004, which calls a stored function on the APP 104 that is API 130 allowable with arguments.

The stored function may invoke other helper or associate functions within the API 130 in step 1006, which all in tern invokes restricted computer readable code at the operating system and or kernel level in step 1008. These invocations will then in turn command mechanical and or electrical systems in step 1005 in order to achieve the requested response in step 1002. The results of the commands on the vehicles systems are based back to the vehicle's operating system or kernel level in step 1012 which then updates data on the API 130 in step 1014 that the APP 104 is polling, such as updating the display to show the resulting temperature in step 1016. The results of a function that is invoked at the API 130 level updating the display produces a data stream translatable and displayable by the vehicle's screen showing the APP 104's GUI in 1018.

Figure 11:
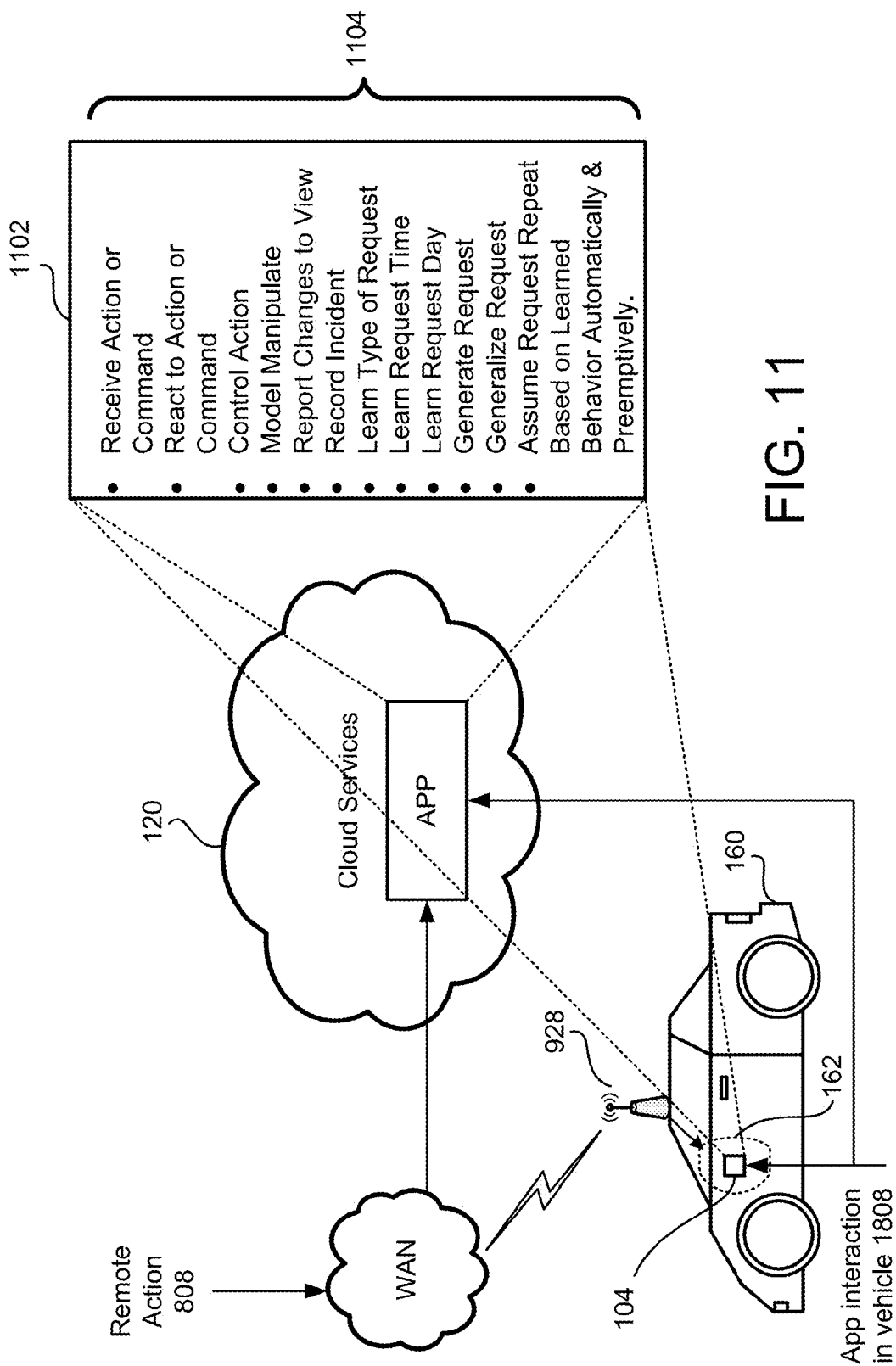
FIG. 11 Describes further ways an APP may take, process and produce results, in accordance with one embodiment.

FIG. 11 describes further example ways an APP 104 may take, process and produce results 1100. FIG. 10 shows a way to interact with an APP 104 locally but a vehicle computer system may relay data, inputs and information to the APP while connected to a wide area network, local area network, cloud process 120 or private cloud. A remote action to invoke change on an APP 808 may be initiated via a network and pass to the APP running on the vehicle 160 using the vehicle's antenna 928 or wired interface. An APP 104 running virtually on a network or cloud services 120 may also take input remotely and process the results accordingly.

Some of the inputs and results 1102 that an APP can take and produce locally or remotely include but are not limited to the set 1104 that can receive an action, react to an action, control an action, manipulate data models, report changes to a view or GUI, record events or incidents, learn the types of requests being submitted, learn the times of request being submitted over time, learn the days of the year the requests are being submitted over time, generalize and interpret requests, assume user intent in order to automatically invoke changes, automatically and pre-emptively act on behalf of a user, fine tune learned user behavior etc.

The learned behavior (e.g., learned settings that provide for automatic programming) can be assigned to particular applications, particular sub-features of applications, to particular native system features of the vehicle, or combination of one or more thereof. The learned settings can also be managed via an interface, which shows to the user settings that have been learned and provides the user with options to modify learned settings. The modifications of the learned settings can be made via the vehicle display or any other device having access to cloud services. The learned settings can also be communicated to the user via notifications. Such as, "We noticed you like your truck temperature at 3 pm to be 60 degrees? Please confirm," or "We noticed you like your car temperature at 8 am to be 75 degrees, this will be preset for you automatically," or "We have detected your favorite settings, please login to your account to see settings we have programmed for you or make updates," or other similar notifications via the vehicle or to any connected device over the Internet.

In other cases, notifications may not be sent. In some cases, the settings will just occur automatically. In some cases, the settings can be manually adjusted by the user way from the auto settings. In such cases, the manual setting can be learned and can be provided more weighting since the user took the time to correct an auto setting. Thus, various levels of weighting or importance can be given to learn settings.

Figure 12:
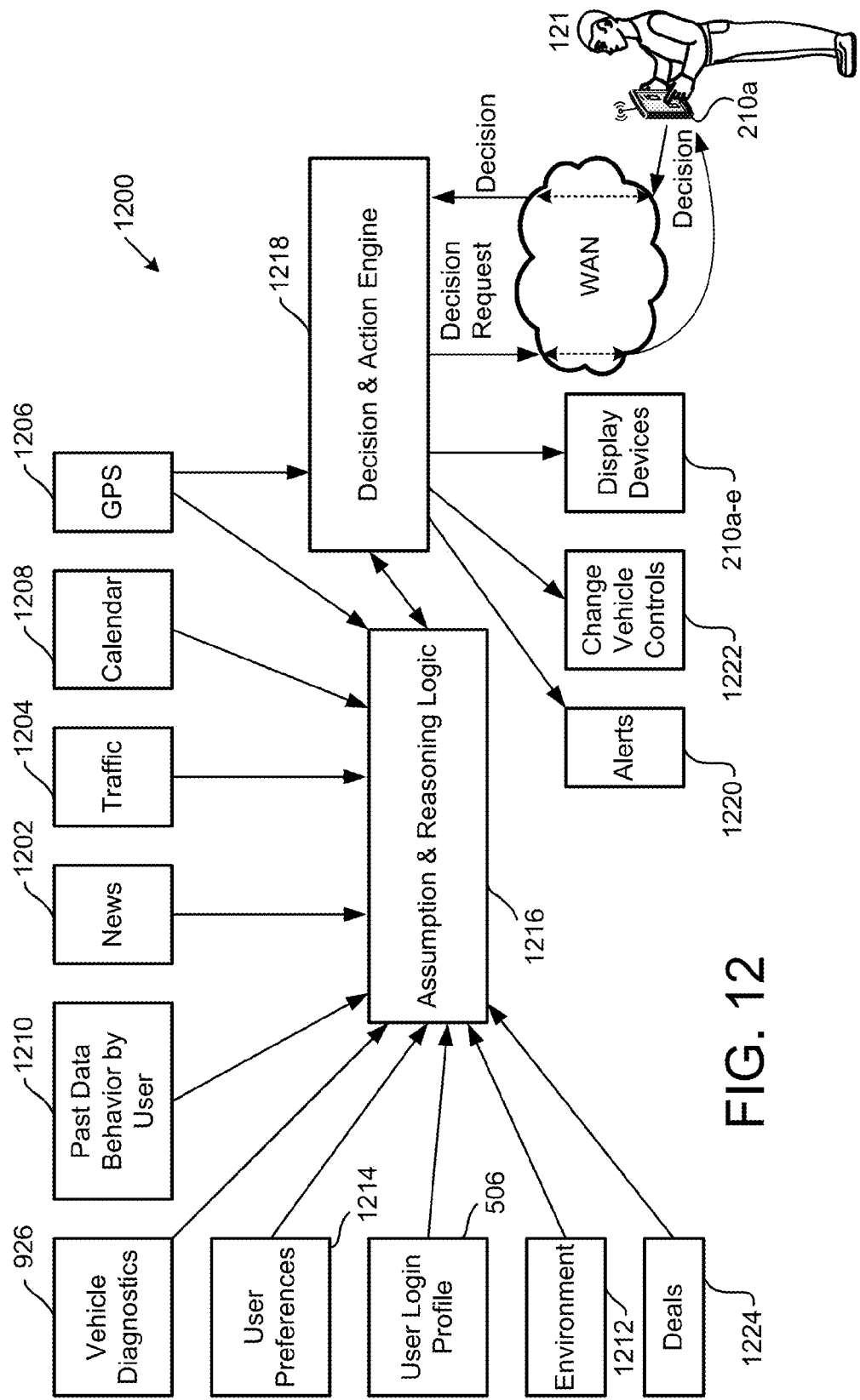
FIG. 12 shows assumptions and reasoning logic useful in providing information to a user or vehicle in response to multiple points of data, history of use, preferences, and combinations thereof, in accordance with one embodiment.

FIG. 12 describes an ecosystem where an APP 104 in conjunction with a vehicle API 130 may work together to make assumptions, make decisions and take actions 1200. API and APP code together can be arranged in such a fashion that creates an assumption and reasoning logic module 1216. This Assumption and reasoning logic module can take inputs from various systems and data streams including but not limited to GPS 1206, calendars 1208, traffic conditions 1204, local news 1202, past data of user behavior and interaction 1210, vehicle diagnostics 926, user preferences 1214, user login profiles 506, environmental interpretations by sensors 1212, marketing deals 1224 among others. These inputs can be local and physical or remote and abstract via a network. The assumption and reasoning logic module 1216 compiles data from these sources to invoke decisions and actions on a decision and action engine 1218.

This decision and action engine 1218 has the ability to execute on what the assumption and reasoning logic module has determined needs to be done. The decision and action engine has the ability to produce alerts, both local, on screen, audibly, visually or remotely on a remote display device 210a-e using a data network. The decision and action engine 1218 also has the ability to change vehicle controls automatically on behalf of a user without user action based on assumptions made by the assumption and reasoning logic module 1216. Additionally, the decision and action engine has the ability to request a decision from the user preemptively in order to change vehicle controls.

This may be achieved locally or remotely requiring input from a user to proceed. For instance, the assumption and reasoning logic engine has determined that the user may want to have his or her car automatically started at 7:55 am because the user typically starts the car at 8 am. Starting the car at five minutes early will allow the system to heat the vehicle to the user's typical liking. However, the assumption and reasoning logic may have only reached a level of confidence of 75% where 80% confidence is required to act without user input. Thus, the system, being only 75% sure that the car should be turned on will automatically send the user an alert requesting a decision on whether or not to turn the vehicle on. Once the user 121 provides a decision remotely on their remote device 210a, the decision engine 1218 updates the assumption module 1216 so that it can augment its assumptions for an updated level of confidence on the next action trigger. These actions by the user automatically and continually update the assumption and reasoning logic module 1216 in order to fine tune the level of confidence on acting without user input and learn the user's behavior for future decisions.

Figure 13:
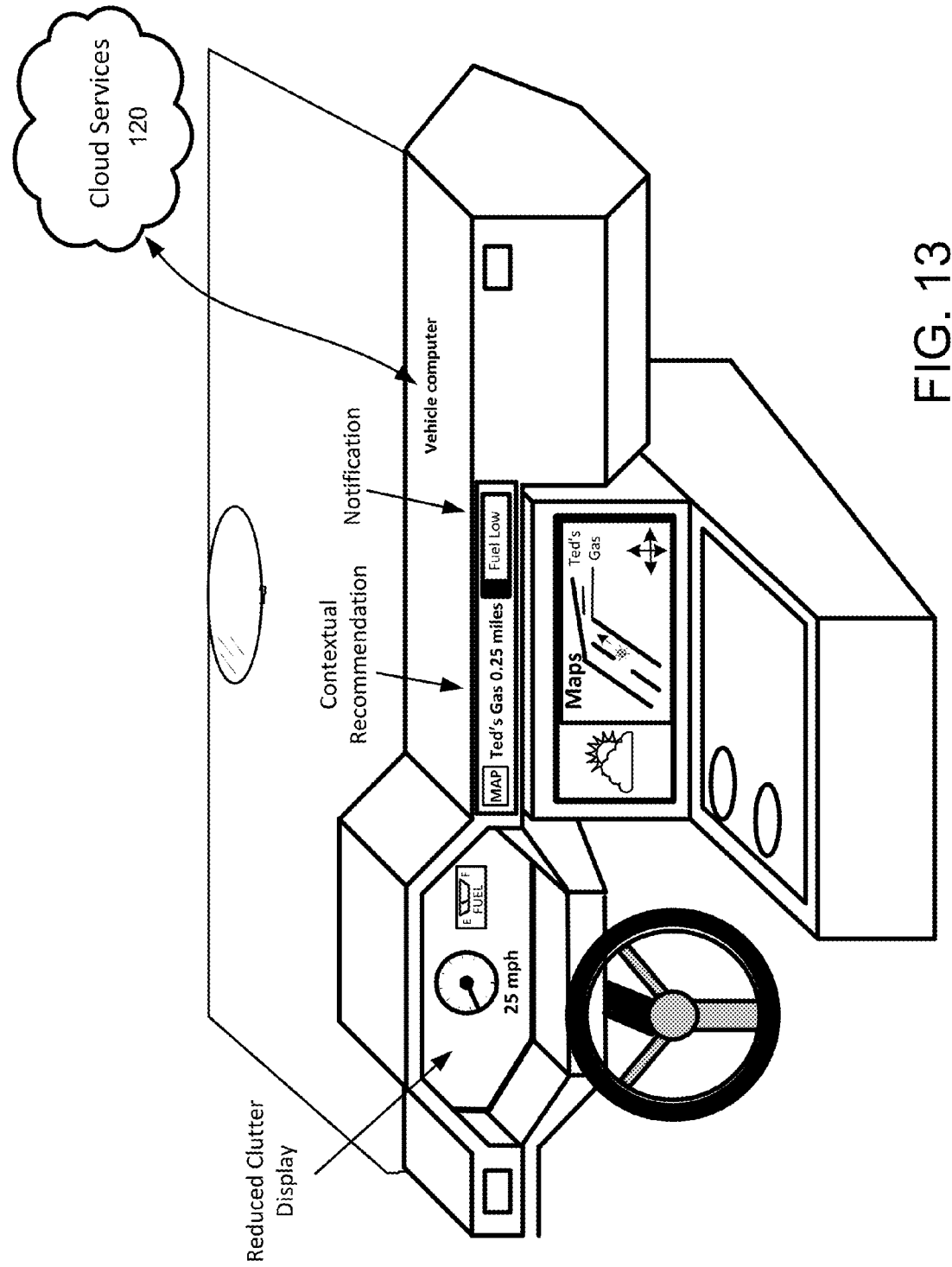
FIG. 13 illustrates an example of a vehicle dashboard having a reduced clutter display, contextual recommendations and notifications provided to the vehicle computer from cloud services, in accordance with one embodiment.

FIG. 13 illustrates an example of user interfaces and interaction modes provided on or for various displays of a vehicle, in accordance with one embodiment of the present invention. In this example, the vehicle is shown communicating with cloud services 120, utilizing the vehicle computer. As described above, the vehicle computer can include communication circuitry to enable wireless communication with the Internet and servers that can provide cloud services 120. In this illustration, the user interfaces or displays of the vehicle are shown with graphically rendered gauges, information, and data that may be relevant to the user of the vehicle.

In one embodiment, the user the vehicle may log into the vehicle or be paired to the vehicle automatically so that a user account of the user provides the preferences of the user for displaying select information and communicating with cloud services 120. Cloud services 120 can communicate with other Internet data sources, and cloud applications of the user, such as calendars, appointment books, reservations, websites, merchants, mapping applications, discount providing applications, charge location services, payment services, parking services, vehicle avoidance services, etc.

Continuing with the example of FIG. 13, the user interface provided in the main dashboard in front of the steering wheel has been rendered for the user account of the user in accordance with the user's interaction mode selection. As will be described below, the interaction mode selection will allow the user to either custom configure or select from custom configurations the type of information that would be rendered on the displays of the vehicle or provided via audio output of the vehicle. In this example, the interaction mode for the user account is one that has been selected to reduce the amount of clutter provided in the main dashboard interface.

As used herein, dashboard clutter or display clutter refers to when too many gauges, icons, information, GUIs, meters, text, pop-ups, colors, designs, animations, etc., are rendered on the displays, and which may cause distraction while the user is driving. Reducing the amount of clutter is a feature for vehicles that provide interactive displays that can populate so much information that a driver may become distracted. In one implementation, the level of information that may cause distraction will vary, as this is a subjective metric that is personal to each user/driver. In some embodiments, the amount of information provided to the displays can be dynamically changed based on the condition of the driving or non-driving of the vehicle. For instance, if the vehicle is not being driven, more information can be rendered on the displays for the user.

If the vehicle is parked or at a stop sign or stop light, more information may be rendered on the displays. When the vehicle is operationally moving, less information would be rendered on the displays so that clutter can be reduced. In one embodiment, more or less information or icons or gauges may be displayed or shown on the displays in a fade in and fade out fashion, so that the instant appearance of gauges will not be distracting sight for the driver. In one embodiment, when reduce clutter displays are provided, basic gauges for operating the vehicle or required by law will be required to stay viewable in the displays while the vehicle is being driven or is in operation. For example, a speedometer gauge is required or is vital to the driving of the vehicle, and therefore such gauges would not be removed or not shown when reduce clutter displays are selected. It should be understood that reduced clutter is subjective, and the interaction modes provide for different types of modes and modes that can be customized or customized over time, such that the level of information is not distracting to the particular user, from a personal and subjective view point.

In one embodiment, the information that is provided on the displays can be dynamically set based on the context of the vehicle's state, the user's calendars, the weather, and other factors. In one example, the fuel gauge shown in the main dashboard display of the vehicle in FIG. 13 is shown to include a fuel gauge. The fuel gauge in this example is shown to have appeared on the dashboard display because the vehicle's state is that the fuel is low and requires refueling. In one embodiment, the vehicle computer can be communicating with cloud services 120, which will automatically identify information regarding available fueling stations nearby.

For example, one of the displays of the vehicle shown in FIG. 13 illustrates that contextual information can be provided as a recommendation, which identifies that a gas station is within 0.25 miles of the current location of the vehicle. In addition, a mapping service or map program of the vehicle can be automatically displayed on one of the displays of the vehicle showing the location of the gas station (e.g., Ted's Gas). Accordingly, the information being displayed on the vehicle is contextually related to the state of the vehicle, the location of the vehicle, and applications are automatically loaded and provided for generating information relevant to the vehicle and its state.

Figure 14A:
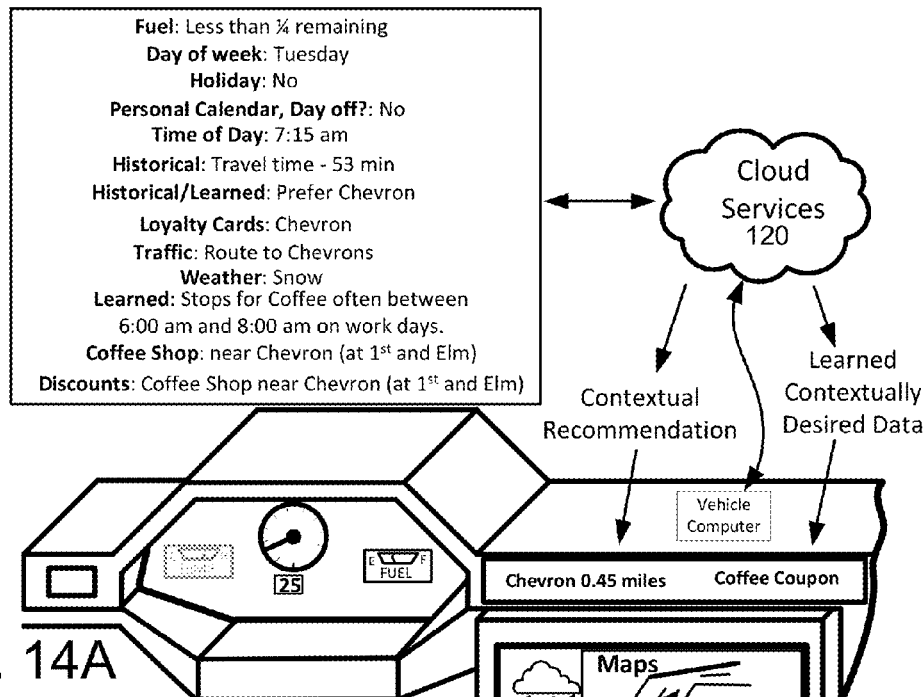
FIGS. 14A-15 illustrate examples of contextual information analysis for information that concerns operational states of the vehicle, personal information associated with the user, learned patterns or behaviors of the user, the time of day, geo-location, and other dynamically changing parameters that are synthesized to identify contextual recommendations that are displayed to the user's interfaces and automatic launching of applications and content in applications based on information that is believed to be needed at the time and at the location and for the user and based on other factors, in accordance with one embodiment.

FIG. 14A of displays of a vehicle, which are cost to interactively show display items based on the context of the vehicle and the context of the user and preferences of the user. In one embodiment, the preferences of the user can be learned over time by examining use patterns of the user, which are signals indicating actual preferences by the user. In other embodiments, the patterns of use, interaction, preferences, inputs, memberships in loyalty programs, shopping history, prior use of discounts, and other information can be used to identify what type of contextually related information should be displayed to the user aced on the current state of the vehicle and the current state of the user and the geo-location of the vehicle.

In this example, the type of information that is surfaced to displays of the vehicle can depend on the context of information associated with the user, who is logged into the vehicle by way of a user account that is connectable to cloud services 120. In this example, certain information can be examined to determine what type of contextual recommendation can be provided to the user, and what type of contextual information can be provided based on learned behavior of the user, which provides a prediction or likelihood of the type of information that may be most relevant to the user in the particular context. In one embodiment, a server may determine what data to send to the vehicle, and when sent, the data can be presented on a screen or audio output of the vehicle.

In one implementation, the data sent can include a time threshold that identifies (e.g., identifier or tag or data) when the data can be presented or when the data may no longer be presented. The time threshold can be in the form of data, a tag, a marker, an identifier, flag, or the like, which identifies when the data should no longer be presented (e.g., data may become of context and thus no longer contextually relevant). For example, the data may be relevant for a particular time, window of time, or period of time. If the period of time has passed, the data can be considered stale, such that the data is no longer allowed to be shown, even if the vehicle received the data. For example, the data may be sent to the vehicle when the user is actively using some display or input, and the use of the display or input may prevent the sent data from being presented. In this example, the data is held (in memory) until the user has completed the input (or use of the vehicle, or personal device that may be active (e.g., phone, tablet, directions device, etc.)) to avoid interruption.

Once the interaction has been completed, vehicle software and/or electronics can determine that the data received is no longer valid, stale or no longer relevant to the current geo-location, personal preferences, vehicle condition, or some other factor. In one implementation, therefore, data that is sent to the vehicle for presentation or surfacing may not be presented, if other local conditions, user conditions, and/or geographical conditions determine that the data is stale or no longer useful. Thus, gating the data from presentation, even after receipt by the vehicle, enables for presentation of possibly un-needed data to the user, thus reducing distractions.

In another example, contextual information that may be viewed may include them on a fuel that remains in the vehicle at the particular time (which is a state of the vehicle, among many different types of states of the vehicle), the day of the week, whether the day of the week of the holiday, information from the personal calendar, historical travel times during the time of day, the time of day, loyalty cards that the user may hold or like, traffic information associated to the current geo-location of the vehicle, the current weather, learned past behavior (when the user likes to stop for coffee), nearby coffee shops (coffee shops being a learned type of good liked by the user), discounts located nearby, discounts located nearby other services that are needed at a particular point in time, and other factors.

These contextual types of information associated with the user, the vehicle, the number of passengers in the vehicle at the time, the user's calendar, the users likes, the users past interactions, the predictions of what the user wishes to see or may want, etc. are only but a few examples, and are shown without limitation.

Continuing with the example of FIG. 14A, based on the contextual information obtained by the vehicle computer from cloud services 120 and from information stored in the vehicle computer or obtained from a computing device of the user, determinations can be made as to the type of contextual recommendation that may be surfaced to a display screen of the vehicle.

It should be understood that surfacing too much information can cause distraction while driving, so therefore contextually relevant information that is predicted to be needed or wanted at a particular point in time should be displayed as a contextual recommendation. It is believed that the information that is automatically being contextually provided to the user on the displays is information that would have been searched for by the driver.

Thus, by providing the intelligence surfacing of contextual information to displays and or audio outputs of the vehicle, less distraction will occur because the driver will not need to interact with user interfaces, but instead the information will be provided to the driver just as the driver will need the information. For example, the drivers being provided with information to the closest Chevron station which is 0.45 miles away from the current location, a map to the Chevron station is shown, and a coffee coupon is also shown on the display.

The coffee coupon is provided to the user because the coffee shop is located near the Chevron, and the user typically purchases coffee during this particular point in time and the coffee shop is next to the Chevron where the user will likely wish to purchase gas based on his ownership of loyalty cards for Chevron. As such, this information has been provided to the user at time when the user would want or need the information, which cuts down in screen clutter and also reduces distracted driving.

Figure 14B:
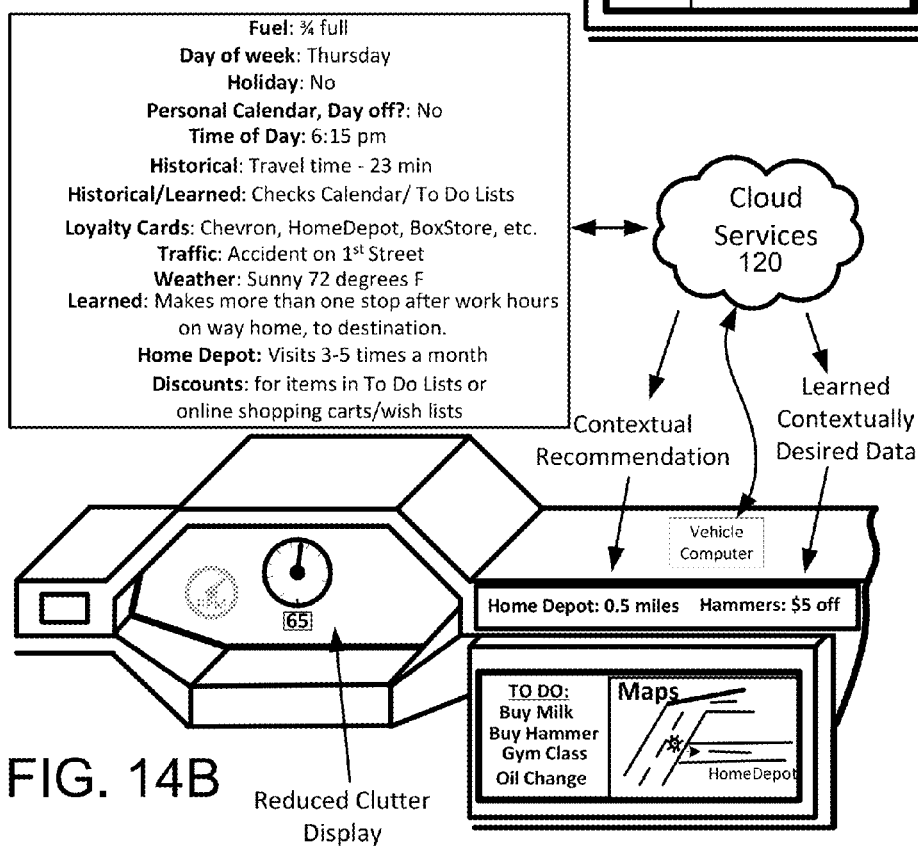

FIG. 14B illustrates yet another embodiment of contextual surfacing of information to one or more display screens of a vehicle or surfacing of audio to the vehicle. In one embodiment, the user prefers to have a low clutter screen, wherein the display panel in the dash has few items, such as vital gauges needed for driving the vehicle. In one example, at a minimum, a speed gauge is provided. As the driver drives around, from time to time, depending on the context or state of the vehicle, certain gauges may be surfaced to a display.

As shown, an RPM (revolutions per minute) gauge may surface gradually on the main dashboard display when it is determined that the vehicle's RPMs are too high. The gradual surfacing, in one embodiment, allows for reduced distraction of the driver. This is because fast surfacing of gauges or icons on the display screen may distract the driver to look down and away from the road. However, when the gauges are surfaced in a fade in from light gray to full color or contrast, the driver will notice the newly surfaced information gauge when the driver next looks down at the gauge.

In the example of FIG. 14B, it is also shown that the contextual information regarding the user, the vehicle, the geo-location of the vehicle, the time of day, the day of the week, and information found in the user's online calendars and to-do lists can be mined to provide contextual recommendations. As shown, as the vehicle is communicating with cloud services 120, contextual information can be provided to the vehicle display(s). The contextual information, at the particular time of day and when the user is driving or activating the vehicle, is provided when the user is likely going to need the information.

For instance, the current to-do list shows that the user needs a hammer (and other things), and because the user is near a store that sells hammers, that information can be provided to the user. The information is provided or surfaced to the user by presenting it on a display, after cloud processing determines that other contextual parameters suggest that the user would be interested in a particular good or service, e.g., in this example a hammer, at that particular time of day and day and particular geo-location. In addition, learning systems also can determine that the user usually likes discounts, so special discounts can be automatically searched for from various online and off-line retailers, and the discount or coupon can be surfaced to the vehicle display at the time the contextual information is provided to the user.

As shown, in addition to presenting the distance to the user, providing a map to the store location, the discount is presented on the display. The discount can be provided for use by the user in various ways. In some examples, the discount can be automatically sent to user's device (e.g., smartphone, tablet, watch, etc.). The discount can be in the form of a digital coupon, a code, a link, or some other identifiable form. In still another example, the coupon can be provided to the user when the user selects it on one of the displays of the vehicle. The coupon can then be transferred to the user's device, or can be sent to the retailer (with the user's account info), so when the user arrives at the store the coupon is automatically credited, or can be sent from the server directly to the user's device.

Figure 15:
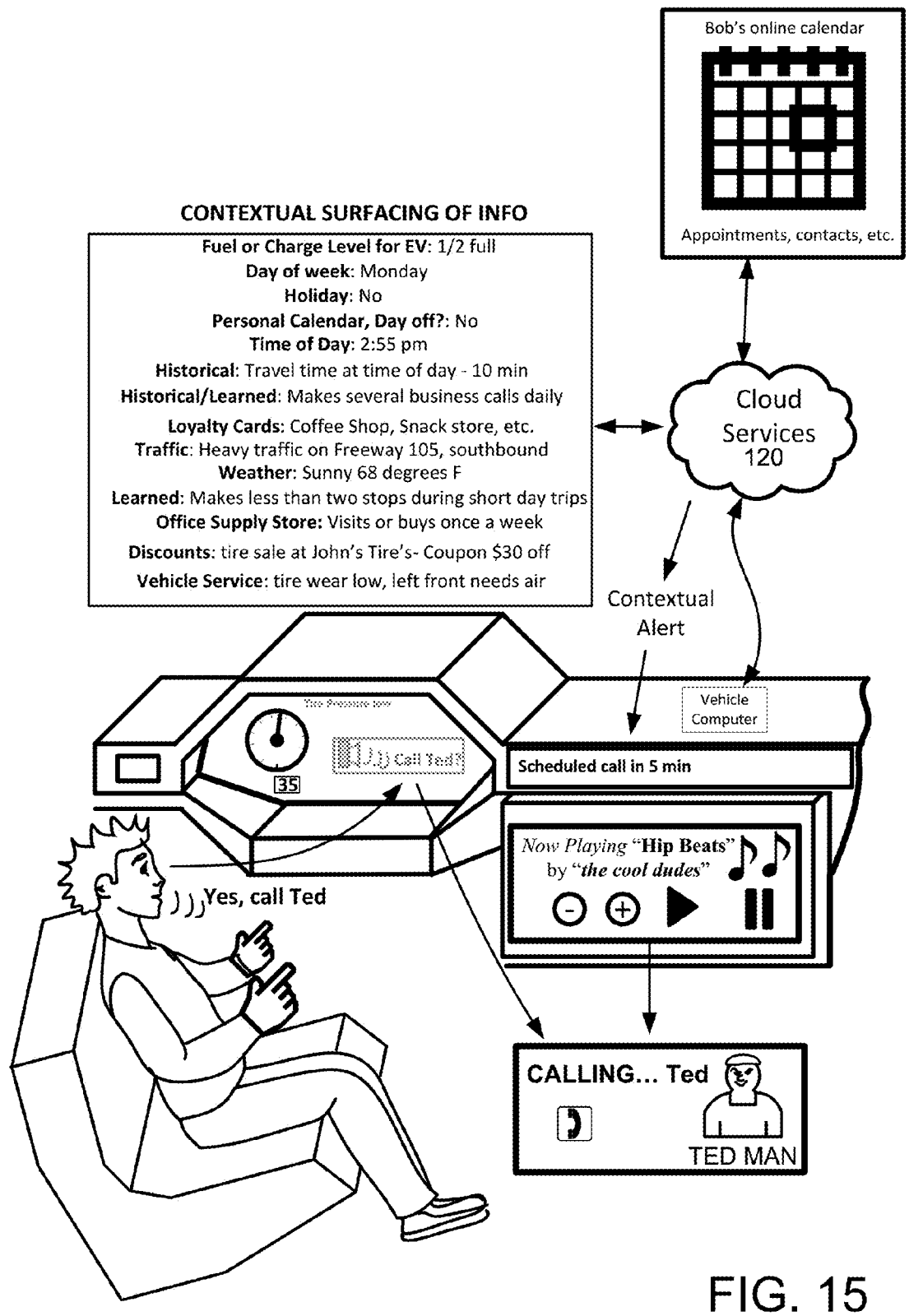

FIG. 15 shows another example of intelligent gathering of contextual information for the user and surfacing just the information that is determined to be useful to the user, in accordance with one embodiment. In this example, the vehicle is an electric vehicle (EV) that requires charging from time to time. The system is also configured to connect with the user's accounts (e.g., for a user that is registered, has a user account and is actively using his or her account when occupying or driving the vehicle). As in other examples, the main dash of the vehicle has a screen that is configured to render icons, gauges, displays, data, and other vehicle information. In one interface mode, low clutter is selected.

The low clutter selection (e.g., selectable as an interaction mode) is configured to present very few icons or gauges, such as those that may be required for vehicle operation. In the illustrated drawing, the main gauge that is shown is the speed gauge and an optional digital read out of the speed. As the user drives around or uses the vehicle, it turns out that the user's calendar determines that an appointment call needs to be made. This determination can be made by reference to the user's online calendar or calendar on a device that is shared with the vehicle. The appointment to call is, for example, "Call Ted."

At the time the appointment time arrived, the user was listening to music, but if the vehicle computer/server determines that the call should be suggested, the vehicle display can change to show "Calling . . . Ted." Also or alternatively, the main dash of the vehicle can show an icon that is surfaced gradually to the display, which may be an indicator of an audio-interface. The audio interface can, for example, as the user if he wishes to call Ted, and the user can simply answer by voice input. The voice input can then trigger the activation of the call for the user. Still further, other parameters, in addition to the calendar can be analyzed to determine that the context is appropriate for surfacing the question to the user.

The analysis can include, for instance, processing the information associated with the current context of the user, the vehicle, the current time of day/week, historical data, weather, discounts, service data, etc. Over time, based on the selections, choices of interfacing, what was selected and when, what was selected when the vehicle was particular geo-locations, what was selected and how many people were in the vehicle with the user, selections or preferences made by passengers of the vehicle, and other data. This data is mined to find overlapping intersections in data and to apply rules and assumptions that form learned data and patterns. This learned data and patterns are used to build a learning database that can grow to include richer data over time, and can assist in providing intelligent contextual data for display on the displays of the vehicle or for audio output to the vehicle.

It is believed that by providing users with information they need, they will spend less time making raw user interface selections (e.g., requiring one or more inputs, taps, touches, swipes, navigations, launching of apps, selection menus, inputs, etc.), which may increase distraction. In one specific example, data from a user's online data sources can be mined to provide information the user needs and contextually when needed.

For instance, if the user's email shows that the user has booked airline tickets and the time of departure is within 2 hours, the user may be provided with a map to the airport, may be provided with online checking interfaces for voice entry, may provide rental car check-in or return information, etc. Thus, based on the context of what the user is doing, what the user has planned, when the user has done in the past (e.g., learning), certain information can be surfaced for consumption by the user. The result is less distracted driving, and efficient usage of the user's time.

In one embodiment, information/data that is sent to the vehicle, from a server, has a higher likelihood of being consumed or used when it is examined for context. As used herein, the information is likely to be accessed, consumed, viewed, read, listened to, and otherwise used, when the information is sent upon confirming context of one or more dimensions (e.g., geo-location, vehicle state, user history, learned preferences, current interaction, etc.). In one embodiment, data that is sent, but not yet presented, may lose context, and that data may be come stale. In such cases, data may not be presented by the vehicle, even after safe receipt by the vehicle electronics 161. Thus, context can be checked at the vehicle as well, and/or the data can be received with identifier data that identifies or tags when such data sent is or may no longer be valid. Thus, in one embodiment, the vehicle may simply filter or cull out information (e.g., supplemental content) that may no longer be valid, based on the received identifier or tag, e.g., such as the time frame of when the data was valid has passed, or the vehicle is no longer close to a particular merchant, or the like.

Figure 16A:
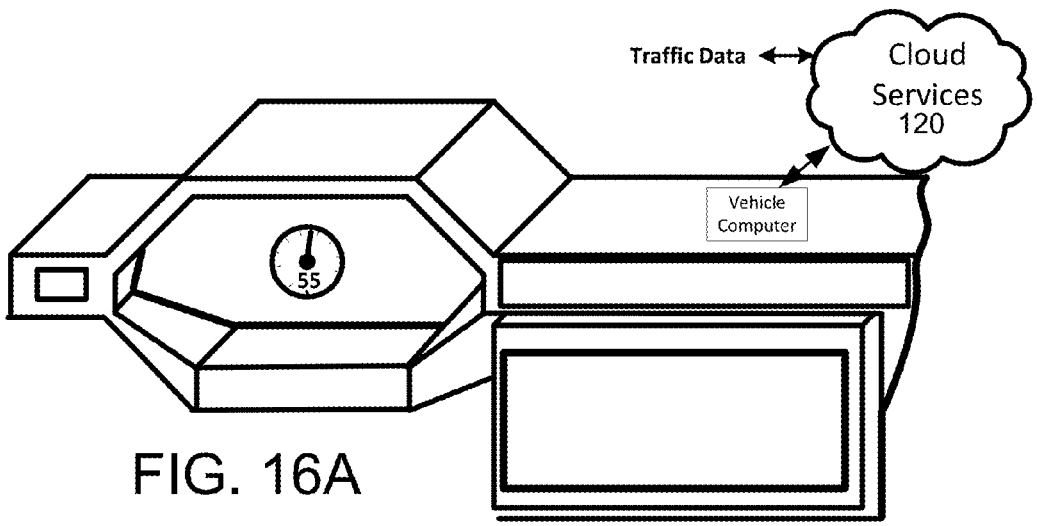
FIGS. 16A-16C illustrate examples of interaction modes selected for the vehicle, and the manner in which content items are displayed on the one or more displays, the manner in which information is surfaced or provided to the driver or occupants, and the dynamic automatic presentation of content on the displays which are contextually related to factors that include the geo-location, content in a user's calendar, learned preferences or behaviors, the time of day, and other parameters in accordance with one embodiment.
Figure 16B:
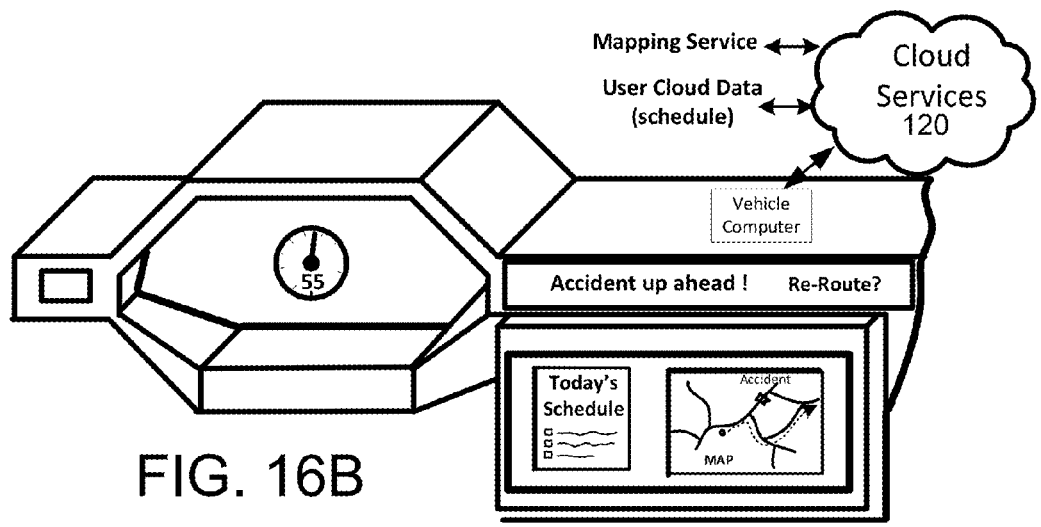
Figure 16C:
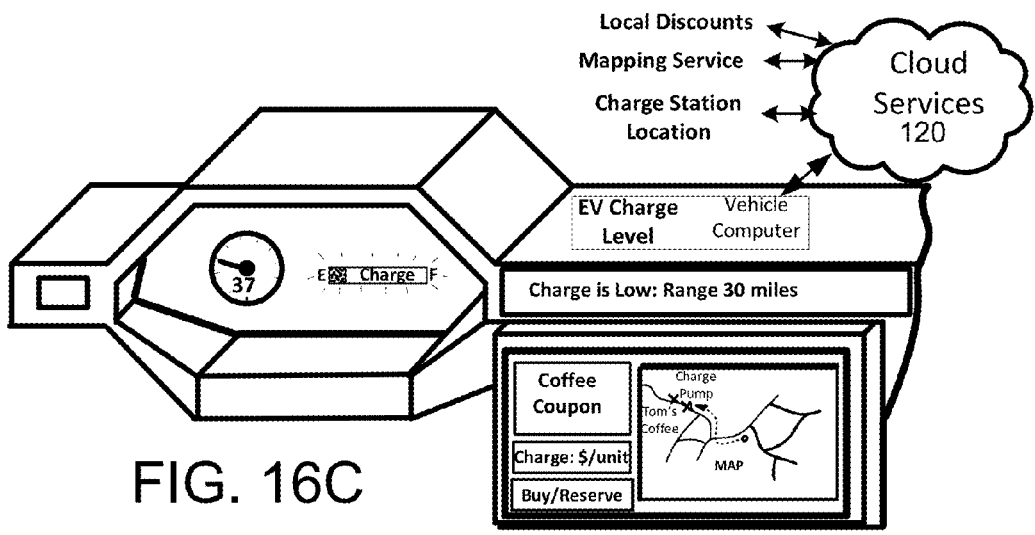

FIGS. 16A-16C illustrate several embodiments, where a user has selected an interaction mode that reduces clutter. The reduced clutter display is shown in FIG. 16A, where nearly all display items are clean or not shown. The display can be provided with wallpaper or skins that reduce distraction or can be turned black or a different color that allows for the screens to blend-in to the look and feel of the dashboard. For example, if the surround parts of the screen appear to be leather or steel, the image on the screen can simulate an extension of the physical nature of the dash or vehicle parts. In this case, the cloud services 120 may still be monitoring information to determine what to surface to the display screens.

In one embodiment, traffic data is obtained when the system determines that the user would likely be checking traffic information. This may be triggered when, for example, the user appears to be taking longer to drive home after work than normal, or the driver is driving slower than a current speed limit of a road, or a traffic accident is identified ahead, or based on learned use (e.g., the user typically checks traffic at 5 pm on a workday, etc.).

In FIG. 16B, the displays are shown to be populated with information obtained by cloud services (or obtained by the vehicle, or obtained by a device of the user in the vehicle, or combinations of two or more thereof). The system may alert the user that an accident is up ahead. The user, based on account information (e.g., history of user, propensity, or likelihood), may usually select to re-route, so the system automatically provides a re-route in the map on the display. In one embodiment, data for information associated with the geo-location is sent to the vehicle when the profile of the user identifies likelihood for consumption of the information associated with the geo-location. An example may be, without limitation, a user drives by a Chevron gas station, but the user prefers Teds Gas, so the user will not stop, even though the vehicle needs gas and the user is proximate to Chevron. The user would be viewed to not have a likelihood to consume information regarding the nearby Chevron.

If the user's shows that the user does not have appointments or does not urgently need to arrive at the destination, the system may not provide a re-route option if the extra distance is more than the user likes to drive. Other contextual information can be mined, including a learned profile of the user, which shows what the user likes, does, prefers, has done over time as a pattern, etc.

FIG. 16C illustrates example where the user's EV is running low on charge. The system may surface this information the main dash display (e.g., either gradually, instantly or in a gray-tone or some special identifying color. The speedometer may also be slowly shifted (or slide) to the left, as the more relevant information that is surfaced is placed near the center of the main dash display. In one embodiment, the center dash is considered one of the least distracting locations for driver to view.

Alternatively, the information can be displayed in a heads-up display on the windshield of the vehicle (e.g., as overlaid or non-overlaid text or icons or graphics, videos, or combinations), which reduce distraction of the driver. Continuing with FIG. 16C, other displays also show contextually relevant information, such as the range remaining for the EV, coupons for coffee near the charge locations, the price of charge, the option to buy ahead of arriving, buying to reserve the EV charging spot, etc. As noted above, the contextual information is processed by parsing data obtained over the internet, data obtained from the user's history profile, data obtained from learned preferences or habits. In some embodiments, the history profile can itself include learned preferences of the user, by way of the user's account.

Figure 17:
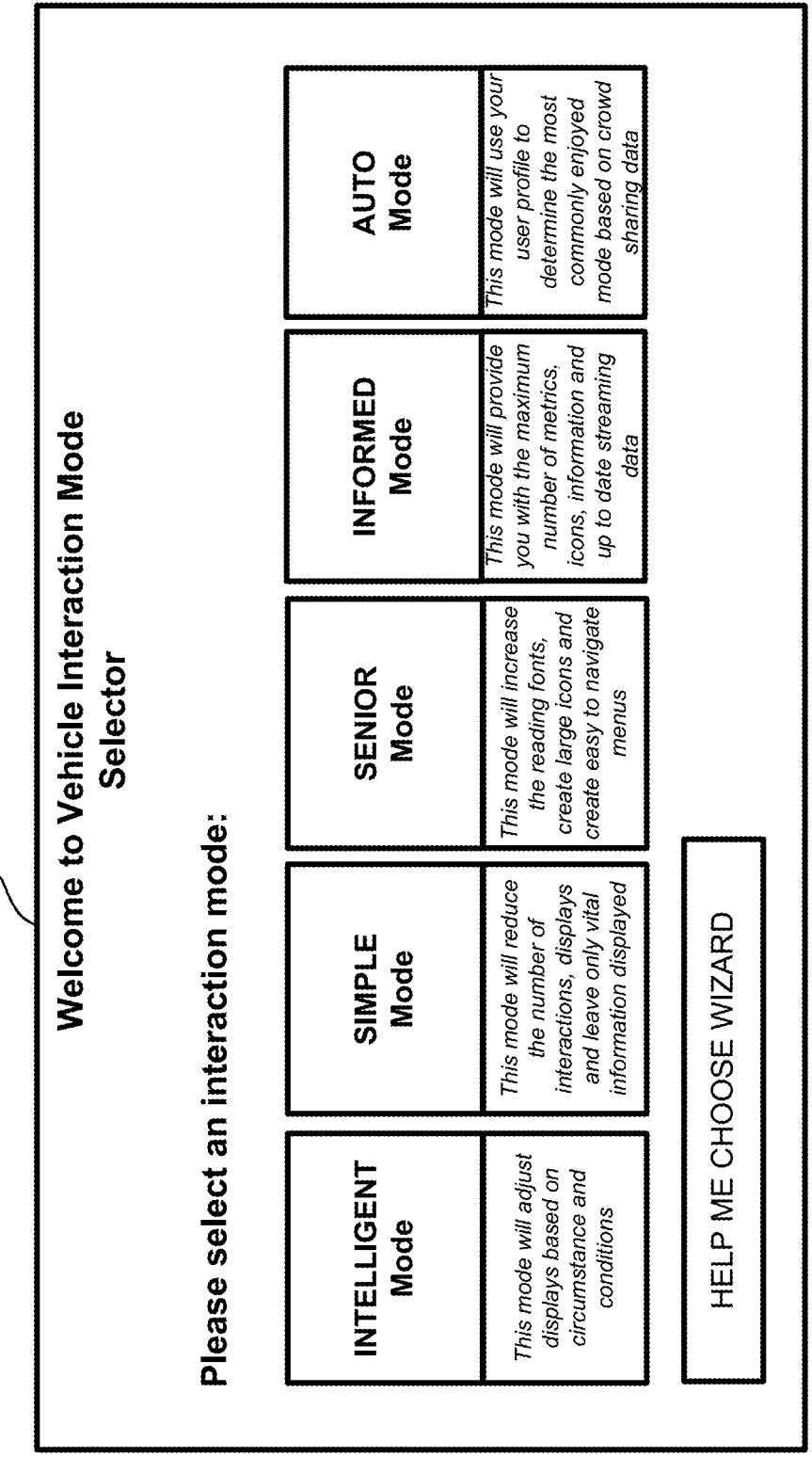
FIG. 17 illustrates an example of various interaction modes, and a method for selecting the interaction modes on a display of a device, the vehicle, a mobile device, or any other Internet connected device, in accordance with one embodiment.

FIG. 17 illustrates an example of a screen that may be presented in the vehicle or a computing device or on some graphical user interface (GUI), in accordance with one embodiment of the present invention. In this example, the type of information presented may be to allow a user to select an interaction mode to be used for the vehicle. The interaction mode is used to identify the type of interactivity, complexity of data presented on the displays of the vehicle, types of data that can be or desire to be sent to the vehicle for consumption by a user, and preferences that would be liked by particular types of people.

Because people vary in preferences widely, the example of providing different types of interaction modes for particular vehicle will simplify selection by users so that the interaction mode best fits their desired use or intended use of the vehicle. Some people are more technology savvy while others wish to avoid technology altogether or at a reduced consumption rate. In the example shown, various modes can be provided. Although five modes are provided as an example, more or less modes can be provided depending on the design or implementation.

The example modes include an intelligent mode, a simple mode, a senior mode, and informed modes, an auto mode, etc. These modes identify the type of interactivity or the weighted the user wishes to identify interaction with his or her vehicle. As noted herein, the modes can be assigned to the vehicle for when the user is present in the vehicle, and need not be tied to the specific vehicle. For example, if a user account has identified the type of mode they wish that operate one or more vehicles, that mode can be transferred to a specific vehicle for a period of time. For instance, a user may wish to operate a shared vehicle and the mode in the users account can be transferred to the shared vehicle.

The user may wish to transfer the interaction mode to a rental car. The user may wish to transfer the interaction mode or activate the interaction mode on a personal vehicle when that particular user is the driver. In other embodiments, a vehicle can transfer between one interaction mode or another interaction mode based on user input. In some embodiments, the user may choose to utilize a wizard, which will allow the user to his or her type of descriptive behaviors liked or disliked when operating a vehicle.

These behaviors are descriptive, and need not be specific to an actual setting. Once the descriptive behaviors are selected by a user, the wizard can identify a specific type of interaction mode which will then apply a plurality of settings for the interaction mode.

Figure 18:
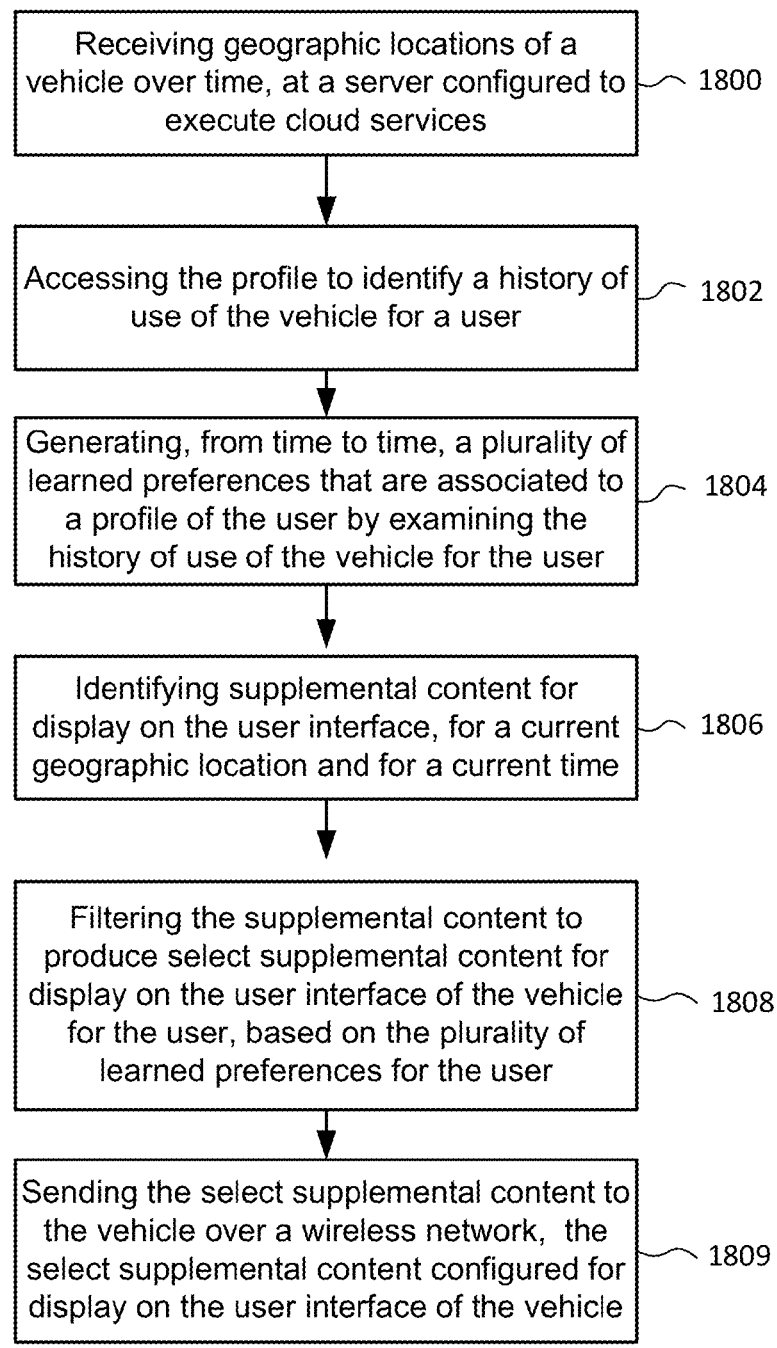
FIG. 18 illustrates one example flow of operations used to provide contextually relevant information to the displays of the vehicle, for one embodiment.

FIG. 18 illustrates one example flow of operations used to provide contextually relevant information to the displays of the vehicle, for one embodiment. In this example, the information is considered supplemental content. The content is considered to supplement the user's driving experience and reduce distraction, as the supplemental content is selected based on the circumstances of the vehicle location, the user's preferences, the user's learned behavior, the user's calendar, the context of driving, the user's travel plans, and other factors as described throughout this document and those documents incorporated herein by reference.

In one embodiment, supplemental content can include data that is unformatted and is later formatted at presentation, data that is comes with format data, data that is parsed out of formatted data for presentation in different forms, data that is obtained from internet services, such as mapping programs, calendars, news, social, appointments, cloud storage, advertising, and the like. In some cases, the supplemental content can be data that that triggers opening of a website or application on the vehicle display. In such cases, most of the data will be formatted based on the source formatting provided by the internet service. In other embodiments, some of the data obtained from the internet service can be re-formatted for display in a native display format. In some implementations, text data can be extracted from internet services, such as text search results to for display in a custom or native format for the vehicle displays. In still other embodiments, the display of the day on vehicle displays can take on a hybrid approach, which may depend on the type of content, application, app, interface, program, license, form factor, content type, and the like.

In one embodiment, the supplemental information is filtered to provide even more custom tailored select supplemental content. For instance, even though the user may need gasoline, the user may prefer another type of gas than that immediately available. Further, even though the user prefers coffee and purchases coffee often at 8 am on a weekday, that particular weekday the user may be heading to a client meeting and the driver appears to be late. Consequently, a coffee coupon or location information may not be provided, as this supplemental content is not useful to the driver and may only serve as a distraction. In the illustrated example flow of FIG. 18, operation 1800 includes receiving geo-locations of a vehicle over time, at a server configured to execute cloud services.

The cloud services may be operated by one or more entities, public entities, private entities, entities such as vehicle makers, entities such as vehicle service provider entities. These entities may operation with one or more servers. The servers can be individual servers, groups of servers, services distributed geo-graphically for load balance or improved quality of service (QoS), servers operated by cloud services, virtualized servers and storage, and combinations thereof. Other examples can include processing performed by the servers and some processing by the vehicle computer or devices of the user. In still other examples, apps of the vehicle can communicate with cloud services using user accounts, which provide access to the user's history and profile.

In operation 1802, the system will access the profile of the user to identify various data, including identifying a history of use of the vehicle of the user (e.g., the vehicle that is registered to the user's profile). In some embodiments, no vehicle is pre-associated to the user account or profile, which allows for dynamic transfer of the user's account to any vehicle the user steps into and syncs with. Thus, when the user access the profile from any vehicle having access to or providing access to cloud services, the custom services of the user can be used on the currently driven or used vehicle.

In this manner, the vehicle is not actually associated to a user but instead, the user's profile or account is associated to the vehicle for a period of time the vehicle is driven by the user. In one embodiment, the profile can also be used on rental cars or other vehicles that are used for short periods of time or on cars that are loaned out by others for use.

In operation 1804, from time to time, the system generates a plurality of learned preferences that are associated to the profile of the user. This association can occur by, for example, by examining the history of use of the vehicle (or use by the user on other vehicles). The learned preferences can change over time as the user's preferences change or user input selections made change over time, and based on the particular contextually related circumstances of when the changes or inputs were made. Thus, the learned preferences can, in some examples, change periodically when enough data is collected to create and define a preference with a threshold level of certainty.

In operation 1806, the system identifies supplemental content for display on the user interface of the vehicle, for a current geographic location and for a current time. As noted above, the supplemental content can include information that can be displayed on a screen of the vehicle. The information can also be output by voice and the user may interface via voice input or combinations of voice input and physical input (e.g., touch a screen icon, turn a button, toggle a button, press a button, slide rolling item, shift a lever, rotate a knob, etc.).

In operation 1808, the system (e.g., server) can filter the supplemental content to produce or leave select supplemental content for display on the user interface of the vehicle for the user. The filtering can be done, for example, based on the plurality of learned preferences for the user. As noted above, the filtering is done to cull-out information that the user is known not to need or want, or cull out information that is not appropriate for the time of day or week, or cull out information that is conflicting with the user's schedules, or cull out information that would conflict with the user's more preferred likes or dislikes.

Further, the culling of supplemental content can also changes over time as the driver moves around and the geo-location changes. For example, if the user's favorite fueling station is nearby, at 8:15 am, and the vehicle needs fuel (but still has enough to driver another 90 miles), but the user needs to take a conference call from 8:15-8:30 am, the system will not surface (e.g., cull so this supplemental content is no provided to a display or audio output) information regarding the nearby fueling station. Instead, the vehicle will surface and notify the user of the conference call and/or show the option for another fueling station that is along the path or near the destination.

In another embodiment, the identification of supplemental content in operation 806 and the filtering operation of 808 may be processed together in one processing operation. That is, the selection of the supplemental content can itself include the culling for the user and the user's profile, so as to avoid additional or secondary processing. In still other embodiments, some users may wish to explore outside of their profile, and the user may select to receive 10% of the supplemental content outside of his or her profile. This provides a controllable amount of supplemental content that can be surfaced to the user over time. If the user likes the supplemental content, the user's profile can be adjusted by the learning of preferences, selections and/or inputs over time.

In operation 1809, the server sends the select supplemental content to the vehicle over a wireless network. The select supplemental content is configured for display on the user interface of the vehicle. The user interface, as described above, can be any screen of a vehicle, including screens interfaces on buttons, toggles, dials, sliders, etc. The different screens on buttons can show different or customized information depending on the mode selected.

Thus, the same knob, for instance, can provide different functions when it is turned or touched, depending on the mode. As noted above, the user's profile can also be augmented or controlled for display of information in various formats, such as intelligent mode, simple mode (easy), senior mode, informed mode, and custom modes selected by the user, learned over time, or recommended by the computer (let the computer decide option).

Figure 19:
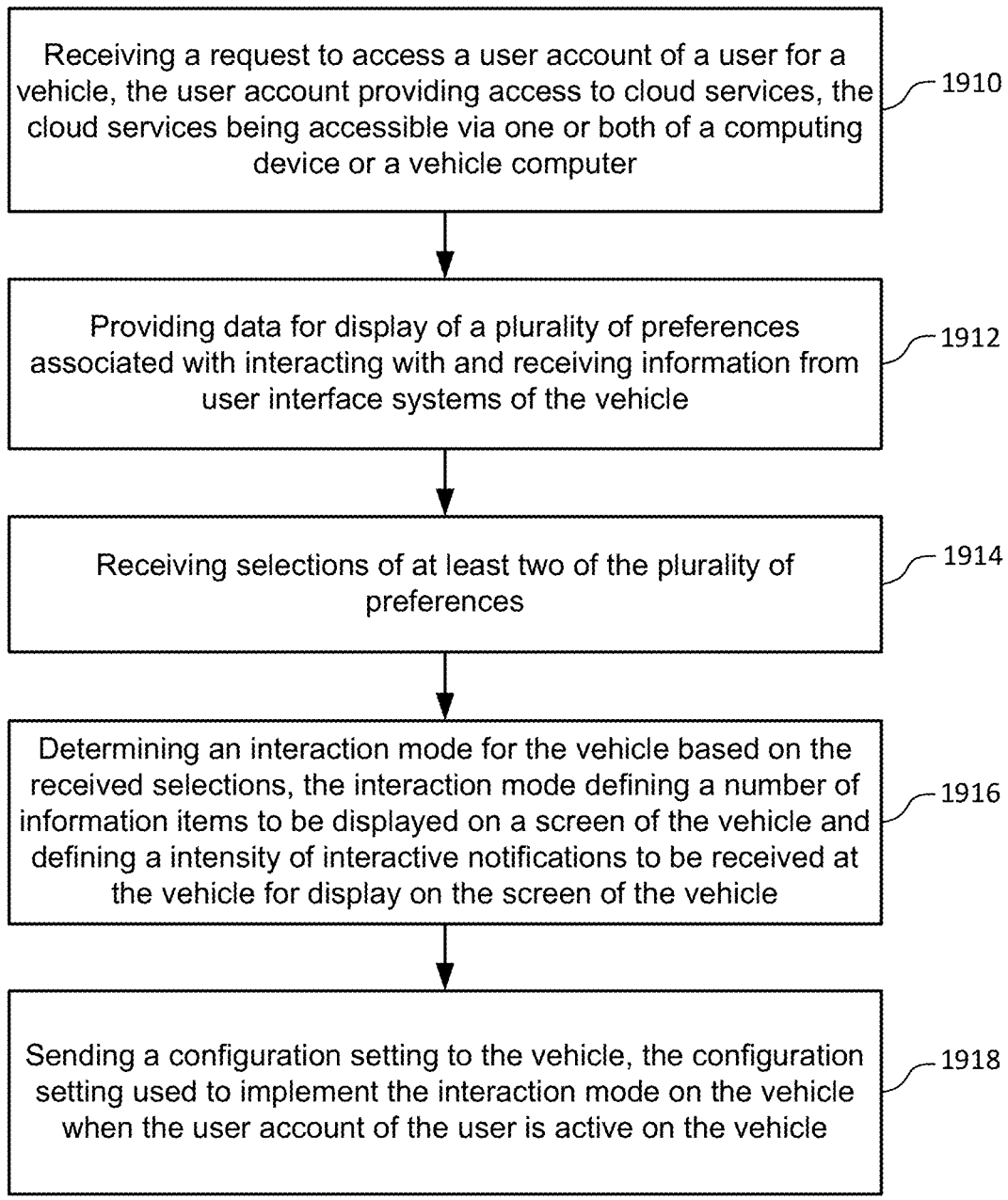
FIGS. 19-21 illustrate example flow diagrams for various embodiments, which allow for communication of intelligently selected recommendations, information, surfacing of content, and selection of interaction modes or settings for interaction modes, in accordance with several embodiments.

FIG. 19 shows a flow of one example embodiment, wherein an interaction mode is selected. In this example, operation 1910 includes receiving a request to access a user account of a user for a vehicle. The user account provides access to cloud services. The cloud services are accessible via one or both of a computing device or a vehicle computer.

In operation 1912, data for display of the plurality of preferences associated with interacting with and receiving information from user interface systems of the vehicle is provided. In this embodiment, preferences associated with the types of display items and types of information the user wishes to see or rendered on the displays/screens can be provided. This information can be provided in the form of user interface inputs, table selections, typed in selections, radio button selections, selection lists, grid data input, voice input, or any type of input method that can be captured by a computer, or combinations of two or more thereof.

At this point, selections of at least two of the plurality of preferences can be received at the user interface in operation 1914. At least two selections are useful to receive, so that proper determinations of the type of interaction modes that are available to the user can be selected. Alternatively, if the user already knows the interaction mode he or she desires, the selection can simply be one selection of an interaction mode, instead of selecting two or more preferences, which are used to identify an interaction mode.

In operation 1916, and interaction mode is determined for the vehicle (user account) based on the received selections. The interaction mode may define a number of information items to be displayed on a screen of the vehicle. Additionally, the interaction mode can identify the intensity of interactive notifications to be received at the vehicle for display on the screen of the vehicle. For example, more intensity can eat equate to more information being displayed or notifications provided to the vehicle. Less intensity can be fewer notifications, or information provided to the one or more displays of the vehicle.

The interaction mode, in one embodiment, will define the number of interactions that would be provided to the user. If over time the user wishes additional notifications sent to the vehicle, the user may customize the interaction mode. In another embodiment, the user can simply choose a different interaction mode which may globally change the interaction mode and types of information items displayed and number of information items displayed, as well as the intensity of interactive notifications.

In operation 1918, the configuration setting is sent to the vehicle. The configuration setting used to implement the interaction mode on the vehicle is data that is sent when the user account of the user is active on the vehicle. For example, if the user accessing a particular vehicle wishes to implement his or her interaction mode on that vehicle, the user account of that user will identify and interaction mode, which can then be transferred to that specific vehicle. As noted above, the interaction mode may be customized to the user account so that the interaction mode can be used in any number of vehicles the user wishes to operate. In other embodiments, the interaction mode is programmed to a specific vehicle, such that that vehicle holds the interaction mode programmed for continuous use.

In still other embodiments, the interaction mode can be used in a specific vehicle for a period of time. The period of time can be for or uses of the vehicle, for a week, for a month, for a day, or any number of identifiable fractions of time. Still further, the interaction mode can be automatically applied to a vehicle when a particular user is identified/detected to be in or proximate to the vehicle.

Identification of the user in a vehicle can be by way of having the user input his or her password or user ID into the vehicle electronics 161 or user interfaces or screens. In still other embodiments, identification of the user in a vehicle can be by way of biometric identification. The biometric identification can be by way of voice input, voice ID, retina scan, finger print ID, gesture ID, or a combination of multiple biometric identification methods.

Figure 20:
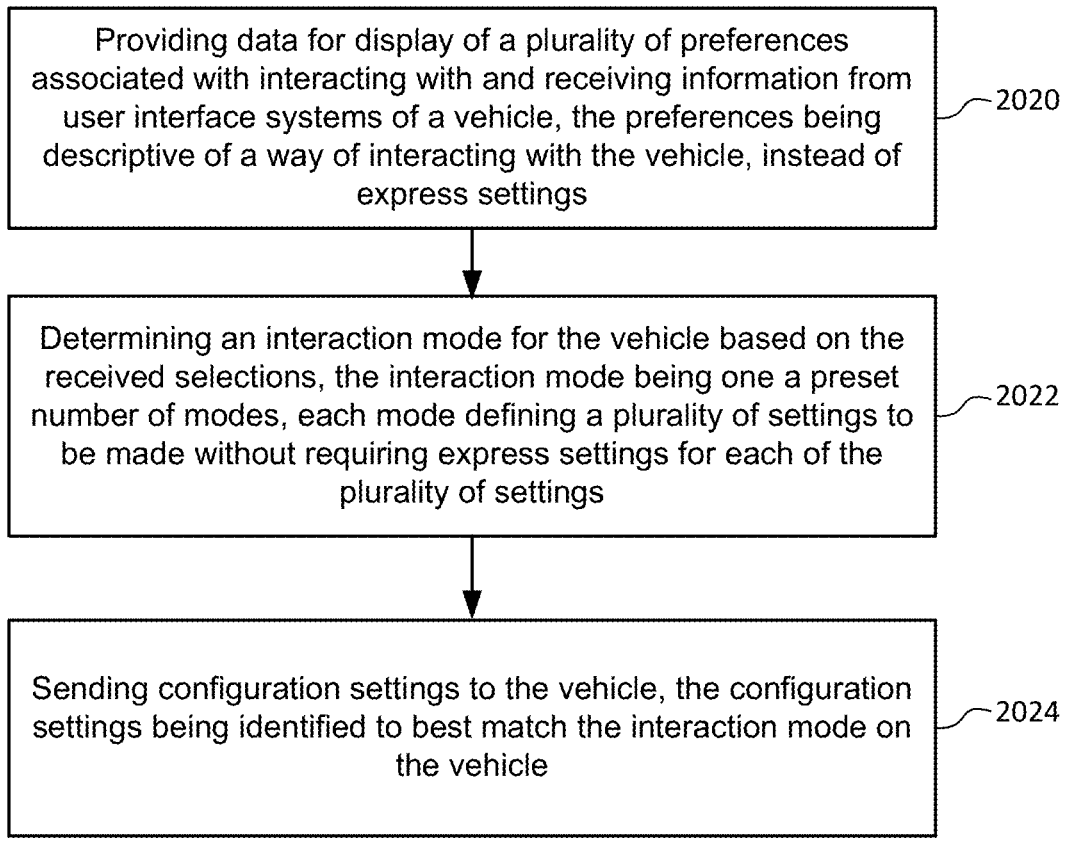

FIG. 20 illustrates another flow diagram, in accordance with one embodiment of the present invention. In this example, method operation 2320 includes providing data for display of a plurality of preferences associated with interacting with and receiving information from user interface systems of a vehicle. The preferences being descriptive of oh way of interacting with the vehicle, instead of express settings.

The descriptive ways of interacting with the vehicle can be by reference to that type of information the user wishes to receive, the mood the user is in, the familiarity that a user has with technology, the degree of simplicity desired by a user, easy user interfaces which may be useful to senior citizens operating a vehicle, etc. Thus, instead of providing a plurality of input settings, a number of questions, statements, interactive preferences, can be displayed or asked of the user verbally so that the user can answer a sequence of questions that can be used to then identify an interactive mode for the vehicle.

Thus, this provides an easy way of interacting with the vehicle using natural language that does not require the user to expressly enter settings, navigate user interfaces, and the like, which may be too technologically complex or uninteresting to certain users. In operation 2022, and interaction mode for the vehicle is determined based on the received selections. The interaction mode can be one of a preset number of modes. Each mode may define a plurality of settings to be made without requiring the express settings of the individual settings. In operation 2024, the configuration settings are sent to the vehicle.

As mentioned above, sending configurations to the vehicle can be by wireless communication. The sent configurations can be set from a server that has access to the Internet for transmitting the data to the specific communication electronics of the vehicle, which in turn allow for implementing the settings on the vehicle automatically or after the user has approved the input of the settings. In one embodiment, the configuration settings are identified to be a best match of the interaction mode for the vehicle, for the user, and based on the preferences that are descriptive of the way the user wishes to interact with the vehicle.

Figure 21:
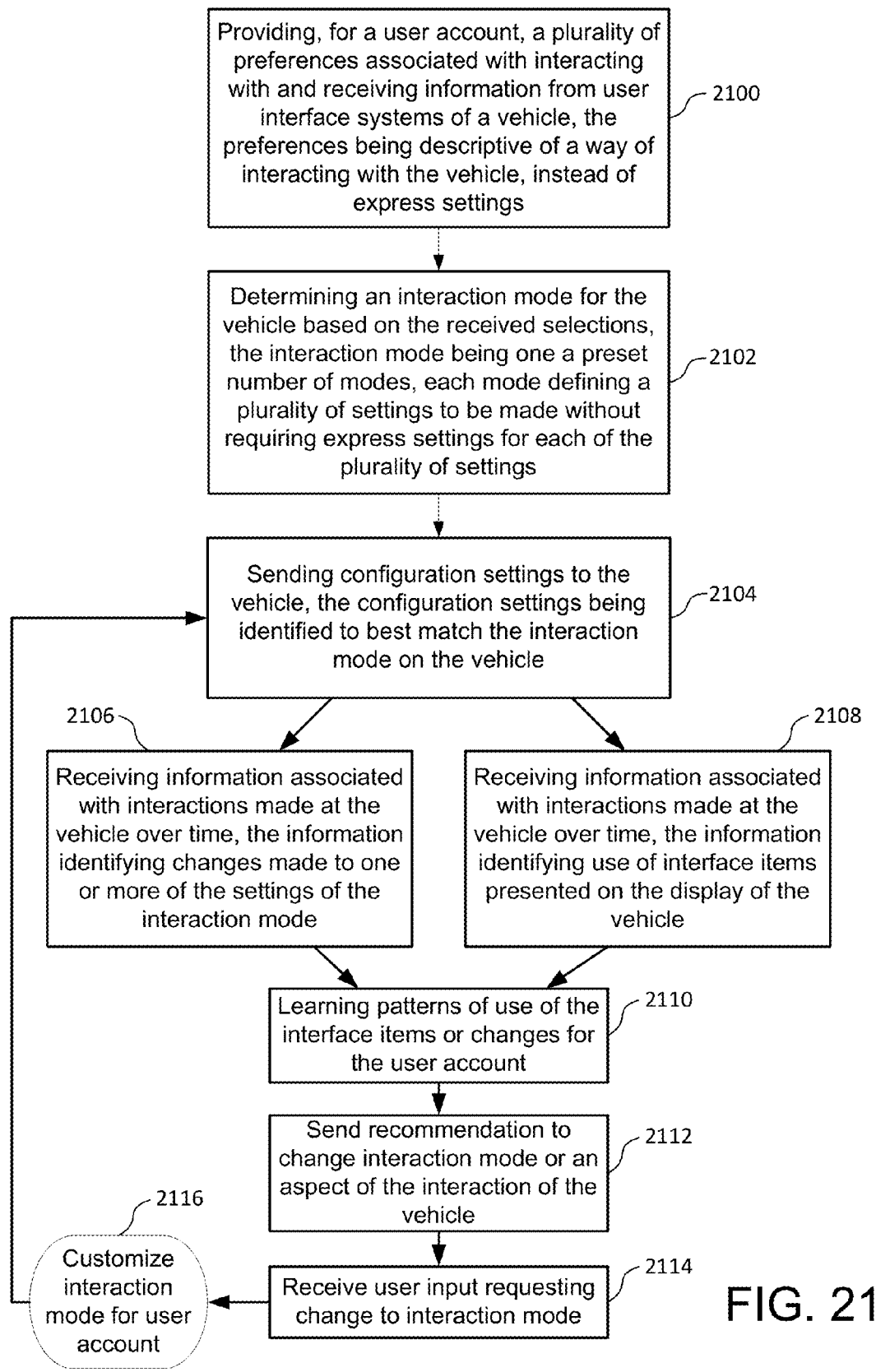

FIG. 21 illustrates one example of a flow diagram where in interaction mode can be selected and customized for a particular user, in accordance with one embodiment of the present invention. In one example, the particular user is a user having an account and an associated profile. In operation 2100, for a user account, a plurality of preferences associated with interacting with and receive information from user interface systems of the vehicle are provided.

The preferences are descriptive of a way of interacting with the vehicle, instead of express individual settings. In operation 2102, the method includes determining and interaction mode for the vehicle based on the received selections. The interaction mode is one of a preset number of modes, and each mode defines a plurality of settings to be made without requiring express settings for each of the plurality of settings. In operation 2104, the configuration settings are sent to the vehicle. The configuration settings are identified to be a best match for the interactive mode of the vehicle, for the user account. In operation 2106 and 2108, over time the user will provide input settings or selections or interactions utilizing the initial or interaction mode identified or determined in operation 2102.

In operation 2106, information associated with interactions made at the vehicle over time is received. The information identifies changes made to one or more the settings of the vehicle. In operation 2108, information associated with interactions made at the vehicle over time is received. The information identifies use of interactive items presented on the display of the vehicle. In operation 2110, the received input from operations 2106 and 2108, over time, are provided for learning patterns of use of the interface items or changes for the user account. In operation 2112, recommendations to change the interaction mode or an aspect of the interaction mode of the vehicle is sent to the vehicle.

Information sent to the vehicle can be provided by way of one of the user interfaces, or audio output, text messages to a user's device, e-mail messages, messages to the user's online account, or the like. In one embodiment, operation 2114 may include receiving user input requesting changes to the interaction mode. The changes requested can be based on the recommendations provided to the user. For example, the recommendation can be provided to the user suggesting that the user change the interaction mode from a simple mode to a complex mode or an intelligent mode, or some other customized mode. In another embodiment, the change to the interaction mode can simply be an adjustment to the selected or determine interaction mode.

For instance, the initial interaction mode can remain selected, yet one or more aspects of the interaction mode can be adjusted or changed to define a customized interaction mode for the user account in operation 2116. In one embodiment, once the customization has been defined, the customization settings are sent to the vehicle for implementation. In one embodiment, the changes in customization can occur on the vehicle itself and over time the customizations can be communicated to a server, which then implement the changes for the user account. In this way, the server and the vehicle can maintain a synchronized the interaction mode and changes made over time to either the vehicle or the modes in the user account.

Figure 22:
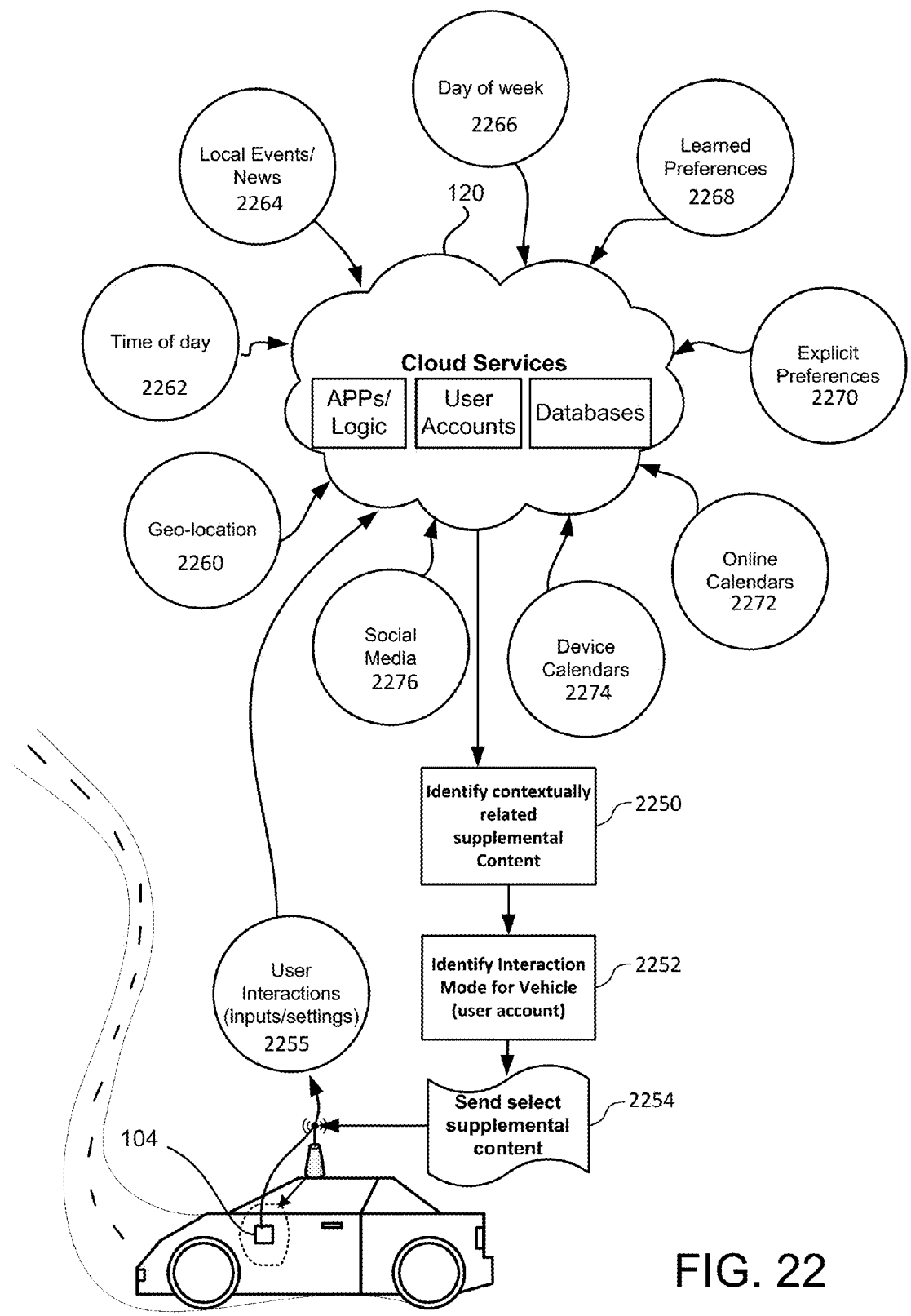
FIG. 22 illustrates an example of cloud services being able to interact with multiple Internet services, cloud data structures, cloud databases, third-party websites, information services, user vehicles, and other information and data that can be accessed for intelligently communicating supplemental content to the user account for display on one or more displays of a vehicle, and for the dynamic receipt of user interactions over time from the connected vehicle, in accordance with several embodiments.

FIG. 22 illustrates one example of cloud services 120, which may be collecting or interfacing with a plurality of data providers, data sources, data processors, third-party applications, third-party services, other applications, Internet data, or combinations thereof. In one embodiment, the vehicle is a connected vehicle which has access to cloud services 120. Over time, the vehicle will traverse different geo-locations, which will then be communicated to cloud services 120 periodically, continuously, or on some schedule.

In addition, user interactions and input settings 855 can also be communicated to cloud services 120. This information is communicated regarding user interactions, such as inputs or settings is also tied to the geo-location of the vehicle, the time at which the settings were made, the circumstances of when the changes were made, the contextual relationship of circumstances to when settings are made or inputs are made, and the like. As shown, cloud services can include applications and logic and other components which are described above.

Additionally, cloud service can include user accounts and databases. In some implementations, cloud services can be operated by specific service provider, or multiple service providers, a vehicle cloud service, an internet company, vehicle manufacturers, vehicle service providers, third party service providers, or combinations thereof. Example communications by cloud services 120 are shown, without limitation. The example communications can be to geo-location 2360, time of day data 2262, local events and news 2264, day of the week calendar data 2266, learn the preferences 2268, explicit preferences 2270, online calendars 2272, device calendars 2274, social media data 2276, etc.

In one implementation, at least one aspect of one of the preferences is data obtained from an internet service. The internet service can be a private cloud, a public cloud, website data available via open APIs, or combinations thereof. The internet service may also be one of a website, or a calendar, or social network website, or a news site, or a dictionary site, or mapping service, or a to-do list, or a phone list, or a merchant website, or a shopping website, or a coupon site, or a discount site, or gasoline price site, or an electric vehicle (EV) charge locator service, or an EV charge reservation service, or an e-payments site, or an energy pricing site, or a route mapping service, or a traffic service or site, or a movie site, or a music site, or travel site, or a vehicle site, or vehicle manufacturer site, or a rental car site, or an airline reservation site, or a restaurant finding site, or a review site, or a weather site, or a loyalty rewards site, or a database, or a historical driving database, or a vehicle-to-vehicle database, or a holiday calendar, or the internet, or combinations thereof.

This list of exemplary data and services should not be viewed as limited to the set of data but simply as an example of data can be accessed and process to identify contextual related supplemental content 2250. In operation 2252, the interaction mode for the vehicle can be identified. The interaction mode can be the mode that's already selected for the vehicle, and therefore the data that that vehicle is expecting will be in accordance with the interaction mode and it settings.

In operation 2254, select supplemental content can be sent to the displays of the vehicle or output via the audio system. As noted above, the type of information, such as the select supplemental content is tailored for the interaction mode selected for the vehicle, as well as based on user interactions 2255 and the contextual relationship of those inputs to the time, the geo-location, learned preferences, and the like.

In other embodiments, the vehicle may respond to user input or provide recommendations without being prompted by user input. One example of a vehicle recommendation may be to inquire if the user wishes a particular setting. The recommendation may use, for example, a history of use by the user to determine or predict that the user may indeed wish to implement such a setting or provide input. In one example, if it is cold outside, the vehicle may automatically heat the seats to levels previously set by the user (e.g., when similar conditions were experienced) or provide recommendations to the user. In other examples, the vehicle can automatically seek input from the user with customized dialogs. By way of example, dialogs may be audio dialogs, text dialogs, icon dialogs, sound and text, voice and text, or simply voice output. One example of voice output may be, "It's cold outside, do you want me to heat the seats?," or "Hi Fred, its cold outside, do you want more heat?", or "Your seats have been set to level 3 heat, etc." These are only some examples, of recommendations that can be provided to the user, based on one or more of the user's voice tone, mood, learned prior settings, use patterns, predictions, and combinations thereof.

In one embodiment, a vehicle system can interface with a user by requesting simple user feedback, e.g., by providing the user a set of simple queries. As vehicle settings become more complex, making settings can be very distracting, especially when driving. As such, instead of requiring a user to navigate screens and settings and inputs, a vehicle interface system can generate a set of queries, which are then used to determine a setting or recommended setting. The queries can be, for example, a set of verbal questions. Once the user answers the questions, the system will narrow down to what the user wishes to do. For example, if the user wishes to check a system setting, e.g., tire pressure, the user can simply initiate an inquiry. The injury can begin by the user or the system, and may being by the user saying "tell me the tire pressure." The system can ask, "which tire are you interested in?, right front, left front, rear right, rear left?" The user can say, "left front," the system can say "pressure is 32 PSI, and is low, do you want to find air nearby?" The user can then say, "yes" and directions are automatically provided to the vehicle user interface. Thus, instead of the user being distracted while driving, attempting to navigate several screens to get to vehicle systems, then tires, then pressure, and then navigate to search for a service station, the vehicle can skip navigation screens and immediately arrive at the information or setting, which removes distraction to the driver. Further, as vehicle user interfaces continue to add more functions, users need to memorize new screens, settings, inputs, etc., and this simple query interchange with the vehicle will allow instant access to desired settings. The users just answer basic questions about preferences, which are then implemented as a setting by the vehicle.

In some embodiment, the system can further predict desired settings. As in the example noted above, the vehicle system predicted that the user will need to find a service station to get air for a low pressure tire. Prediction can further be refined based on environment conditions, geo-location, time of day, time of week, etc. In one example, the vehicle can determine if you are lost by examining GPS travel patterns of your travels, and other factors (e.g., searching for an address on the mapping function, making calls, etc.). In one embodiment, the vehicle can verbalize: "you look like you are having trouble finding your destination, would you like a route to your destination?" In other examples, the vehicle can identify that the driver is having trouble staying within the lines of a lane. If the time of day is late at night, and if the user is far from home, and/or the vehicle is traveling to a mapped destination, and/or the vehicle has been traveling for an extended period of time, e.g., 6-12 hours, the vehicle system can deduct that the user is getting tired, and may need to rest or find a hotel. The vehicle can say, for example: "Are you ok?" "Are you tired?" "Would you like me find you a hotel or rest stop?" If the vehicle is running low on gas, the vehicle may provide a query to the user saying "Chevron gas is available at the next exit, shall I reserve a pump for you?" In general, the technical aspects of these embodiments is that the vehicle is contextually aware of its surroundings, the user patterns of the vehicle when used by user accounts of users, predicted use patterns, likes and dislikes, setting preferences, general preferences, geo-locations and available services and goods, etc. The vehicle is, in one embodiment able to exchange with the user in simple dialogs, which reduces the need to navigate touch screens, select icons, enter text, read menus, etc., especially when the user is driving.

In another embodiment, voice interchanges can occur between a user and a vehicle, wherein the vehicle is context aware of environmental conditions (e.g., weather, time of day, day of week, online calendars of the user, status of local charging or fueling stations, etc.), and geo-location of the vehicle, geo-location paths taken, preferred paths and navigation routes. Additionally, in one embodiment, the vehicle and/or cloud system will maintain or have access to user preferences that are associated or maintained for a user account of the user. The preferences can include preferred settings of the vehicle, settings preferred for specific periods of time or conditions, preferred goods and/or services of the user, preferred routes taken in certain geo-locations, historical selections made for vehicle settings, biometrics of the user, tendencies of the user, voice profiles for different tones of voice of the user, etc.

In one embodiment, an interactive two-way conversation with the car/vehicle can be had, instead of commanding the car to do xyz. When the vehicle accesses the user account of the user, the vehicle can make decisions as to how to respond to the user, and these responses can be learned over time or based on prior settings, such that a confidence score can be generated for determining how to respond to the user. In one configuration, since the vehicle is user aware, the user will build up a relationship with the vehicle. In one embodiment, as is also common in person-person relationships, relationships between the vehicle and user can change based on present conditions.

In another embodiment, the vehicle can include a user settable MOOD setting. In one embodiment, the vehicle automatically determines the user's mood via the user tone, and/or other inputs or voice commands In another embodiment, the setting can be manually triggered/set by the user. For example, a user interface of the vehicle or voice command can be provided to direct the vehicle to change its mood. Based on the mood setting, the type of questions posed to the driver can change. For instance, if the driver is in a good mood (and the mood=good is set), the car may pose more interesting questions to the user instead of just making settings. The vehicle can, suggest a mood lighting of the car, a different display panel skin, music, or voice used by the car to talk to the user. Technically, the personality of the car changes, based on conditions and the associated mood setting. In other embodiments, the user account will include the age of the driver is, and the personality can change over time. In the same manner, if the driver is a teen driver, the personally can change so that the vehicle communicates in a manner that is more pleasant to the teen. The same can be true for senior drivers, whom may desire more tame personalities and/or setting conditions.

The personality of the vehicle can therefore switch based on who has logged into the vehicle or who the vehicle has determined to have entered or is operating the vehicle. The personality of the car can also change based on geographic region. If the vehicle is in the southwestern U.S., the car can take on that personality. If the user has an accent, the car can detect a geographic region for the accent, and then uses a region friendly accent.

In still another example, the car can also predict your language based on your accent and/or geo-location, and ask you if you wish to interface in a different language. In this embodiment, the user need not manually change the language setting, but the car can change it for the user by analyzing the language tone, dialect, region, etc. In one embodiment, the system can also determine the driving conditions, environmental conditions, geo-location, and mood of the user. If the vehicle is traversing a curvy road, in heavy traffic, in bad weather, etc., the system may refrain or not ask questions to the user that may distract the user. However, if the user is at a stop sign or light, the system may ask more questions that require more thinking or analysis.

By having the vehicle system be more aware of the user's mood and conditions of driving, the user will not inject verbal interchange with the user that may cause more distraction. In one example, a goal is to have the car interact with the user at times that will not place danger to the concentration needed for driving. If the user is at a stop sign, the vehicle may ask questions that are more complex. The system can also select the type of questions to ask the driver, based on conditions of day, the mood, or current personality of the user. As noted above, the personality of the user can be detected by the vehicle or can be set by the user. The user can, for example, select a simple button/icon/input to state the mood. In other embodiments, the mood is determined based on the voice or tone of the user, and/or biometric data. In one embodiment, the user can answer a set of questions, posed by the vehicle, which produces initial settings for the user. In some embodiments, the simple questions can be asked to train the vehicle, e.g., when the vehicle is new or if the user has a new user account. In one example, the user that just purchases a car can answer simple questions in a questionnaire and the system will set most of the basic settings to the car. The questions can be posed by the vehicle itself or can be input via a website or mobile app, which are then transferred to the vehicle. In this manner, when the user drives off the lot in a new vehicle, the vehicle responds close to what the user wants. The user can also transfer settings and his/her answers to questions from prior cars, which may be saved in a profile of the user (e.g., user account maintained and managed by cloud services), so when the user buys a new car, the profile is instantly set with starting settings.

In other embodiments, training of the vehicle may take place, so the vehicle will understand the different tones of voice the user may have and assign specific voice profiles. For example, the vehicle will learn what a happy vs. angry response is, or sad vs. tired, etc. In one embodiment, the user may be asked to train the voice input system. The system may ask the user to speak some phrases, such as those needed for simple user interface inputs. For example, without limitation, the vehicle can ask the user to read the phase "Car, turn up the radio", "Car, warm up my seat", "Car, give me directions", "Car, where is the nearest fill station", "Car, get me home fast", "Car, find me gas now!", "Car, find me a restaurant now!", "Car, when is the next service?", etc. The system will learn the speech/tone of the user, so that future access is implemented in a vehicle response that is consistent with the input and tone. In one embodiment, the predictive response can include computing a prediction grid of assumptions, which are strengthen or weakened over time based on use. For example, if the user response as the vehicle believed the user to have responded, then the node associated with that predictive grid is strengthened. If not, the node is either removed or omitted. Further, answering some questions positive will likely produce a yes on the next node, and so the system can build up more nodes to the grid, and over time the node-grid connects gets validated or not.

In one embodiment, as user drives around, the cloud infrastructure is able to collect and attribute data about where the user is driving (e.g., GPS), access user profiles to get calendar information, schedule information, buying history, etc. In one configuration, contextual driving enables the system to collect ads (advertisements, discounts, rewards, coupons, loyalty points/credits, etc.) and/or recommendations for a later time period when the vehicle is not moving. In another configuration, the vehicle collects ads and/or recommendations and sends them to the user's account so that the information can be viewed later, when the driver is not moving the vehicle. In still another embodiment, the ads may be delivered to the user when the user needs them. For example, the driver earns credits over time for some reward or coupon, and the coupon or ad is only surfaced when the user needs it. When the user arrives at a Coffee Shop, the user's Coffee Shop account will show a discount that the user earned earlier, e.g., by viewing some ad on the street, viewing the ad later that was sent to the user's account because the user drives by the Coffee Shop often on way to work. As a technical advantage, this strategic surfacing of information assists to reduce distraction by throttling when ads and/or recommendations are surfaced. For instance, maybe ads are surfaced only when the use is at a stop light, only parked, finished driving, before the driver begins a route, etc. Instill another embodiment, the ads may be surfaced to the user only when the user is alone in the car, or maybe when the user prefers to see or get ads. This is method of throttling is instead of current models where vehicles may be flooded with user interface data, simply because the ads are available, instead of when the user wants the ads/discounts/coupons or when distracted driving can be reduced.

Figure 23:
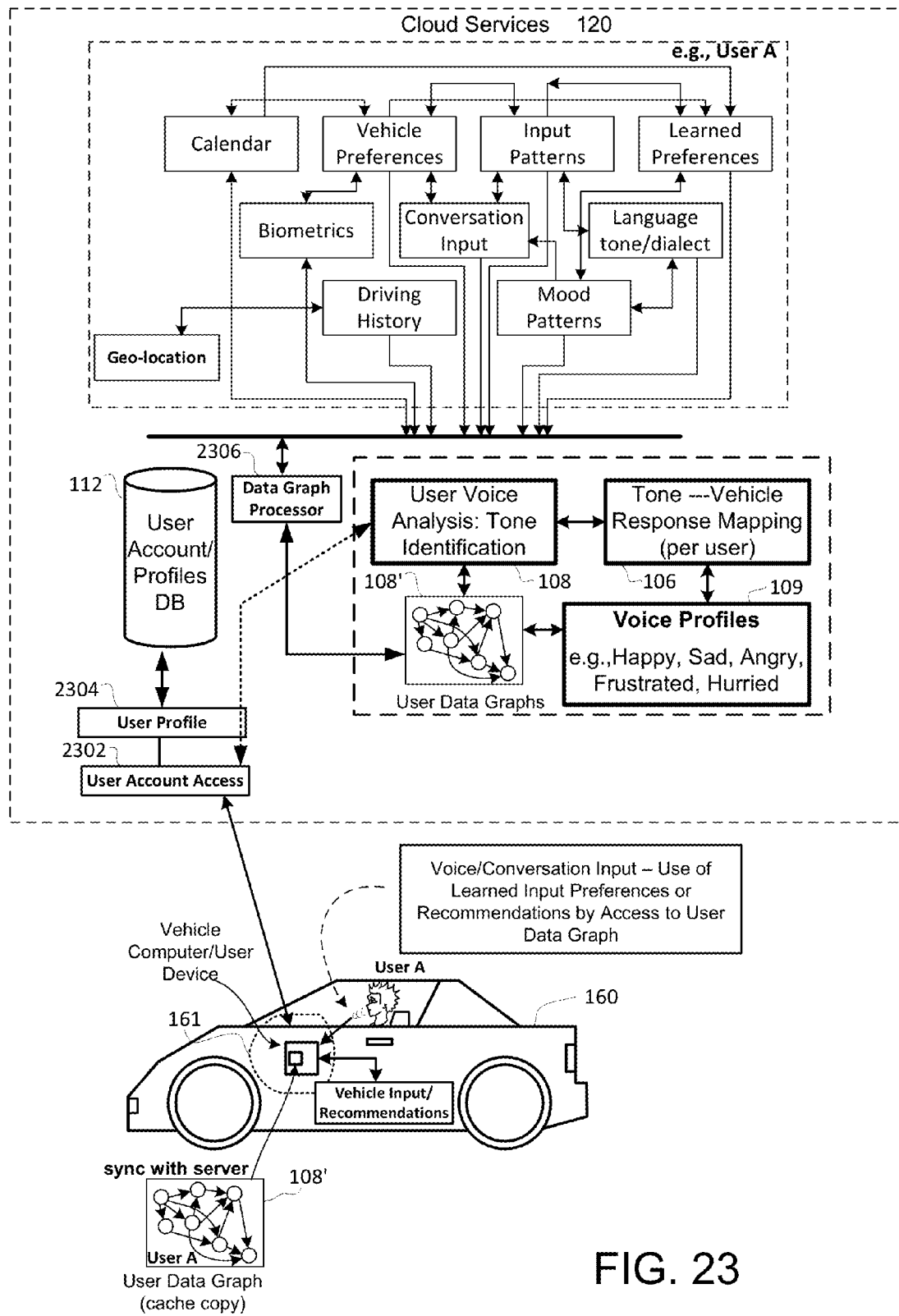
FIG. 23 illustrates an example system diagram of a vehicle interfacing with cloud services and receiving vehicle input or recommendations based on processed information obtained from a data store that defines a user data graph 108', said user data graph 108' is compiled or grows over time based on information collected, learned, input, obtained and processed for the user over time, in accordance with some embodiments.

FIG. 23 illustrates an example of cloud processing by cloud services 120 to receive inputs, process user behavior, obtain inputs from vehicle systems, access historical data, and construction and refinement of a user's data graph 108'. The inputs over time, which are made in the vehicle, are transferred to the cloud server or servers, in terms of data updates, and the data is processed by the data graph 108' processor 2306. In this manner, the user's voice input can be processed to identify tone and/or user behavior and the vehicle response and provides recommendations and/or settings or responses, based on the learned information obtained from the user data graph 108'. As mentioned above, the user data graph 108' may be processed by the server alone, or the vehicle alone, or a combination of the server and the vehicle, or a combination of multiple servers and devices. In various embodiments a copy or cache copy is maintained in memory of the vehicle so vehicle electronics (e.g., specialized hardware and/or software) can apply vehicle response quickly to voice input.

As shown in FIG. 23, the user A can provide voice input to the vehicle, which uses one or more microphones installed on one or more surfaces of the vehicle. For examples, some microphones may be installed near the driver and some installed in other locations, so as to identify who in the vehicle is speaking. In some embodiments, sound localization may be used to identify and filter voice input coming from the driver or specific passengers. In one embodiment, the vehicle may be used by user A, who may be using the vehicle with his or her user profile 2304 selected, e.g., via the user account 2302 access. The cloud processing 120 can identify the user account and profiles from database 112. In cloud processing, user inputs can be tracked over time, including the voices profiles used to command or request information from the vehicle. As shown, various systems of the vehicle can be tracked, sensed, and/or learned over time. This type of processing can include accessing calendar data, vehicle preferences, vehicle preferences, input patterns, learned preferences, biometrics, conversation inputs, language tones and dialects, driving history, mood patterns, geolocations, and interactions between one or more of these data processing entities.

In one embodiment, the user voice input can be analyzed in operation 108, the analysis can be, for example, to identify a tone that the user has in his or her voice when making a voice command, requesting data via a voice command, or dictating a text or message for sending by a communication system of the vehicle 160. As discussed in various examples in this application, the tone identification can include taking a sample of audio, processing the audio to identify analog characteristics (e.g., utterance sample, magnitude, frequency, durations between peaks in frequency/magnitude, features markers in the sample, lows and highs in the pitch characteristics, etc.). The processing of the audio can also include generation of an audio signature, which may be analog or digital.

In one embodiment, the audio signature is transformed into a digital signature, and on or more analog to digital (ADC) operations may be performed. The ADC processing can be performed by a specialized circuit, integrated circuit, or via software and a processor, or firmware. In operation 106, the tone that is identified is mapped to a vehicle response. This mapping is, for the specific user, e.g., for user A that accesses the system via a user account. For example, the cloud services 120 can operate to service many connected users, and each user will develop its own set of historical data that is usable to define or infer preferences, tones of voice, user inputs, etc. In operation 109, the voice profile is identified. The voice profile can be happy, sad, angry, frustrated, hurried, fear, surprise, disgust, etc. Based on the detected voice profile, e.g., in operation 109, the vehicle response is made by the vehicle 160. As noted above, the vehicle electronics may use a cached copy of the user data graph 108', which is used to make decisions as to the vehicle response to be made based on an identified tone. If a decision is made by the vehicle electronics 161, that input is saved, which may include what the tone was when the user made the input, the matching data between stored tones and the received tone, etc. This information can be, over time, synced with the server or servers of the cloud services 120.

Figure 24:
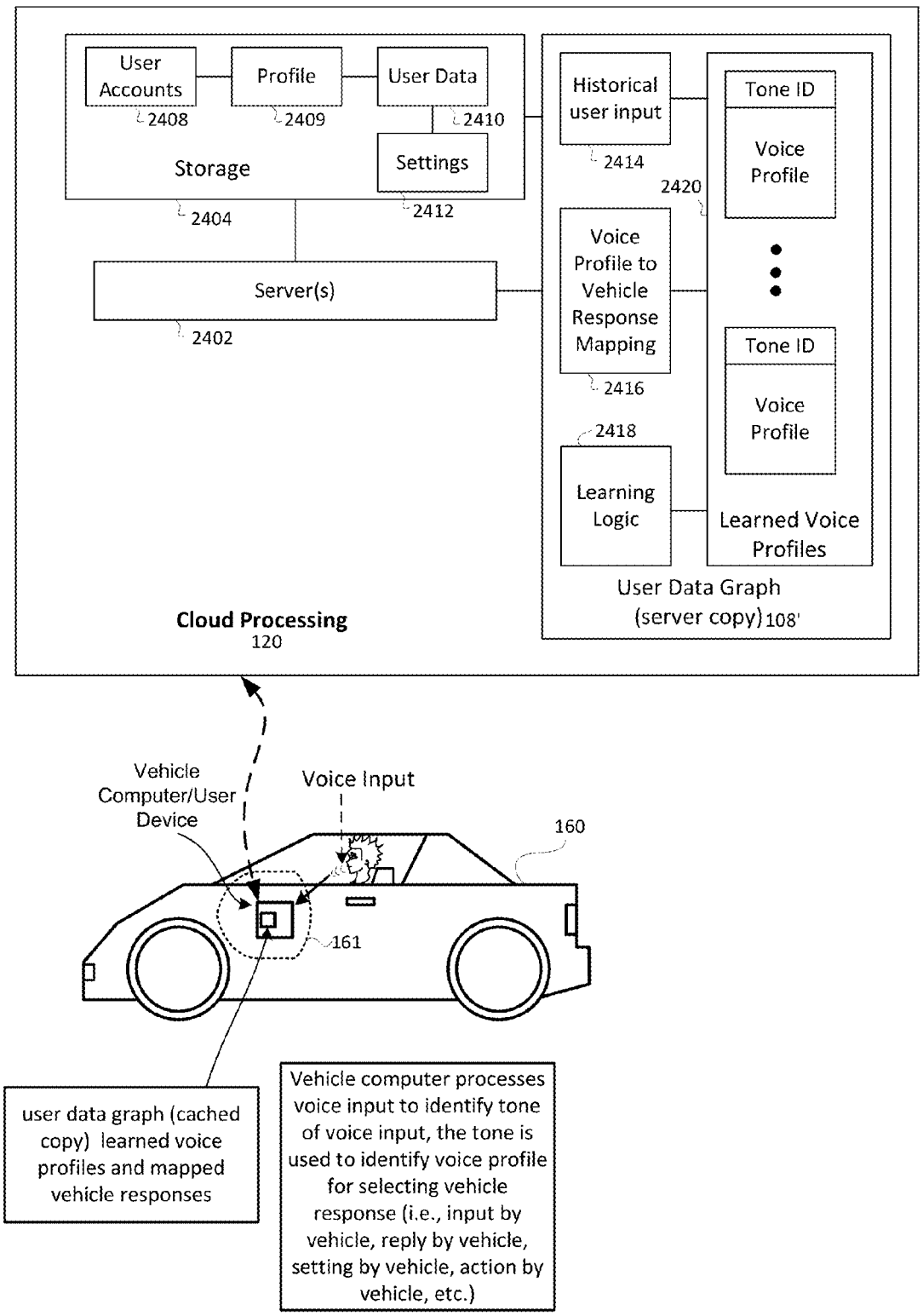
FIG. 24 illustrates an example of a vehicle interfacing with a user that provides voice input, and the vehicle (or portable device in communication with the vehicle computer) exchanges data with cloud processing, the tone of the user's voice input is used to determine or select a type vehicle response, in accordance with some embodiments.

FIG. 24 illustrates various examples of cloud processing 120, which includes servers 2402, storage 2404, and example processing used or interfaced by user data graph 108'. In one embodiment, a user account 2408 is maintained by cloud processing 120, and profiles of the user or sub-users are stored in profile 2409. User data 2410 is also stored, for specific users. The user data 2410, in one embodiment, may include user settings 2412 made by the user or recommended to users. Historical user input 2414 is further used or accessed from a user's data graph 108'. Voice profiles to vehicle response mapping 2416 is also stored or processed, along with learning logic 2418. In one embodiment, tone identifiers (IDs) are used for specific voice profiles. Thus, based on the user voice input, the tone is identified along with a corresponding voice profile. Using the voice profile, it is possible to map to a vehicle response. Over time, these inputs can be refined using learning logic, so that the response can change or mold as the user's behavior changes, e.g., as the user ages or as the user's day is going, or based on time of day, based on type of month, or simply because the user changes his behavior. As noted above, the tone ID can be defined by an audio signature. The audio signature may be obtained by sampling a portion of audio captured by microphones of a vehicle, which is then processed to produce the tone ID. The tone ID may, in some cases can be defined by a code, a vector, an analog curve, a digital score that can be graded, normalized, or categorized. In any of the embodiments, the tone ID, e.g., data that is used to represent the tone ID, can be normalized against the user's historical input, or can be normalized against a larger database on the server using data of one or more users.

Figure 25:
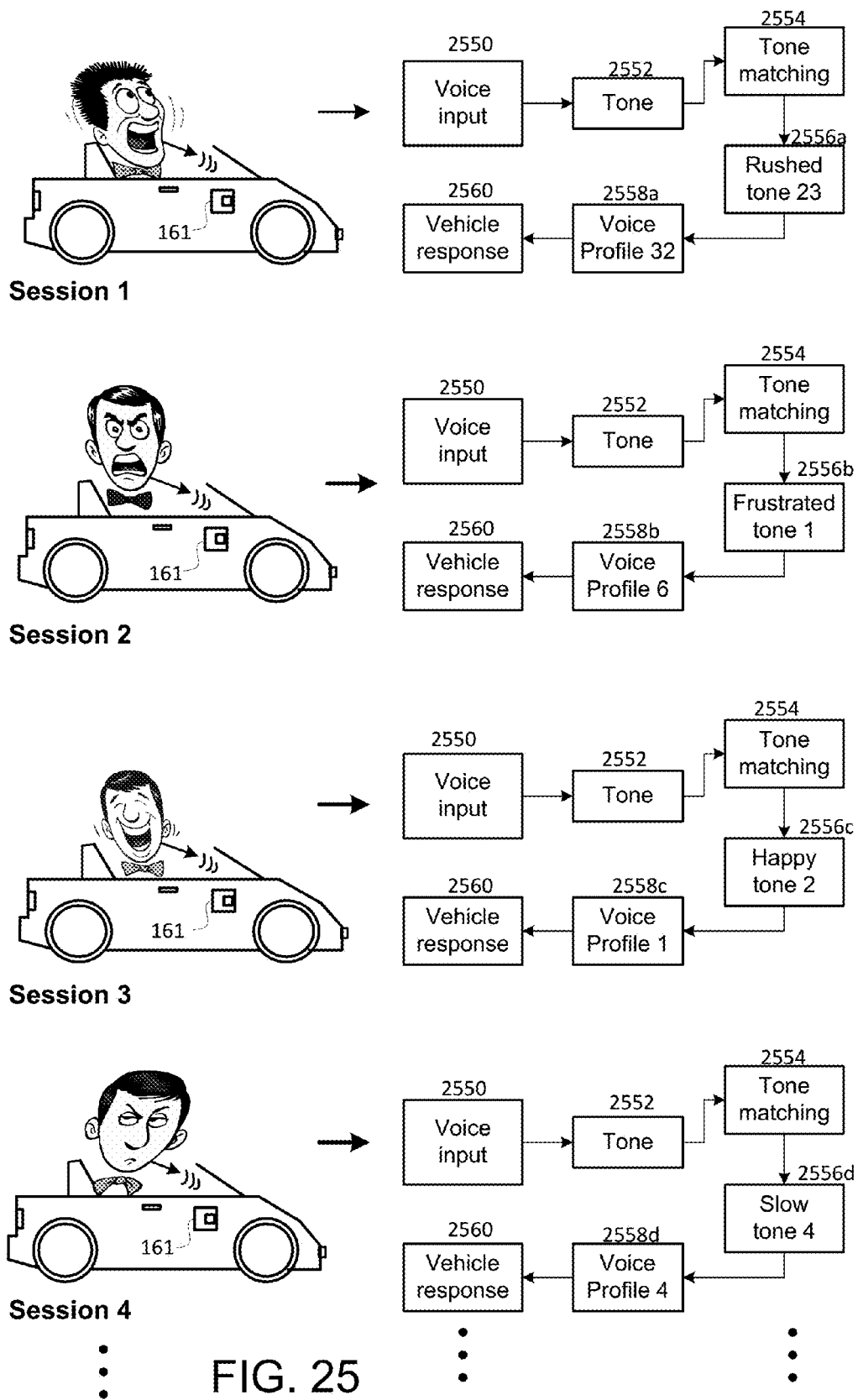
FIG. 25 illustrates a plurality of different user voice inputs, which may be provided by the user or users over time, and each voice input is examined for tone, which identifies the state of the user which is used to provide a vehicle input, in accordance with some embodiments.

FIG. 25 illustrates examples of voice input and vehicle response. These are only some examples, and more tone IDs can be constructed, based on the user's behavior. For example, some users have many types of tones, while some users have minimal changes in tone. Still further, some people have wide ranges of personality, while some have very rigid personalities that do not change, and thus the tone types can change, increase or decrease for specific user profiles. In the example, the user voice inputs 2550 can be provided to the vehicle over time, e.g., in various sessions (e.g., sessions 1-n). In session 1, the user voice input 2550 is provided to the vehicle and a voice sample or multiple voice samples are taken to identify a tone 2552. Using the identified tone, tone matching 2554 is performed to identify the type of tone used to make the voice input. In this example, the tone is determined to be a rushed tone 23, in operation 2556*a*. The voice profile, for the user A, is determined to be voice profile 32 in operation 2558*a*. In operation, using the voice profile 32, a vehicle response 2560 is processed.

In session 2 a vehicle response 2560 is produced for user when frustrated. In session 3 a vehicle response 2560 is produced for user when happy. In session 4 a vehicle response 2560 is produced for user when slow, and so on. Over time, the accuracy of detected tones in a user will be refined, e.g., with more use.

Figure 26:
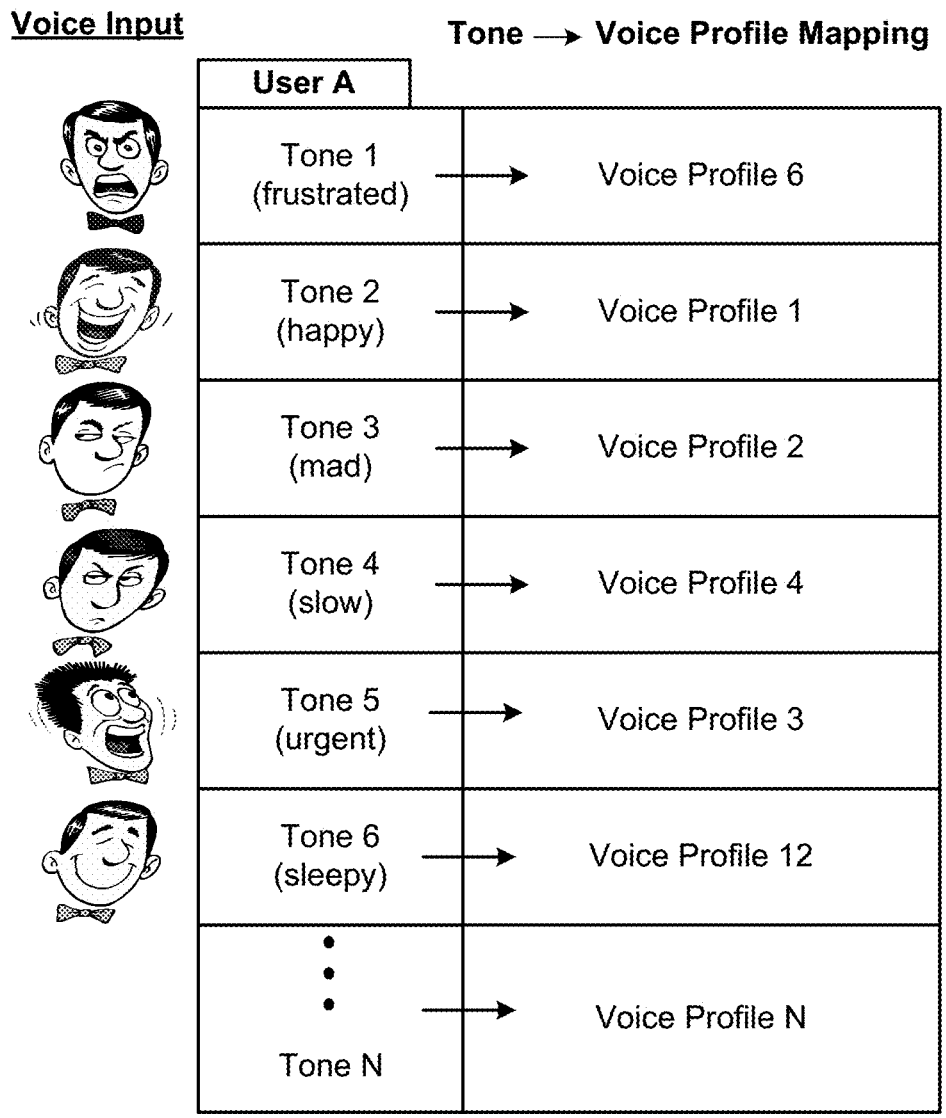
FIG. 26 illustrates a table that illustrates examination of tones of voice input and identification a voice profile, in accordance with some embodiments.

FIG. 26 illustrates an example tone to voice profile mapping function, in accordance with one embodiment. In this example, for a specific user A, based on learning over time, or based on calibration, user's detected tones will be mapped to specific voice profiles. These mappings may be adjusted from time to time, when it is determined that the mapping is incorrect or is changing. For example, if the user is happy but is providing loud or forceful voice inputs, this data can be adjusted to map the tone to a different voice profile. In some embodiments, the tone to voice profile can change depending on the time of day, day of the month, or when certain events occur to the user or are determined to have occurred by examination of the user's calendar, etc.

Figure 27:
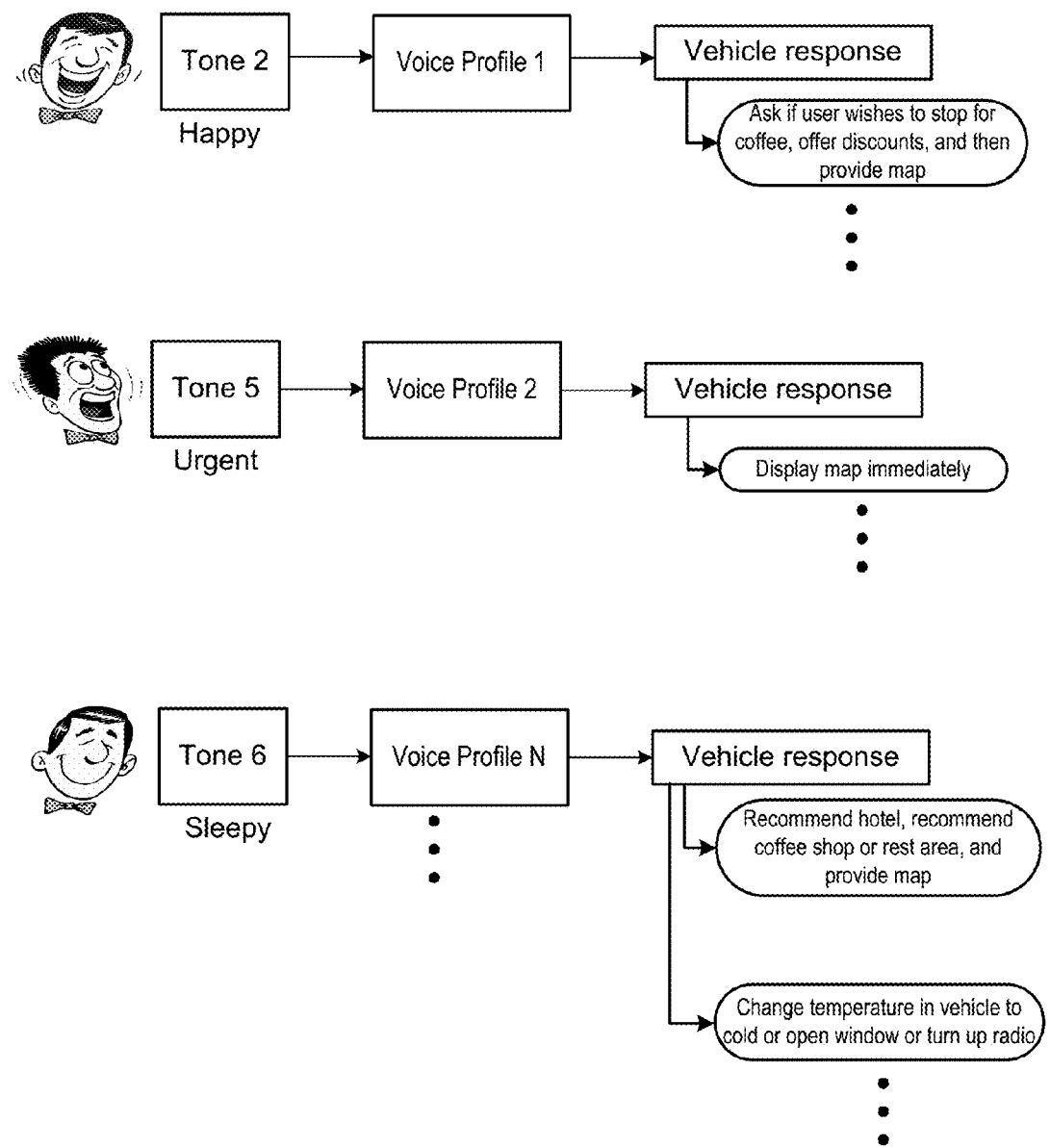
FIG. 27 illustrates processing of voice profiles based on input tones of the user's voice and the resulting vehicle response, in accordance with some embodiments.

FIG. 27 illustrates example vehicle response, as tied to specific tone-voice profiles, in accordance with one embodiment. As shown, when the tone 2 (happy) is identified, the profile 1 is found for the user. Based on the profile 1, the vehicle response is set for the request of, e.g., "show me a map." In this example, the vehicle may ask if the user wishes to stop for coffee, offer discounts, and can provide a map. Because the user is perceived to be happy, the system makes a determination that the user may be more receptive to the additional data.

For the example when the tone 5 (urgent) is identified, the profile 2 is identified. Because the user is perceived to be in an urgent state, the vehicle will respond more immediately, supplying the requested map. Since the user is in an urgent state, the vehicle will not provide additional data, e.g., coupons, discounts, suggestions, etc., since the user is likely less receptive.

For the example when the tone 6 (sleepy) is identified, the profile N is identified. Because the user is perceived to be sleepy, the vehicle response may offer one or more additional responses. For example, the vehicle may provide a recommendation for a hotel nearby, recommend a coffee shop, recommend a rest area, and provide a map (i.e., that was requested). In some embodiments, the vehicle response can include additional data, recommendations, or automatic settings. By way of example, the vehicle response can also include to automatically change the temperature in the vehicle to cold or open a window, or turn up the radio, or recommend any of these things or other suggestions. Thus, the vehicle response can be adjusted to cater to the tone of the user, e.g., so as to provide, augment, modify, moderate, and/or change the vehicle response to detected tone in the user's voice.

Figure 28:
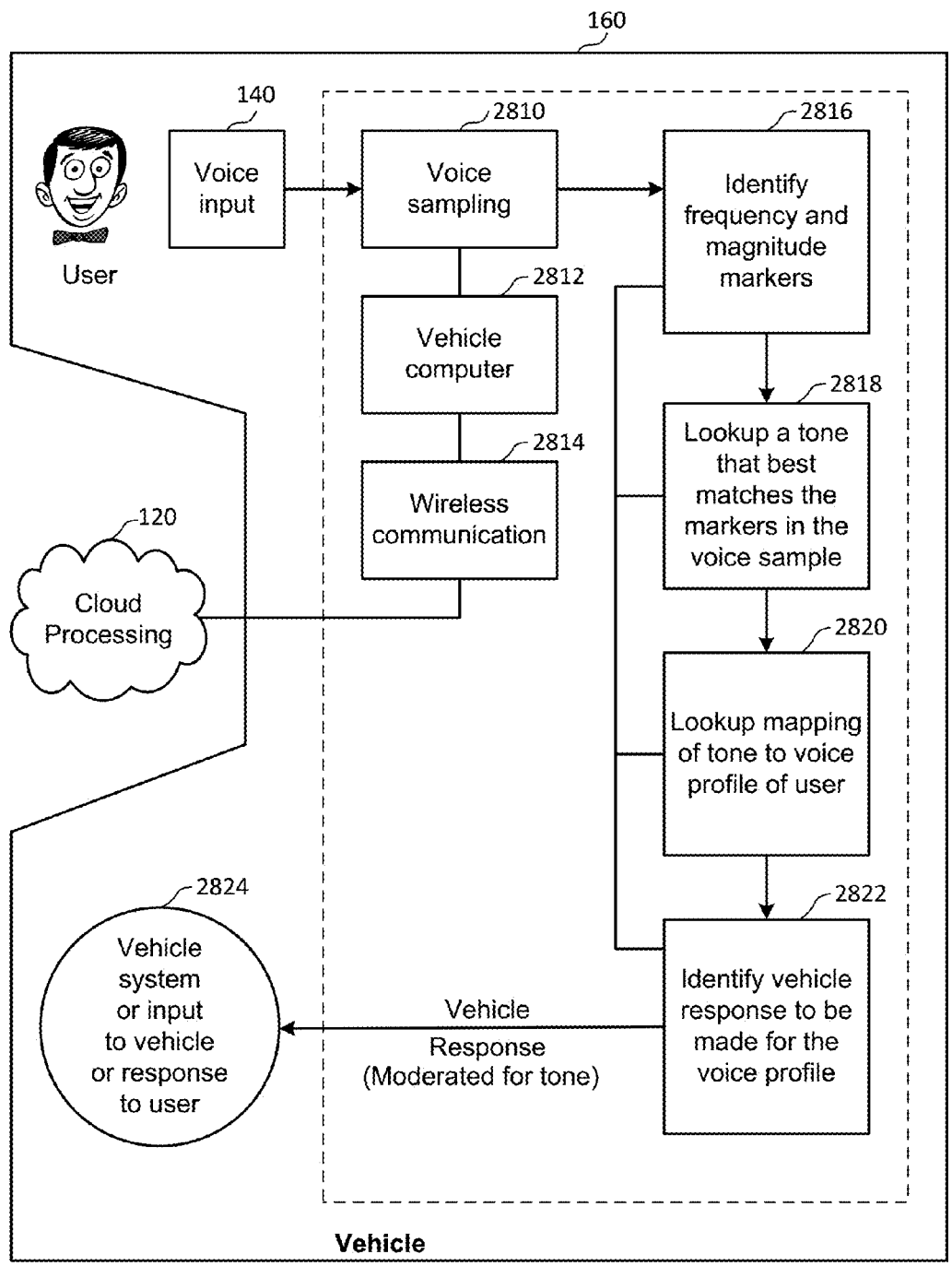
FIG. 28 illustrates an example of a user providing voice input to a vehicle, the vehicle being in communication with cloud processing, and the vehicle using real-time data obtained from cloud processing or data cached at the vehicle in order to identify a vehicle response for the tone and associated voice profile (e.g., the response being moderated for the tone detected in the user input), in accordance with one embodiment.

FIG. 28 illustrates example processing by electronics of the vehicle to process voice input and produce a vehicle response, in accordance with one embodiment. In this embodiment, voice input 140 by a user is provided to a vehicle input, e.g., a microphone of the vehicle. In operation 2810 voice sampling is performed. The voice sample can include identification of frequency and magnitude markers in operation 2816. The frequency markers can include separations between pitches, peaks in magnitude, waveform characteristics, waveform bursts, energy detected, etc. In some embodiments, it is possible to analyze the voice sample using a number of metric in combination, such as waveform analysis, pitch analysis, volume analysis, burst frequency, etc. In one embodiment, the voice input can be converted to text and the text can be associated with specific frequency and/or magnitude markers, states, typical inflections, word to word patterns, etc. In operation 2818, a lookup is performed to identify a tone that best matches the markers in the voice samples. In operation 2820, mapping is performed between the tones identified to a voice profile of the user. In operation 2822, the vehicle response is identified and made for the voice profile. The voice response is moderated for the tone identified in the voice input 140. The vehicle computer 2812 can be specialized to handle processing of the voice input, the voice sampling, and is configured to use wireless communication 2814 to interface wirelessly with cloud processing 120.

Figure 29:
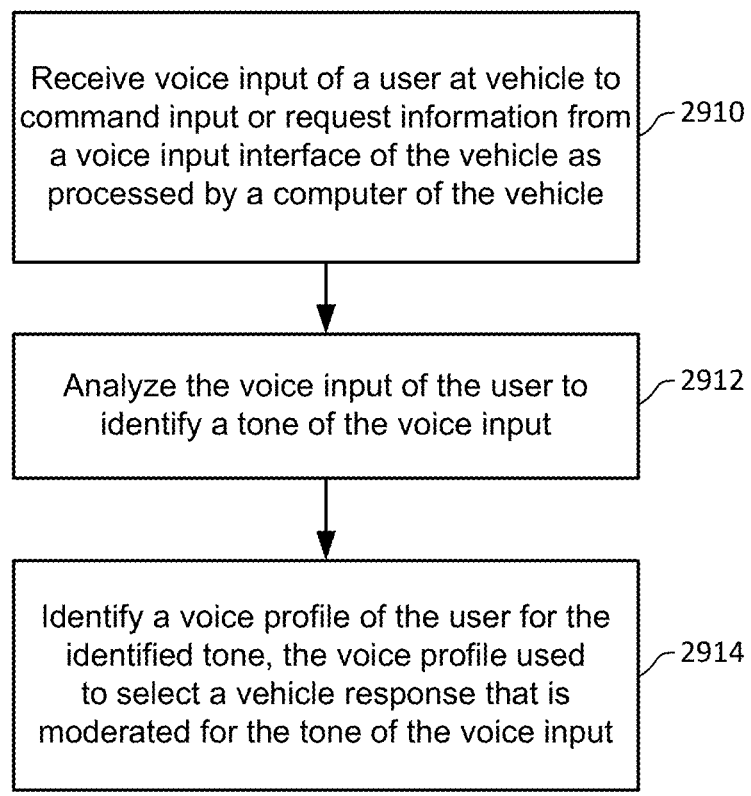
FIG. 29 illustrates an example flow diagram of receiving voice input and identifying a voice profile of the user for the identified tone, which is used to select a vehicle response that is moderated for the tone of the voice input provided by the user, in accordance with some embodiments.

FIG. 29 illustrates an example process for receiving voice input, analyzing the voice input to find a tone, and applying a vehicle response, in accordance with one embodiment. In one embodiment, the voice input is received in operation 2910. The voice input is of a user at a vehicle to command input or request information via a voice input interface of the vehicle. This voice input is processed by a computer of a vehicle, e.g., using the user's data graph 108', which includes information on how to identify the user's tones, identify the corresponding voice profiles, and selection of specific vehicle response for the voice input. In operation 2912, the computer of the vehicle is configured to analyze the voice input of the user to identify the tone in the voice. The voice input can be, for example, "find me a hotel near downtown Los Angeles," "call John Smith", "find a nearby charging station", "turn on the air", "heat my seat", "read me my calendar appointments," etc. The voice input can therefore be for any command to make a setting, change a setting, update data, read data, locate data, do an internet search, etc. The voice input 140 is therefore sampled to identify the tone in the user's voice in operation 2912.

In operation 2914 the voice profile is used to select the one or more vehicle responses. As used herein, a vehicle response can be one or more actions, and the actions can include to return data, read out data, input data, make a setting, change a setting, send data, read data, make a text, read a text, dictate a message, make a call, recall a map, change the climate, make an entertainment setting, set a security setting, learn a setting, without limitations to other examples described in this document.

Figure 30:
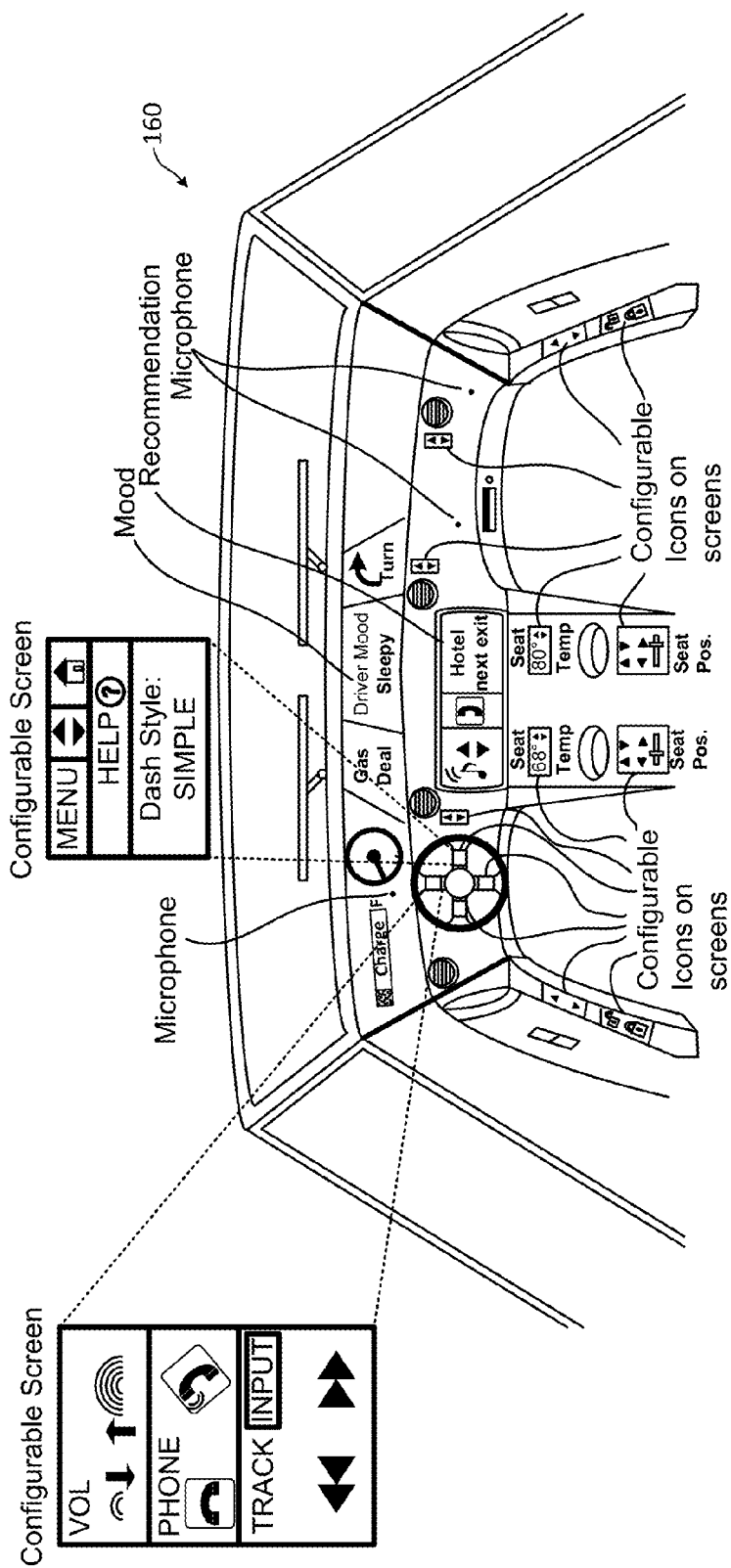
FIG. 30 illustrates one example of a vehicle driving compartment and the passenger seat, wherein a plurality of physical controls can be customized by the use of dynamically changeable screens, which allow physical controls the change functionality, display complexity, or information types, for blending the physical controls with an interaction mode of a vehicle, in accordance with several embodiments.

FIG. 30 illustrates one example of a vehicle 160 driving compartment and the passenger seat. In this example, the vehicle will typically include a number of switches, dials, controls, buttons, scrollbars, pushbuttons, levers, which are commonly considered to be physical input devices to control settings or features of the vehicle. Commonly, these physical inputs will include fixed icons which are typically painted or permanently engraved on the buttons. For example, the up and down arrows on window opening controls are typically fixed. Other fixed controls may include the buttons for turning up or turning down the air conditioning, buttons for opening a door or locking a door, volume controls for audio, door locks, audio control buttons, seat positioning buttons, and the like.

In accordance with one embodiment, these physical inputs are configured to include one or more graphical screens which can change depending on the interaction mode selected for vehicle. For example, the dial button use for air-conditioning can be changed to a dial button use for the radio. In one further example, a graphical screen can be defined over the button or physical input or beside or around the button or physical inputs.

Thus, the user can identify what each button or control is capable of doing in the vehicle. In some examples, some of the screens associated with physical inputs can be replaced with different icons or control identifiers. If the interaction mode is a senior mode, the icons, text, controls, can be magnified in size, type, or can be simplified. In some embodiments, the buttons, icons, text, and associated screens or displays for certain ones of the physical inputs can be set in accordance with the theme associated with the interaction mode, or can be individually adjusted or changed without regard to interaction mode. FIG. 30 also illustrates example locations of microphones, which may be used to detect voice input, identify who in the vehicle is speaking, mask out nose, and/or focus on specific users (e.g., driver or specific passengers).

In the illustrated example of FIG. 30, screens can be positioned in different locations to avoid the need to add additional buttons throughout the cockpit of a vehicle. In some examples, the steering will can have screen displays that are easily touched or interfaced with to avoid distraction. Certain screens on the steering wheel may change, for example to provide access to inputs that would normally be associated with physical inputs. In one embodiment, fewer physical inputs are provided throughout the vehicle and are replaced with configurable screens that provide the functionality that would otherwise be required via the physical inputs. The example locations on which the inputs can be provided are simply that, just examples, as they can be provided anywhere in, on or around the vehicle.

This type of interactive display and control provided in vehicles can assist vehicle makers to provide fewer buttons that are physical and reduce the cost and weight of a vehicle. In one example, the steering will may have configurable screen to allow the user to adjust the volume, lock or unlock the phone, change the music, access menu items, access the user's home, ask for help, change the dashboard style, set the configuration mode, and the like. As further shown, one of the inputs can be to simply toggle between one or more interaction modes.

The interaction mode selected in the example of FIG. 17 is simple. In one embodiment, the interaction mode can be dynamically switched based on the user of the vehicle. In one embodiment, the interaction mode can be associated to a profile that is maintained for a user, and the profile can be used in different vehicles such that interaction modes can be automatically applied to different vehicles, whether owned or used or shared or rented. In another embodiment, features of the vehicle can be provided with sensors, such as cup holder sensors.

In one embodiment, a learning algorithm can be provided to determine if the user likes to cool or warm a beverage that may be positioned in the cup holder. For example, if the time of day is morning and the cup in the cup holder is detected to have warm liquid or a warm temperature, the cup holder can automatically turned on to maintain a substantially warm or hot temperature of the contents in the cup (if heating features are provided). In another embodiment, an analogous process can be performed to cool or maintain the cool temperature of liquid in a cup holder, based upon the context of the learning. For example, if it is determined to be a hot day, and based on previous patterns of use the user has selected to keep cops cool in the cup holder's (if cooling features are provided), the system can automatically set the cup holder to maintain the cool temperature of the cup or its contents.

Still further, other sensors in the vehicle, such as presence sensors can identify whether more passengers or fewer passengers are inside a vehicle. Depending on temperature conditions outside, and based on learning of previous patterns of the user who may have had passengers in the past, it is possible that the temperature inside the vehicle is lowered 3 to 5° cooler than normal. This may be true because more vehicle passengers can raise the temperature of the cockpit, which may require additional cooling. Still further, the context of additional passengers can also detect whether additional passengers have their own devices in the vehicle, and certain settings for those devices can be shared to those devices.

In some embodiments, inside vehicle environmental characterizes may be measured with sensors. For instance, an oxygen sensor may be configured to measure the oxygen characteristics inside the vehicle. Another sensor may be a carbon dioxide sensor, which may be able to measure the presence of more than one person in the vehicle, e.g., since more people will be exhaling. In some embodiments, temperature sensors in the vehicle can determine when persons are sitting on specific seats. In other embodiments, heat sensing cameras can identify the presence of persons in the vehicle, their seat locations, their body mass (e.g., adult, child, infant). Further embodiments, may combine outputs from the various sensors, which may be integrated with vehicle electronics for processing the sensed data, and then use the data to identify the persons and locations of such persons in the vehicle.

For example, passengers may be able to connect to a Wi-Fi or Internet connection provided by the vehicle. This connection can identify the other devices are contained or located within the vehicle. This information can be used to provide those specific devices access to certain controls of the vehicle. The controls provided can be based on learning associated with previous privileges granted by the primary user account in the vehicle, which is typically the driver. For more information on sharing vehicle controls to user devices, reference may be made to U.S. application Ser. No. 14/222,670, entitled "Methods and Systems for Providing Access to Specific Vehicle Controls, Functions, Environment and Applications to Guests/Passengers via Personal Mobile Devices," which is incorporated herein by reference.

FIG. 30 further illustrates a hybrid physical/display controls with an associated interaction mode customization. In this example, a simplified dashboard of a vehicle is provided. The simplified dashboard can include certain gauges that are necessary for driving, yet the clutter provided in the vehicle displays is reduced as described above. In this example, there is one physical input to the left of the steering wheel and 3 physical inputs to the right of the steering wheel. For simplicity, the physical inputs are shown as dials.

It should be understood that the physical inputs can take on various forms such as pushbuttons, toggles, sliders, press in controls press out controls pull out controls twist controls shift controls etc. Continuing with the example, for purposes of understanding, the four physical input dials may be allowed to twist turn be pressed be pulled or selected. In accordance with one embodiment, the physical inputs may also include a screen that provides the readout of the text shown in the examples. This text can be configured to change based on the interaction mode selected for the vehicle. In one embodiment, a senior mode can be selected for the vehicle, which may indicate that the dials should be maintained as simplified as possible and any text should be amplified or enlarged so that control and access is easier for older adults.

For example, one button may simply indicate wipers, the next button volume, the next button tuning (audio), air conditioning, and the like. As noted above, more than four physical buttons provided with a hybrid display can be provided, and this is only one example to convey the simplicity of configuring displays associated with physical inputs. In another example, an intelligent mode may be selected for the vehicle, which may dynamically change what is displayed on the physical inputs. The display the physical inputs can be a small LCD screen, a touchscreen, proximity non-touch screen, gesture input screens, icons, text, combos of text and icons, colors, a screen typically used on a smart phone, or the like.

Thus, users can provide touch input to the buttons similar to the way touch input is provided on screens of a smart phone or a tablet. In addition, the buttons can also be manipulated as physical inputs to provide an additional level of change, input or interaction. In another example, the interaction mode can be changed to provide for an informed mode. The informed mode can also again change was displayed on the faces or surfaces of the physical inputs.

Thus, the physical control devices may be pressed, tuned, dialed, touched on the display screen parts etc. In still another embodiment, the display screens can be provided beside the physical inputs so that the screens are not on the buttons themselves. For example, the surface beside underneath or above or below the physical inputs can include small screen that dynamically changes to identify what the physical inputs are provided to do. Thus, based on the configuration provided to the physical inputs, the content displayed on the physical inputs or beside or around the physical inputs can define what functionality those particular inputs can render for the vehicle. As such, the dynamic adjustments and changes to the physical inputs of a vehicle can further assist in customizing the users feel and interaction with a particular vehicle.

This functionality provides a further dimension in customization for vehicles, at certain drivers prefer less technology while others prefer more technology, and others prefer simplified interfaces common in older vehicles. These customizations provide for less distraction to drivers and should improve safety, as the interfaces are provided in a way that is most comfortable to the specific user.

Figure 31:
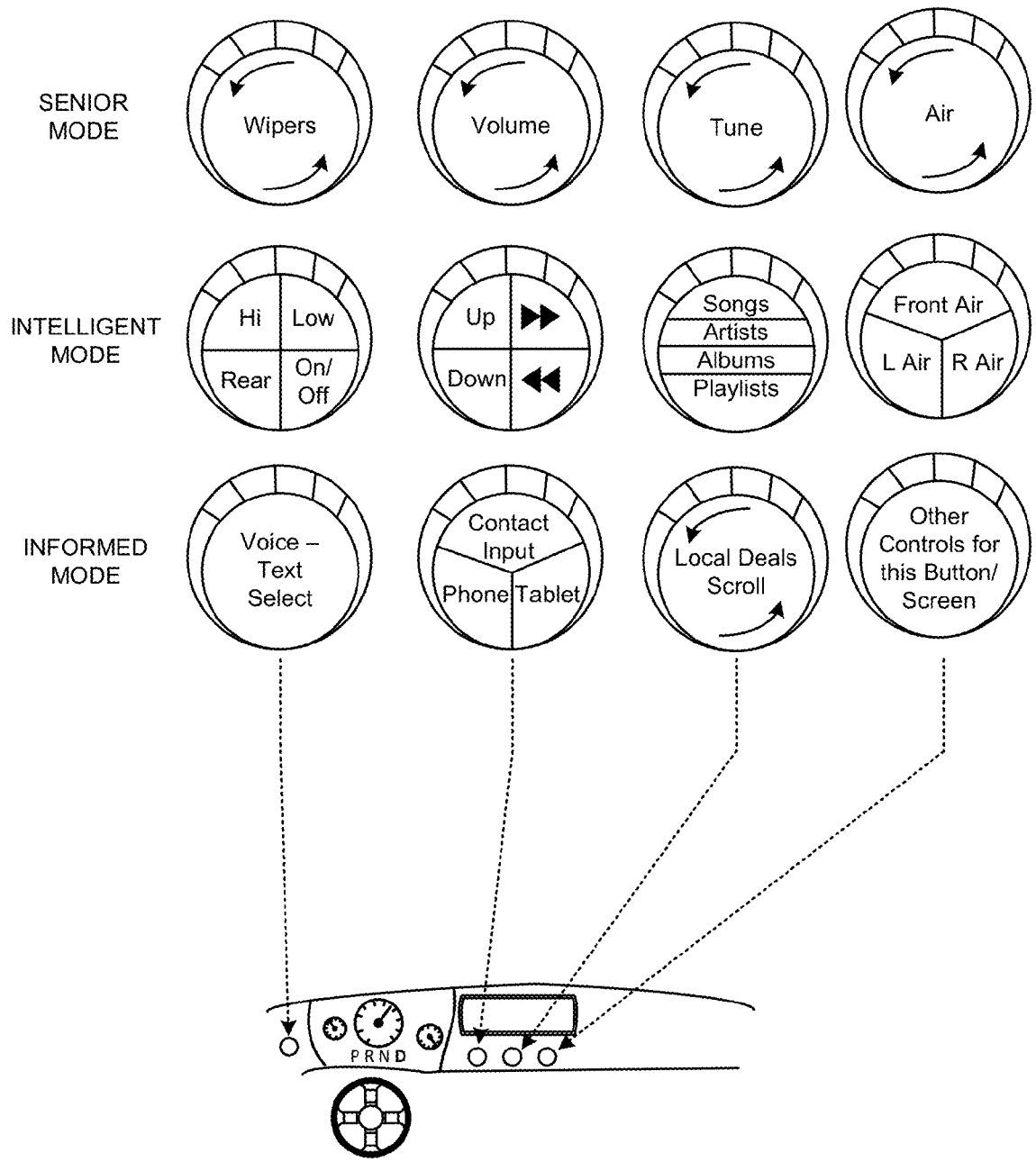
FIG. 31 illustrates a hybrid physical/display controls with an associated interaction mode customization.

FIG. 31 illustrates an example of a car dashboard having interaction styles and screens and settings therefore, in accordance with one embodiment. In this example, the text and icons and language can also change for specific vehicle based on the configuration settings, interaction modes, and customize settings by particular users. In these examples, one interaction style can be a factory setting. The factory setting can provide definitions for adjustments that can be made to climate events, seat controls, windows, latches, and the like.

FIG. 32 illustrates example vehicle interaction settings and styles. These settings can be made via any number of interfaces, e.g., input screens of a vehicle, voice inputs, portable device inputs, etc. In some embodiments, voice inputs can be made to set any one of these settings, making changes, updates, etc. In some embodiments, the inputs can also be via one or more touch inputs, gesture inputs, etc. The modes can, in one embodiment, assist in automatically changing groups of input settings and/or interfaces in the vehicle. In some embodiments, the voice input can be treated differently depending on the user making the input and/or based on the selected mode. For example, if the mode is "senior mode," the voice profiles can be used for senior mode, and associated mapped vehicle responses can be made. The same can be done, e.g., if the user is a teen, and the mode is "fun mode," and other modes.

Furthermore, a senior mode can be provided with icons, text, language familiar to a specific user or demographic. Another example mode may be a fun mode, which allows more customization to certain features. This customization can be very complex and can also be descriptive instead of in the form of express settings. The descriptive inputs can be translated to specific inputs by the computer. It should be understood that these particular settings can be predefined by the user either in the vehicle, via a user device, at a website, or some other way that can be associate to a user account and a given profile of that account.

Learning can therefore take place over time for that specific profile. The user account may also be transferred from vehicle to vehicle if the vehicle supports application of interaction modes, or application of certain settings saved in a profile of the user account. It should be understood that some vehicles may not have interaction mode capability, but may allow customization of certain features automatically based on the user account.

This customization may allow for at least one or more features to be automatically transferred from one vehicle to another. In other more advanced vehicles, more configuration modes are settings can be transferred or used in specific vehicles. Accordingly, the amount of customization and dashboard transferability from vehicle to vehicle will vary from few to more features being configured or transferable, depending on the manufacturer, the software, the systems integrated therein, and the functionalities of the vehicle.

Figure 33:
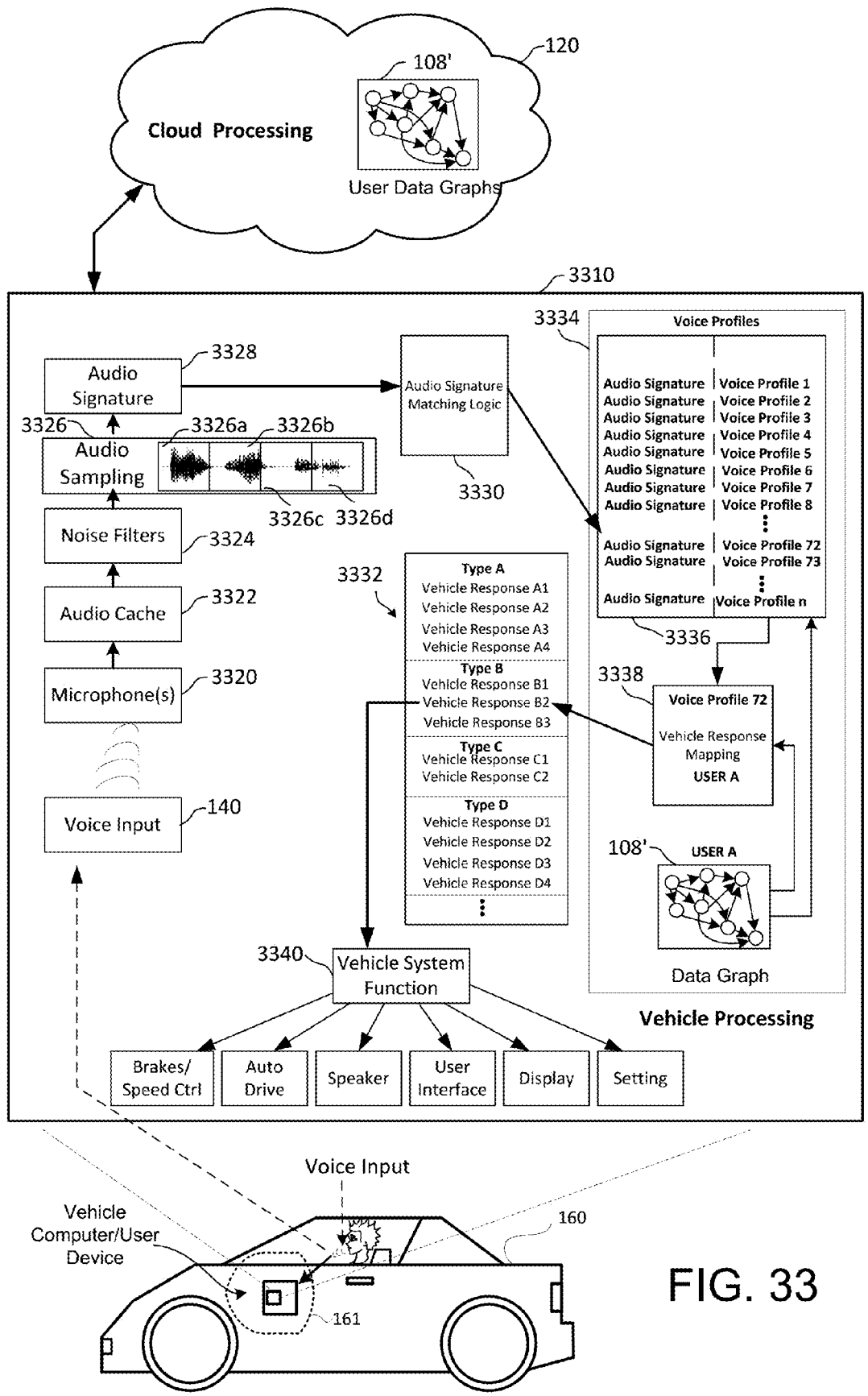
FIG. 33 shows an example of a vehicle that includes vehicle processing for handling voice input of a user, the voice input is captured by one or more microphones in the vehicle and processing enables identification of an audio signature that represents the user's tone in his or her voice, to then enable selection of a specific vehicle response type, among various options, in accordance with some embodiments.

FIG. 33 illustrates one example of voice input processing 3310. As mentioned earlier, the vehicle processing can be performed on electronics of the vehicle, e.g., using the data graph 108'. The data graph 108' may be a cached copy of the user data graph 108' maintained in cloud processing 120 for the user. In processing by the vehicle processing 3310, the voice input 140 is captured by one or more microphones 3320 of the vehicle. One or more portions of memory, e.g., RAM, DRAM, solid state drive (SSD) cache, or hard drive storage, are used to store or cache some of the voice input. In one embodiment, amount of voice input can be one or several seconds, which may be enough to identify some tone or markers in the tone of voice of the user. The audio cache 3322 is used to hold enough analog voice sounds to enable analysis. In some embodiments, the audio cache 3322 can store multiple samples, e.g., several words, statements, voices statements made over one or more sessions, days, months, years, etc. In one embodiment, noise filters 3324 may be implemented in the form of analog and/or digital filters to remove certain frequencies, sounds, background static, etc. In some examples, the noise can be other people talking in the vehicle, road noise, wind noise, entertainment noise, and combinations thereof.

Then, a portion of the audio that is in the audio cache 3322, e.g., which may be before or after noise filtering, can be audio sampled 3326. The audio sampling, in one embodiment, can include performing frequency analysis, magnitude analysis, modulations, tone shift analysis, marker identification in the sampled audio, peak analysis, intensity analysis, duration analysis, modulation changes, etc. The audio sampling can occur in the analog domain or in the digital domain, or part in analog and part in digital.

In one configuration, based on the analysis, an audio signature 3328 is produced. The audio signature may be for one audio sample or the result of analyzing two or more audio samples. For example, one audio sample may be for one word, a group of words, a sentence, a period of time, e.g., 1 second, 3 seconds, several seconds, etc. In the example shown in audio sampling 3326, the various wave forms may be for specific words, such as "show me a map", wherein 3326a is for "show," 3326b is for "me", 3326c is for "a", and 3326d is for "map." In this example, the audio samples show that the user emphasized the words "show me" and then be emphasized the words "a map." This may be consistent with the user in an urgent state, who wishes to get a map urgently. This can be determined based on prior user voice analysis, and validated based on the user's response to the vehicle responses actions when voice input is used. Over time, the determination of which audio signature matches the appropriate vehicle response can be updated. As mentioned above, the users data graph 108' can be updated from time to time, based on the type of response the user gives to the vehicle response. If the vehicle is responding appropriately, then the vehicle response can be reinforced and applied additional weighting. If the vehicle response is not responding appropriately, a downgraded weighting factor can be applied to influence correction of the vehicle response for future inputs.

The audio signature is, in one embodiment, representative of the characteristics of the user's voice, when making the voice input(s) 140 to the vehicle. In one embodiment, the audio signature represents the identified tone in the user's voice. The audio signature can therefore be used to perform matching 3330. The matching is to the voice profiles 3336 of the user, e.g., as defined or accessed from the user's data graph processing 3334. In one embodiment, the audio signature may be used to identify voice profile 72 for a user A. The voice profile 72 is then used to select or map to a type of vehicle response. In this example, the voice response is type B, but a specific type is B2. For instance, the voice input may be, "find me a hotel." The response B may be a map to a hotel. The response B may be B2, finds a map to a hotel and finds a discount, if the user has a tone that would be receptive to getting discounts. If the user is angry, the user may not be receptive to hearing about discounts, and a simple address is returned a local hotel. In a sense, the response by the vehicle is moderated for the tone in the user's voice. As shown, a vehicle system function can set. The vehicle function can be, for example, application of brakes automatically to avoid an accident, speed controls, auto-drive modes, speaker settings, user interface settings (e.g., providing maps, hotels, deals, locate data, voice-type text messages, etc.). The display may be adjusted, and settings may be made to any controllable part of the vehicle.

Figure 34:
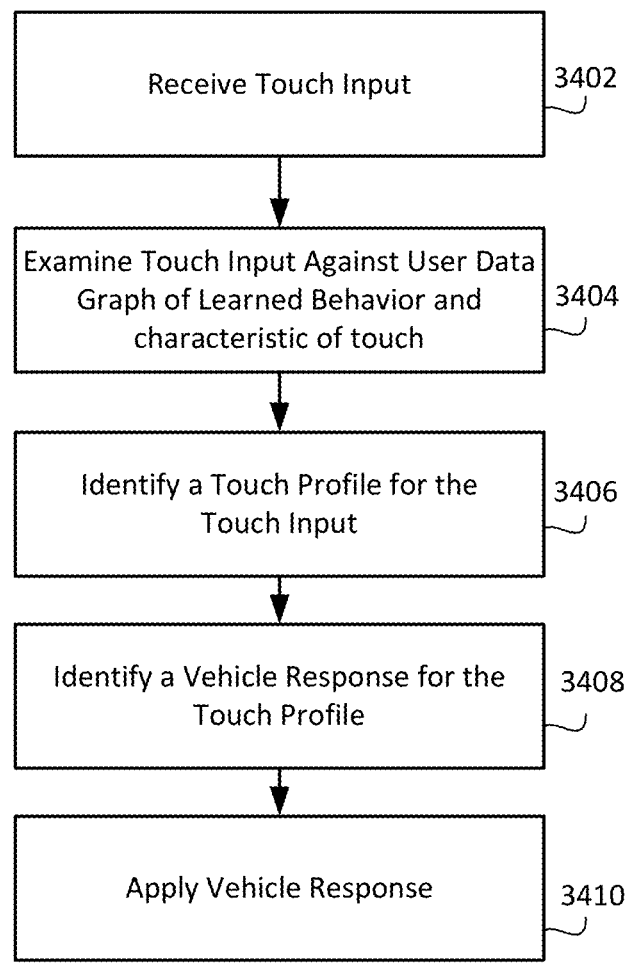
FIG. 34 illustrates processing that can be performed to analyze touch input to determine a vehicle response, in accordance with one embodiment.

FIG. 34 illustrates an example of using touch input to characterize the type of vehicle response. For example, based on the touch input characteristic, the vehicle response can be moderated. In operation 3402, the vehicle response is received. In operation 3404, the touch input is examined against user data graph of learned behavior and characteristics of touch. In operation 3406, a touch profile is identified for the touch input. For example, the touch input characteristics can be hard contact, hard presses, repeated touches with different force, gesture speed, hand motion rates, softness of input touch, contacts by the user on other surfaces, e.g., griping wheel hard, soft, repeated squeezing, etc. In operation 3408 the vehicle response is identified for the touch profile. The vehicle responses can be, for example, similar to those made in response to voice input. In some embodiments, the vehicle response can different or in addition to those made in response to voice inputs. In operation 3410, the vehicle response is applied by electronics of the vehicle, e.g., via communication to specific vehicle systems direct, via application programming interfaces (APIs), or via combination of electronic inputs, mechanical inputs to mechanical components of the vehicle or combinations thereof.

Figure 35:
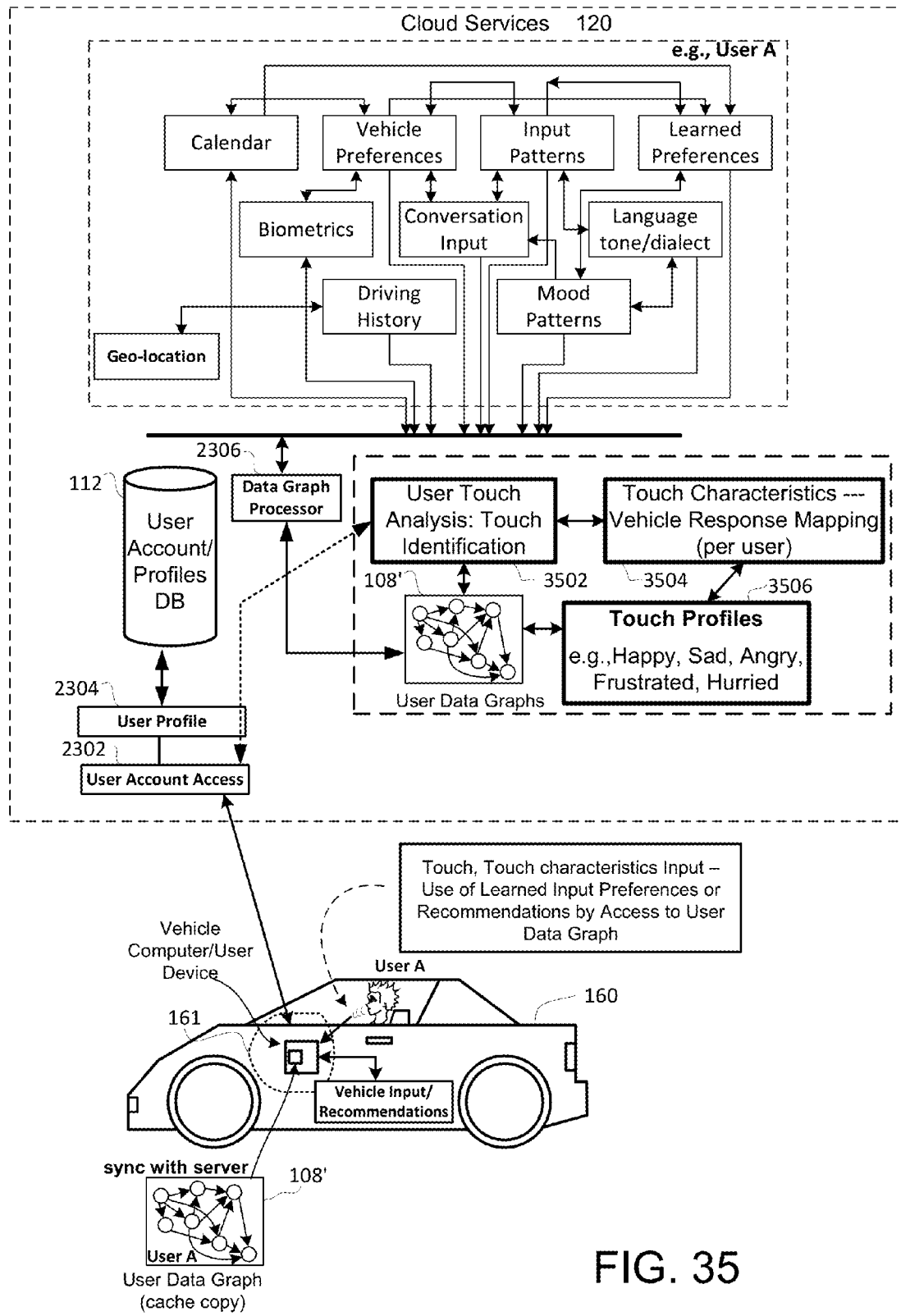
FIG. 35 illustrates an example similar to FIG. 23, except that these inputs relate to touch inputs. In this example, user touch analysis can be performed in 3502 in order to identify the type of touch, in accordance with one embodiment.

FIG. 35 illustrates an example similar to FIG. 23, except that these inputs relate to touch inputs. In this example, user touch analysis can be performed in 3502 in order to identify the type of touch. For example, the touch can be hard, soft, slow, repeated, intermittent, can have specific durations, specific accuracy, etc. In operation 3504, the touch characteristics are mapped to specific vehicle response(s). In operation 3506, the touch profiles are identified for the touch input, similar to the processing done for voice input. In these operations, the user data graph 108' can be accessed to determine what specific touch profiles mean for specific users, e.g., using one or more of the collected historical input data. For example, the touch can analyzed to determine what types of input mean for identifying the user's mental state, mood, and/or behavior.

Figure 36:
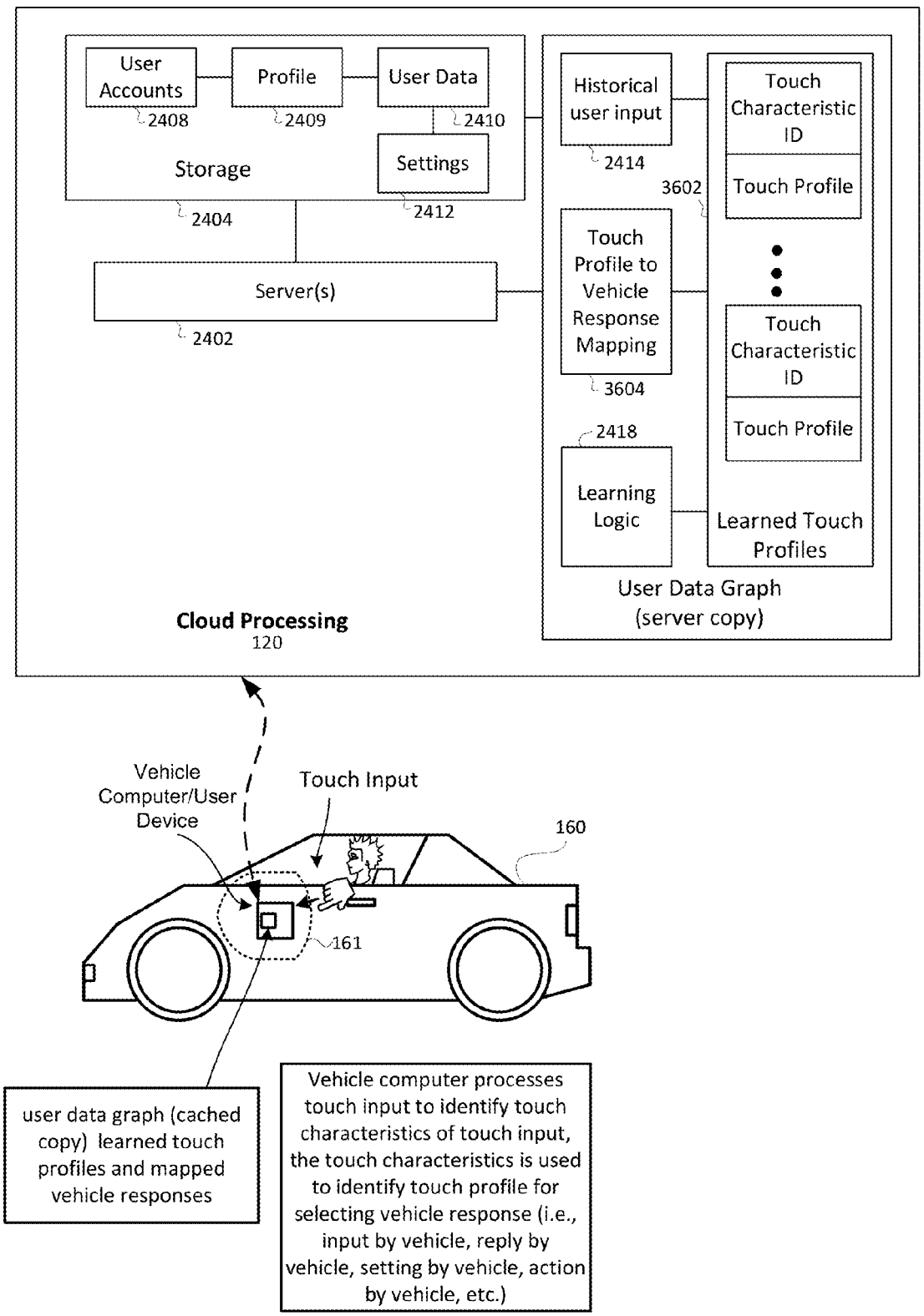
FIG. 36 illustrates an example of using touch input to identify a user's mood and then to identify a vehicle response, in accordance with one embodiment.

FIG. 36 illustrates an example of using touch input to identify a user's mood and then to identify a vehicle response. In one embodiment, touch characteristics can be arranged or quantified by touch characteristics IDs 3602, based on the received and analyzed touch. The touch profile can be identified, e.g., from the user's data graph, which includes learned data regarding touch input by the user. Mapping 3604 can then be done, such as to identify touch characteristic IDs, and then a vehicle response can be made by the vehicle 160.

FIG. 37 illustrates several examples of using touch characteristics (TC) in order to determine the mood, state, or mental state of the user while driving. Generally, touch characteristics can be monitored over time, for example during multiple sessions of use by a user. The more the user uses the vehicle and the touch characteristics are sensed and processed, the users data is graph will continue to be reinforced an optimized to ensure that the proper reading of the user's mood, state of mind, or mental state can be detected so that the proper vehicle response can be returned and applied by electronics of the vehicle 161. In some embodiments, the touch characteristics can include sensing whether touch accuracy has low, medium, or high accuracy. Touch characteristics can also include determining a touch duration, which may include short, long, medium, or any value in between. Touch characteristics can also include touch intensity, which can include low touch intensity, medium touch intensity, and high touch intensity. Generally speaking, the touch characteristics are measured using a touch surface on the vehicle, such as an input screen, a button, a surface, a consul, a steering wheel, a window, a glass surface, a touchscreen, a joystick, a gear shift, a glove compartment, a handle, a toggle button, a switch, an object, or any other service or thing that can be touched and interfaced with.

Generally speaking, the touch surface can be a surface or object the can read or sentence using sensors integrated with the vehicle to identify the type of touch profile being provided to the vehicle. As illustrated in FIG. 37, the touch input 3750 can be received by some interface of the vehicle as mentioned above. The touch input is then provided to touch characteristic analyzer 3752, which determines the type of touch characteristic generated by the users input or control. For instance, the value may include some number for touch accuracy, touch duration, touch intensity, and these values can be matched by a touch characteristic matching module 3754. The matching attempt the match from previously saved models which type of touch input was received by the user. Based on the matching, operation 3756a determined that the touch profile was a rushed profile, which corresponds to touch profile 32 in operation 3758a given the profile 32, the vehicle response 3760 can therefore apply the input to the vehicle electronics 161. The vehicle response, as mentioned above, can include making a setting input to the vehicle that causes the vehicle to make a change to a physical object (e.g. seat, temperature, brakes, steering wheel, window, entertainment settings, Internet settings, automatic driving parameter, cruise control, etc.).

The vehicle response can also include returning information back to the user, such as information requested from the Internet. Information that is returned as a vehicle response can also be moderated, or changed in form so as to reduce distractive driving. As illustrated, the process can continue over time in various sessions, such as sessions 2, 3, 4. In session 2, the touch input was detected to identify a frustrated user in operation 3756b. In session 3, the touch input characteristics were processed to identify a happy user in operation 3756c. In session 4, the touch input characteristics were processed to identify a mad user in operation 3756d. In various embodiments, the touch characteristics can be blended and analyzed in conjunction with voice input. For instance, the touch input of being rushed can be contrasted with the voice input which may have detected that the user is frustrated. In some embodiments, a weighting scheme can be processed to identify whether to categorize the touch input and voice input as a rushed or frustrated input. If the rushed touch input scores higher than a frustrated voice input, then the rushed mood will be identified and used to identify a vehicle response 3760. Other examples of processing touch characteristics are described in this application, and the examples provided with reference to FIG. 37 should not be limiting to the various identified mental states or user states or mood states that can be identified by way of touch characteristic analysis.

Figure 38:
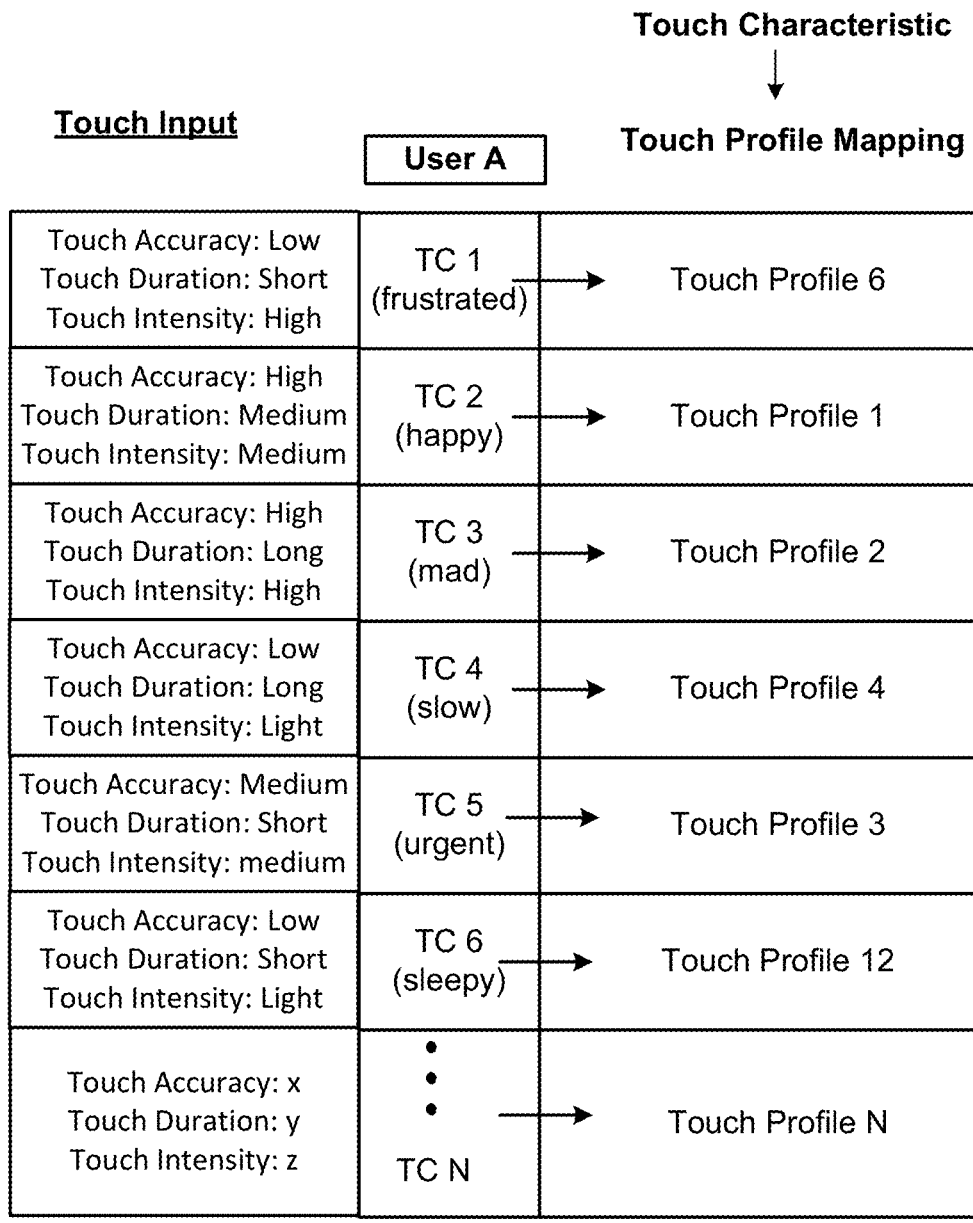
FIG. 38 illustrates an example of processing operations that can be used to map touch characteristics to touch profiles.

FIG. 38 illustrates an example of processing operations that can be used to map touch characteristics to touch profiles. It should be understood that the mapping would be specific to a user, such as user A. Each user that utilizes the system will over time build a user data graph that will be optimized based on learned input settings, which enable more accurate mapping of touch input to specific touch profiles. Over time, certain touch inputs can be mapped to a set of touch profiles, which enable the system to generate a vehicle response that is most specific to that touch input characteristic. As an example only, certain touch inputs can be mapped to touch characteristics (TCs), and the touch characteristics can be assigned specific touch profiles. For example, if it is determined that the touch input is of a sleepy user, which may be providing touch accuracy with very low levels, very short durations, and very light intensities, the touch profile 12 will be utilized for generating a vehicle response.

The vehicle response can be to provide information requested for that touch input. In one embodiment, in addition to providing the liberal response to the touch input, the system can also provide additional information or recommendations based on the detected mood of the user or state of the user. For example, if the user sleepy, in addition to changing the radio station, the system may also recommend to lower the temperature of the vehicle, or may recommend a hotel if the user is far from home, or may recommend more elevated music, or may reduce the temperature of the seat, or may request that the user pullover and rest, or other information that would be beneficial to the user is detected physical or perceived mental state.

On the other hand, if the user's detected to be frustrated, which can be detected by detecting low accuracy for the touch input, a short duration, and a high-intensity, a touch profile 6 can be identified. The touch profile 6 may dictate that the users input be immediately shown to the user or set by a vehicle system. This immediate application of a vehicle response may avoid providing the user with additional extraneous information, recommendations, discounts, or peripheral information due to the users frustrated state of mind that is perceived. As such, the vehicle response is moderated based on the detected perceived mental state of mind, users mood, and generally the processed information regarding the type of touch input provided to some object or thing of the vehicle, while the users driving. It is again mentioned that this processing of touch characteristics can be in addition to the processing performed for voice input (if voice input is also provided).

FIG. 39 illustrates an example of various touch inputs that identify touch characteristics of happy, urgent, and sleepy. As mentioned above, the touch characteristics can be identified based on several variables of analysis, such as accuracy level, duration level, intensity level, and other metrics. Once the touch profile has been identified, the vehicle response is processed. Similar to the operations performed in FIG. 27 as it relates to voice input, the vehicle response can be moderated based on the detected touch profile. Again, if the vehicle user is detected to be sleepy and has a touch characteristic 6, which is mapped to sleepy, the touch profile will allow the vehicle to provide a vehicle response that includes additional information. This additional information may be recommendations to avoid accidents, reduce distractive driving, and improve the overall safety of the driver.

Figure 40:
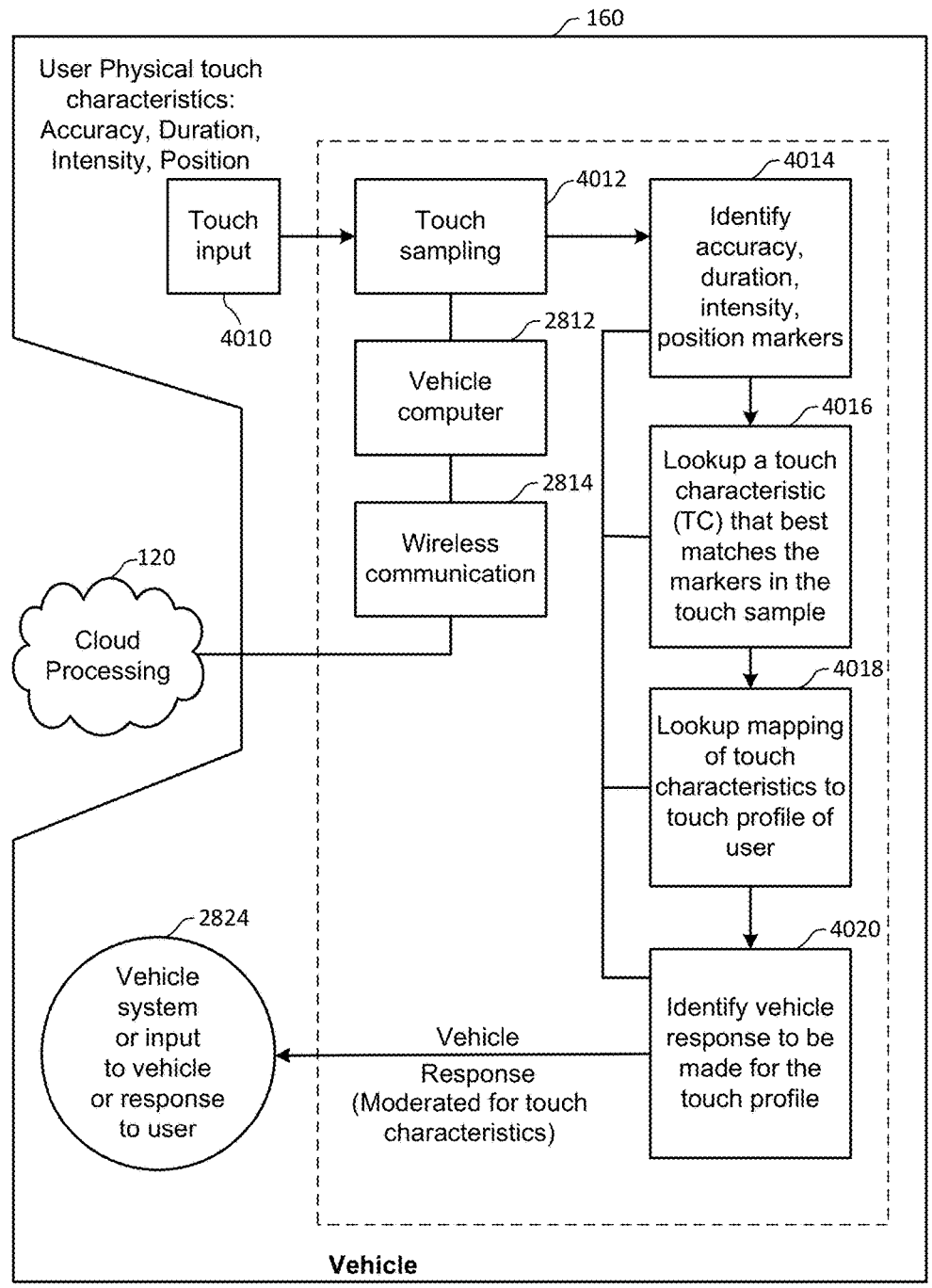
FIG. 40 illustrates an example of a vehicle performing analysis of touch input 4010, and providing a vehicle response.

FIG. 40 illustrates an example of a vehicle performing analysis of touch input 4010, and providing a vehicle response 2824. As shown, the vehicle is in communication with cloud processing 120 via wireless communication 2814. The vehicle computer 2012, in one embodiment, communicates with other computing resources of the vehicle, such as microprocessors, digital signal processors, application specific integrated circuits (ASICs), mechanical systems, motors, communications systems, and other operational systems that can take input and supply an output. In one embodiment, touch sampling 4012 can be performed by the vehicle computer 2012. Touch sampling can include identifying accuracy, duration, intensity, and position markers in operation 4014.

This processing will identify the type of input that the user may be providing with a finger, a hand, a gesture, or an object that is interfaced with a surface, or object of the vehicle. In operation 4016, a touch characteristic is identified the best fits and matches the markers in the touch sample. Based on the touch characteristics in operation 4018, a touch profile is identified. In operation 4020, the vehicle response is identified to be made for the touch profile that was identified. And then in operation 2824, the vehicle system or input to the vehicle or response to the user is performed based on the identified touch input. Generally speaking, the touch input is designed to reply with the intended function of the touch input, and the reply can be moderated based on the detected touch input characteristics.

Figure 41:
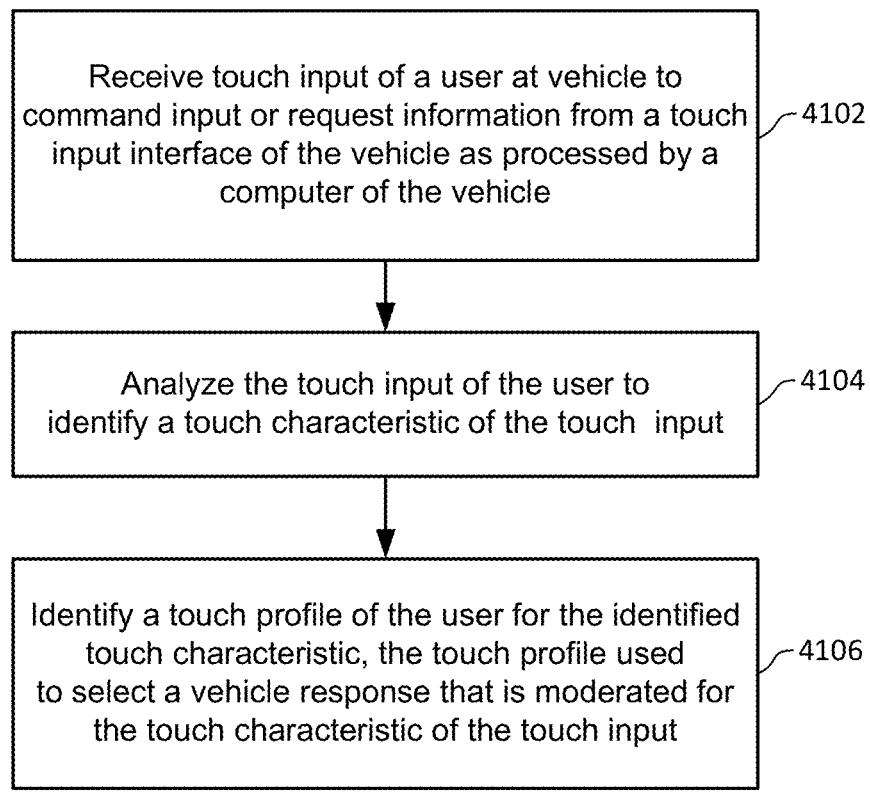
FIG. 41 illustrates an example of method operations that can be performed in order to utilize touch input to identify a type of vehicle response to be performed by the vehicle.

FIG. 41 illustrates an example of method operations that can be performed in order to utilize touch input to identify a type of vehicle response to be performed by the vehicle. In one embodiment, the touch input is received at the vehicle in operation 4102. In this operation, the input is for commanding an input or requesting information from a touch input interface of the vehicle as processed by a computer of the vehicle. In operation 4104, the touch input is analyzed to identify touch characteristics of the touch input. Examples of this analysis have been described above and in other portions of this application. Generally, the analysis will identify or attempt to characterize the mood or perceived mental state of the user, so as to modify or moderate the response performed by the vehicle in response to the touch input.

In operation 4106, the touch profile is identified for the user for the identified touch characteristic. The touch profile is used to select a vehicle response that is moderated for the touch characteristics of the touch input. In one embodiment, a database is used to map or contain mappings that can be used to as mentioned above, and this processing can include utilizing a learning algorithm that can identify the types of inputs and vehicle responses that best suits of the vehicle touch inputs. Over time, the accuracy of the touch input and vehicle response is improved, by adjusting the vehicle responses based on actual received user replies or actions based on the provided inputs or recommendations that are generated.

Figure 42:
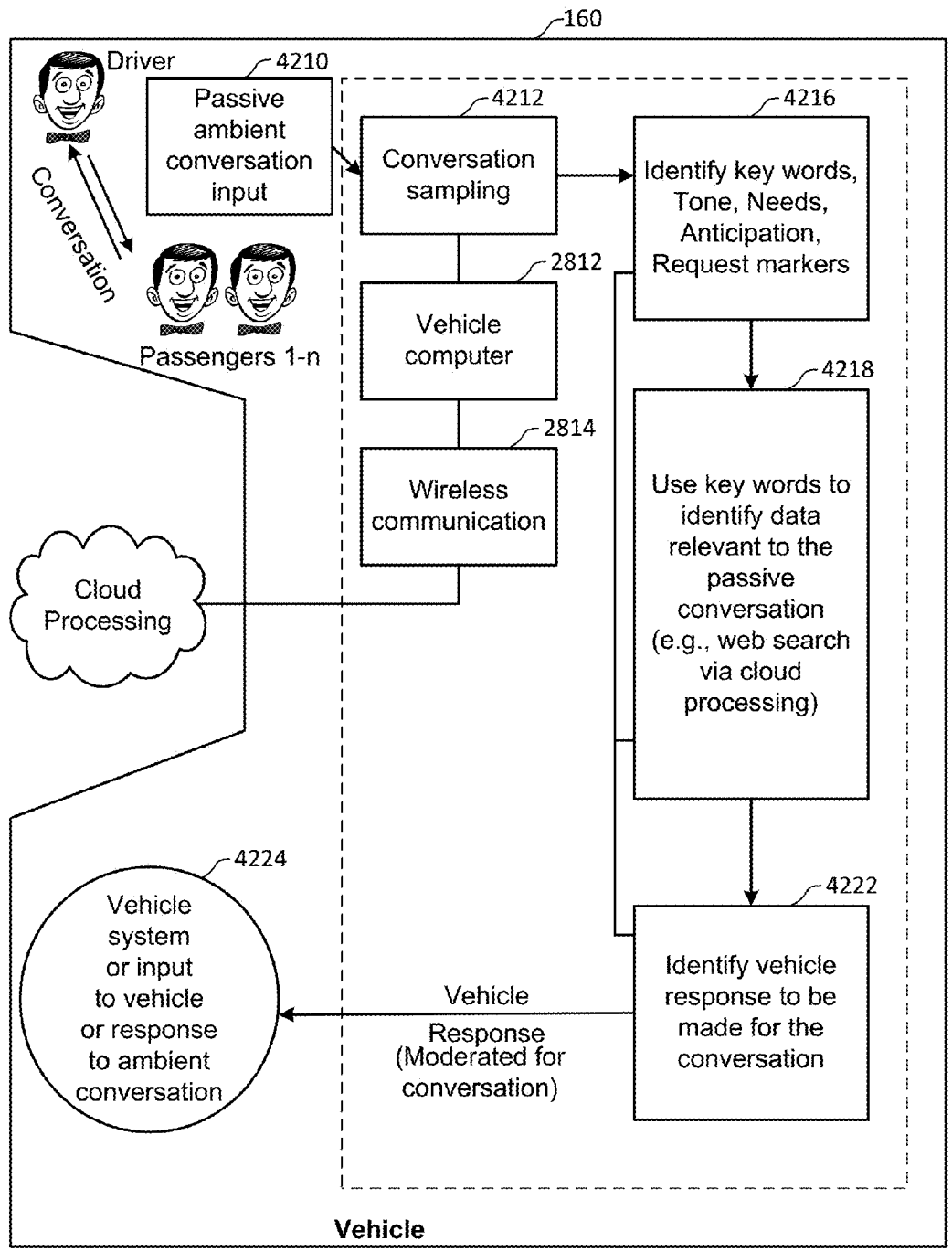
FIG. 42 illustrates an example of vehicle processing that can be performed to identify passive ambient conversational inputs, in accordance with one embodiment.

FIG. 42 illustrates an example of vehicle processing that can be performed to identify passive ambient conversational inputs 4210, in accordance with one embodiment. In this example, a driver may be having a passive conversation with one or more passengers in the vehicle. If the vehicle is set to a passive audio sensing mode, the microphones of the vehicle can be utilized to listen to passive conversations occurring in the vehicle. As mentioned above, one or more microphones may be distributed or integrated on different surfaces within the vehicle. The microphones can isolate and locate the specific users in the vehicle, by way of where they are seated and the location from which voice is emanating. This allows the system to identify when specific passengers are speaking, such as the passenger seat, the rear left seat, the rear right seat, the rear middle seat, or the driver himself or herself.

In this passive mode, the conversational audio input can be analyzed by conversational sampling 4212, which can be executed by the vehicle computer 2812, and other computing resources within the vehicle electronics. In some embodiments, the vehicle electronics can include audio sampling circuits that can convert audio conversations to text, and filtering circuits to remove ambient noise or other noise associated with the vehicle. In some embodiments, filtering circuits can be used to filter out specific conversations or conversations that are not central to the main conversation. For instance, if the drivers having a conversation with the passenger, a 3rd conversation between two rear-seat passengers can be filtered out, as being less important. In other embodiments, the rear conversation can be considered more important than the conversation between the passenger and the driver. In still other embodiments, multiple conversations can be analyzed to identify which conversation is providing more contextual information that may be relevant to the current use of the vehicle.

In one embodiment, the conversational sampling performed by operation 4212, is performed with the assistance of operation 4216 which can identify keywords, the tones, the needs, the anticipation of specific requirements, and markers in the conversations. For example, if it is lunchtime and the passengers are discussing a place to eat, the vehicle can provide recommendations based on the contextual discussion occurring in the vehicle. In one embodiment, in operation 4218, the keywords that are found are used to identify data relevant to the conversation. In operation 4222, the system will identify a vehicle response to be made for the conversation. In operation 4224, the vehicle system or input to the vehicle or response to ambient conversation is processed. For example, if the users were discussing a place to go out to lunch, the vehicle system may present options on the display screen that may be relevant to the conversation that is occurring. In one embodiment, the conversation that is being passively listened to by the system can be only temporarily cached and automatically deleted. In one embodiment, the system will allow the user to identify a period of time during which the conversation data will be saved, such as cached in history. In some embodiments, the system can be set so that no saving occurs at any passive conversations, and the data is simply used to provide real-time recommendations to the user.

Figure 43:
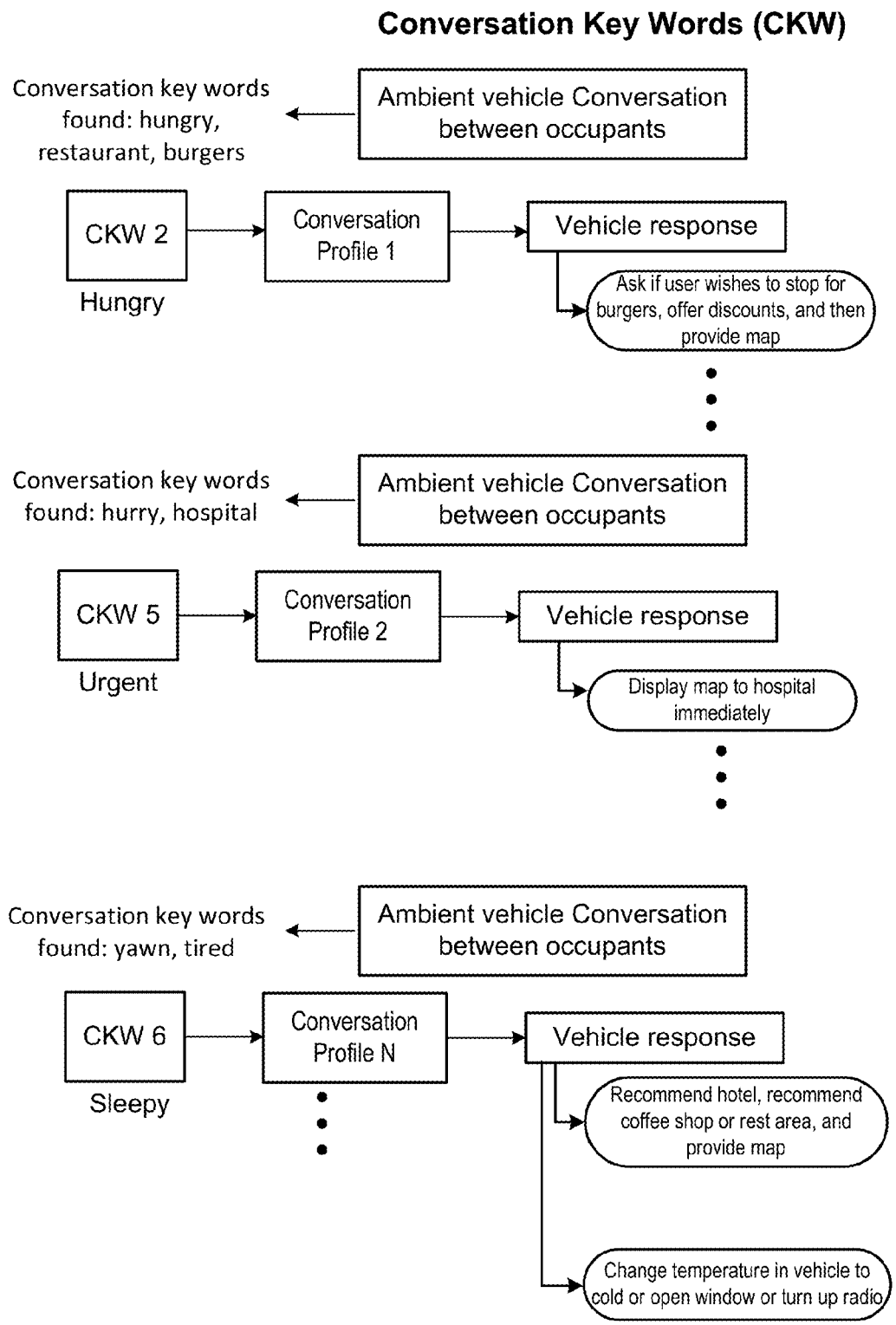
FIG. 43 illustrates an example of using conversation keywords (CKW) to identify the types of vehicle responses that will be provided to the user.

FIG. 43 illustrates an example of using conversation keywords (CKW) to identify the types of vehicle responses that will be provided to the user. For example, if the conversation keywords included the words hungry, restaurant, burgers, then the primary keywords can be identified as hungry. The conversation profile can then be used to set a vehicle response. The vehicle response can be having the vehicle ask the user if they wish to stop for burgers, offer discounts, and then provide a map. In the same manner, if in the conversation the keywords are hurry, hospital, then the conversation sample will provide and display a map to the hospital immediately. Similarly, if the conversation keywords are yawn, tired, bed, then the vehicle response can provide certain recommendations. The recommendations can be to provide information regarding hotels, coffee shops, rest areas, and maps. In some embodiments, the vehicle response can also provide additional settings are information, such as changing the temperature the vehicle to cold, opening the window, turning up the radio, or recommending that the user perform any of these functions due to the detected sleeping nature of the vehicle driver.

In one embodiment, at a remote location, a user is able to access a user interface for an application, which provides users access to user accounts. A user account can be for a user and the user can add one or more vehicles, objects, data or appliances for remote reporting, viewing and control. In one embodiment, a user is an owner or user of a vehicle. The user can register the vehicle with a remote service.

The remote service can be accessed over the Internet, such as via a website or application of a portable device. The remote service can provide a multitude of cloud services for the user, such as remote control features, remote viewing services, remote alarm controls, remote camera activation, remote audio/video recording of the vehicle (i.e., areas around the vehicle and inside the vehicle). In one embodiment, the vehicle is able to connect to the Internet (e.g., when the vehicle engine is off, on, and/or is occupied or un-occupied) to allow a user, via a remote cloud service, to access features of the vehicle. The vehicle can be accessed when running, when parked, when stopped, when moving, etc. The vehicle and its audio recording devices and video cameras can be accessed from remote locations, to allow users to remotely communicate with the vehicle or with people riding or residing inside the vehicle.

The remote communication can also allow a person to communicate remotely with people standing outside (or inside) of a vehicle. For instance, if a user is accessing his or her vehicle from a remote location, cameras installed in and/or on the vehicle allow the remote user to see a person standing proximate to the vehicle. The remote user can then communicate with a person standing proximate to the vehicle using microphones and speakers of the vehicle.

In some embodiments described herein, vehicles, structures and objects may include circuitry and communication logic to enable communication with a cloud processing system over the Internet.

In one embodiment, the services provided by the electronic systems of a vehicle can include services that access the various components or subsystems of a vehicle, such as door locks, service histories, user profiles, audio settings, entertainment settings, mapping functions, communications systems, telecommunication synchronization systems, speakers, heating and cooling functions, auto-engine start/shut-off remotely via smart devices, remote heating/cooling initiation, remote face-to-face conferencing, etc. The electronic systems within a vehicle can also provide a user interface, such as a graphical user interface. The graphical user interface can include a plurality of buttons, controls and transceivers to receive input from a user. The input from a user can also be provided by voice input, facial recognition, eye-retina scans, fingerprint scans, a combination of biometrics, or via a capacitive or regular touchscreen contained or displayed within the vehicle, the vehicle's glass, doors, dashboard, etc.

In one embodiment, accuracy of input, whether it be voice, touch, touch and voice, etc., may be measured. By way of example, if the input is touch on an input screen, surface, glass, monitor, display, etc., (e.g., by a finger or fingers of a user), accuracy of the input can be quantified. In one embodiment, a determination can be made if the touch coordinates (e.g., finger contact area(s)) are no more than 10% away from icon. In another embodiment, a determination can be made if the touch coordinates are between 10% and 25% away from icon, or touch coordinates are greater than 25% away from icon. The closer the touch coordinates are, the accuracy can be calculated to higher levels of certainty.

In another embodiment, touch duration of an input touch by one or more fingers can be measured. For example, measurements can be made to determine if the touch duration is short, e.g., less than 1 second, average, e.g., about 1-1.5 seconds, or long, e.g., more than 1.5 seconds. Measurement of time duration of an input can be characterized to determine a person's mood and/or urgency. For example, if the user is rushed, the user may press on a selection quickly, whereas persons that may be relaxed may press on selections, icons, buttons, surfaces, etc., with more duration or latency.

In still another embodiment, touch intensity (using pressure sensors or capacitive area pressed), may be used. These sensors, which may be integrated with the input surface, display surface, glass surface, fabric surface, or other vehicle input surface, can be configured to sense an intensity of pressure. By way of example, certain forces may be pre-defined to be light pressure, average pressure, hard pressure, etc. Calibration by users may determine what type of an input is, based on a user profile. For instance, the user profile for a large man may identify a pressure of 7, between 1 (low pressure)-10 (very high pressure), to be a light pressure. For a smaller person, a pressure of 2 can be determined to be a light pressure. In the same manner, other levels of pressure between very soft and very hard can be determined based on the individual user and data that can be saved to the user profile, for example. In some embodiments, pressures by particular uses can be learned, to identify a pattern of what it means to be soft, hard, medium, etc., and this learned data can be saved to a user's profile. As noted above, the updates to a user's profile, which may be learned over time, may be updated to a user account of the user on cloud processing servers.

In yet another embodiment, a hybrid approach for determining types of input can be processed. By way of example, some touch inputs that occur when voice inputs are made can be matched or correlated to identify a person's mood. Based on the person's mood, which in one embodiment can be correlated using multiple sensed inputs (e.g., voice, touch, touch pressure, touch duration, and combinations thereof), the vehicle response can be moderated to fit or correspond to how the user wishes the vehicle to respond. As discussed in various examples in this application, the vehicle response is configured to learn what is appropriate to a particular user, based on how the user interacts with the vehicle. For instance, if the user is looking for fuel, and the user is stressed, the user is likely to want to hear about promotions. If the user appears sleepy, the vehicle response should act to assist the driver to be more awake, e.g., such as automatically changing the internal cabin temperature to a colder state, lower a window, raise a volume on an entertainment system, and even suggest a stop or find a local hotel if the user is believed to be far from home. In some cases, a touch profile alone can be used in a similar manner as a voice profile, to identify a user's mood, and thus adjust or modify a vehicle response that best matches the user. Based on the user's response to the vehicle response or a number of vehicle responses over time, the vehicle response can be adjusted further based on learned inputs or response by the user. The learning thus allows the vehicle response to be refined and further customized to the user. In one embodiment, the profile of the user, which is part of the user account managed by the cloud processing, will continually update settings and responses, so that a more custom and accurate response can be provided to each user.

In one embodiment, users are also provided with an ability to manually calibrate or train a vehicle system, and settings, which are managed by the vehicle system and the cloud processing system. In one embodiment, the vehicle 160 can ask a user to provide voice samples, touch samples, input samples, etc., to qualify or train the electronics of the vehicle regarding one or more moods of the user. For instance, the vehicle electronics can be programmed to run a calibration for each user, such that each user is asked to repeat several phrases and to repeat them using an angry tone, a rushed tone, a happy tone, an annoyed tone, a relaxed tone, etc. Based on these responses, the vehicle electronics can analyze the input to generate audio signatures for the user that represent tone identifiers. The tone identifiers are associated with voice profiles that can be initially mapped to particular vehicle responses, based on the known or determined or best fit mood found from later voice input. Over time, the vehicle electronics and/or the cloud processing system can refine the mappings, based on actual use. For example, if the user did not provide an accurate enough sample of being angry, later inputs with an angry tone can be trained. In one example, responses by a user to a vehicle response, can determine if the vehicle indeed identified the correct mood. If the wrong mood was identified, the vehicle and/or the cloud processing can refine the mappings.

In some embodiments, the system can be set by settings or input to ignore certain voice inputs. For instance, the user may be provided with preferences that would allow a user to choose what functions should react to tone and which not. For instance, react to tone for altering visuals on dash but ignore tone for showing restaurants.

In still another embodiment, the vehicle may be set to operate in various modes. One mode, e.g., a passive mode, may be to allow the user to listen to passive voice discussions in a vehicle. These voices discussions may be saved locally for a short duration to enable processing and then discarded. The vehicle may have an input setting to clear all past voice discussions or history of voice discussions. In some embodiments, passive mode may be disabled. The passive mode may, for example, enable the vehicle to listen to conversations happening in the vehicle. The vehicle can parse the discussions to identify semantics, context, and or specific words or phrases. In one particular example, two people in the vehicle may be discussion where they want to go eat for lunch, e.g., "where do you want to eat? I don't care, where do you want to eat? I don't know, just pick something!!, ok steak." If the vehicle is operating in passive mode, a portion of the display screen may be configured to automatically find nearby steak houses, find ratings, get driving directions, etc.

In one embodiment, vehicles can maintain information regarding where they are, where they are heading and their destination maintained which is maintained by GPS and navigation systems on board. The information collected and maintained by every vehicle may be mutually exclusive, meaning that each individual vehicle is aware of its own heading, rate of speed and current location. This information, in one embodiment is crowd sourced and/or crowd shared/consumed for use in for accident avoidance or other communication. By networking vehicles within a certain radius together, all individually location-aware vehicles become aware of all other vehicles in their sphere of influence. Vehicles may network with vehicles in their range using wireless communication systems such as but not limited to Wi-Fi, Wi-Gig LTE, cellular, radio, near field communication or other methods.

In one embodiment, the communications of the vehicle and electronics of the vehicle will enable direct communication with a user of the vehicle. The user of the vehicle can include, for instance, the owner of the vehicle, a driver of the vehicle, or any third party having access to the vehicle (either to drive the vehicle, to monitor the vehicle remotely, etc.)

The access to the data can also be encrypted to prevent unauthorized access to the data. GPS and mapping services can also be in communication with the cloud processing 120 provide data concerning the locations of the vehicles and activities that occurred to the vehicles when at particular locations. The cloud processing 120 can be access by the vehicles themselves using their electronics and communications, via mobile devices, from home, from work, etc.

In some embodiments, the vehicles may establish peer-to-peer links to facilitate fast transfer of data. In other embodiments, vehicles may link to each other using pairing algorithms that allow the vehicles to exchange data using WiFi, Bluetooth, near field communication (NFC), or some other short range communication protocol.

A user's APP homepage may also include dynamically updating sections in which the most relevant information at a given time may be displayed or surfaced to a user. If a user has parked in a certain parking area, he or she may want to monitor metrics related to incidents that may have occurred to his or her vehicle, vehicles around his or her vehicle, any dynamically received alerts, as well as precaution levels.

Additionally, a user may choose to configure his or her APP homepage to display the most pertinent audio and video feeds to their needs.

In one embodiment, the vehicles can communicate directly with each other via a temporary pairing process. The temporary pairing process can be automatically enabled when vehicles become too close to each other, for example. When this happens, local communication between the vehicles, such as a peer-to-peer connection, Wi-Fi connection, NFC connection, or Bluetooth connection can be established to enable the vehicles to share information concerning their proximity to one another.

This local communication will enable one or both vehicles to take correction actions or alert a driver to change course or trigger automatic collision prevention measures (e.g., more aggressive notifications to one or both operators, slow the speed of one or more vehicles, change the driving direction of one or more vehicles, etc.). Once the close proximity communication occurs and some corrective action is made, the data regarding the occurrence and the actions taken can be communicated to the cloud system for storage. The information can then be viewed by a registered user having access to an account for the vehicle(s).

The various embodiments may be embodied in computer readable media, which is saved in storage. The storage may be saved on cloud storage, data centers, or the like, which are accessible over the Internet. The access may be wired or wireless. In vehicles, the connection to the Internet may be wireless, and the connection can be continuous or non-continuous depending connection. Code on the vehicle electrons can execute at least some of the method operations when not connected and other operations are executed jointly between vehicle electronics 161 (e.g., memory, code and processors of a vehicle) and cloud processing, which may implement one or more servers, either virtual or not.

It will be obvious, however, to one skilled in the art, that the present invention may be practiced without some or all of these specific details. In other instances, well known process operations have not been described in detail in order not to unnecessarily obscure the present invention. Some embodiments are defined by combining features from embodiments defined throughout the present application and materials incorporated by reference.

In some implementations, the learning and predicting embodiments may utilize learning and prediction algorithms that are used in machine learning. In one embodiment, certain algorithms may look to patterns of input, inputs to certain user interfaces, inputs that can be identified to biometric patterns, inputs for neural network processing, inputs for machine learning (e.g., identifying relationships between inputs, and filtering based on geo-location and/or vehicle state, in real-time), logic for identifying or recommending a result or a next input, a next screen, a suggested input, suggested data that would be relevant for a particular time, geo-location, state of a vehicle, and/or combinations thereof. In one embodiment, use of machine learning enables the vehicle to learn what is needed by the user, at a particular time, in view of one or more operating/status state of the vehicle, in view of one or more state of one or more sensors of the vehicle. Thus, one or more inputs or data presented to the user may be provided without an explicit input, request or programming by a user at that time. In one embodiment, reference is made to learning and prediction, wherein both terms may be referencing the same or similar function, e.g., looking at user interactions, preferences, tendencies, etc., in order to identify or select a particular type of data that may be useful for the user based on the learning or prediction. In other embodiments, learning may be defined closer to the traditional sense of machine learning, pattern learning, historical data input analysis, etc., while prediction is may be defined closer to the traditional sense of identifying some data, which is predicted to be relevant based on analysis of the context in which the data is predicted. In still other embodiments, prediction and learning may be hybrids, used in conjunction for providing contextually relevant supplemental content to a vehicle, user account, user device, or some target associated with a user account or profile.

Overtime, machine learning can be used to reinforce learned behavior, which can provide weighting to certain inputs. For instance, the more times a user turns on the windshield wipers when it is raining, and within two minutes of turning on the car, may signal that this patterns is likely to happen again. In another example, if a user stops to charge his vehicle at a particular charge station, which is 20 miles from his home, repeatedly on Tuesdays, at 6 pm, when nobody is a passenger in the vehicle, and the vehicle had less than 5% charge, may be used as a strong pattern that this may occur again in the future. This data, combined with other data, may be used to recommend data regarding the charge station in advance, so that the user need no look up the charge station to reserve a spot, or the like. It should be understood that these are just simplified examples to convey examples of recommendations which may be based on some learning, preferences or pattern analysis, or likelihoods.

Thus, context awareness across multiple dimensions will allow for more accurate predictions, learning (e.g., by building and refining behavior models), and surfacing/suggesting recommendations of supplemental content or settings, when it is most probable or likely or useful, or needed by the user or vehicle and user, or relevant at a current or proximate or near or destination geo-location.

For purposes of providing example ways of processing learning algorithms, machine learning methods, predictions, data analysis, and the like, without limitations to any specifically claimed embodiment, reference may be made to a book entitled "Introduction to Machine Learning", Second Edition, by Ethem Alpaydin, The MIT Press (ISBN 978-0-262-01243-0), Cambridge, Mass., London England (2010), which is herein incorporated by reference for all purposes. In one embodiment, various methods for detecting emotion may use some of the technical computations described in one or more of the following papers, which are incorporated herein by reference. One example is described in a paper entitled "Emotion Recognition from Facial Expressions using Multilevel HMM" by Ira Cohen, et al., published by The University of Illinois at Urbana-Champaign, published in the year 2000. Another example is described in a paper entitled "Human Emotion Recognition System," by Dilbag Singh, from the Computer Science and Engineering Dept. Guru Nanak Dev University Amritsar (Punjab) India, published in I.J. Image, Graphics and Signaling Processing, 2012, 8, 50-56. Another example is described in a paper entitled "Recognizing emotion in speech using neural networks", by Keshi Dai, et al., from College of Computer and Information Science, Northeastern University, Boston, Mass., published by Telehealth/AT '08 Proceedings of the IASTED International Conference on Telehealth/Assistive Technologies, 2008, Pages 31-36. Another example is described in a paper entitled "Speech Emotion Recognition Using Deep Neural Network and Extreme Learning Machine" by Kun Han et al., Department of Computer Science and Engineering, The Ohio State University, Columbus, Ohio, and Microsoft Research, published by Interspeech 2014. Yet another example is described in a paper entitled "Robust Recognition of Emotion from Speech," by Mohammed E. Hogue, from the Department of Electrical and Computer Engineering, The University of Memphis, published on 2006. In one embodiment, emotion may be determined by also taking into account gender. Another example includes a paper entitled "Detecting Emotions in Conversations Between Driver and In-Car Information Systems," by Christian M. Jones, et al. School of Mathematical and Computer Sciences, Heriot-Watt University, Edinburgh, UK, and Department of Communications, Sanford University, C A, 2005. One other example is a paper describing detection of emotion is entitled "Emotion and Gender Recognition of Speech Signals Using SVM" by S. Sravan Kumar et al., published in the International Journal of Engineering Science and Innovative Technology, Vol. 4, Issue 3, May 2015. All of the papers and articles identified in this disclosure are incorporated by reference for all purposes.

In one embodiment, a display of a vehicle can include one or more displays. For example, a display screen of the vehicle may include any one or more of a main dashboard display, or a center console display, or a combined main dashboard and center console display, or a surface display, or a glass surface, or a windshield display, or a window display, or a touch surface display, or a headrest display, or a movable display, or a wireless display, or a wire-connected display, or combinations thereof.

In one embodiment, biometrics may be associated to the user account. The biometrics may be used to monitor use of the vehicle and determine if the custom user interfaces is to be enabled, or if a guest custom user interface is to be enabled, or if public custom user interface is to be enabled, or identify an interaction mode. The user account may include profile data defining when particular custom user interfaces are to be enabled or interactions modes are to be used. The biometrics may include one or more of image data of a driver's face, a passenger's face, a finger print, a retina scan, a signature, a gesture, a user input, a login, a key, a paring device, or combinations of two or more thereof.

The various embodiments defined herein may define individual implementations or can define implementations that rely on combinations of one or more of the defined embodiments. Further, embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the description and claims.

What is claimed is:

1. A method for determining an emotion of a human driver of a vehicle and using the emotion for generating a vehicle response, comprising,
    capturing, by a camera of the vehicle, a face of the human driver, the capturing is configured to capture a plurality of images over a period of time, the plurality of images being analyzed to identify a facial expression and changes in the facial expression of the human driver over the period of time;
    capturing, by a microphone of the vehicle, voice input of the human driver, the voice input is captured over the period of time, the voice input being analyzed to identify a voice profile and changes in the voice profile of the human driver over the period of time;
    processing, by a processor of the vehicle, a combination of the facial expression and the voice profile captured during the period of time to predict the emotion of the human driver; and
    generating the vehicle response that is responsive to the emotion of the human driver, the vehicle response is configured to make at least one adjustment to a setting of the vehicle, the adjustment is selected based on the emotion of the human driver.

2. The method of claim 1, wherein combining data obtained from facial expressions and the voice profile improve the prediction of the emotion of the human driver and wherein prediction of the emotion is increased by capturing touch or gesture characteristic of the human driver when interfacing with a graphical user interface of the vehicle or systems of the vehicle.

3. The method of claim 1, wherein facial characteristics of the human driver is are related to a plurality of facial expressions that have been previously associated with specific emotions, the facial characteristics include one or more of placement of the human driver's mouth, a way eyes are opened or closed by the human driver, cheekbone characteristics of the human driver, or biometric determining of features of the human driver, or a combination of two or more thereof.

4. The method of claim 1, wherein processing the voice profile includes processing an audio sample of the voice input and identifying frequency and/or magnitude characteristics in the audio sample, the voice profile is associated with a tone of voice that is correlated to a possible emotion among a plurality of emotions.

5. The method of claim 1, wherein facial characteristics of the human driver is are related to a plurality of facial expressions that have been previously associated with specific emotions, the facial characteristics include one or more of placement of the human driver's mouth, a way eyes are opened or closed by the human driver, cheekbone characteristics of the human driver, or biometric determining of features of the human driver, or a combination of two or more thereof and the processing the voice profile includes processing an audio sample of the voice input and identifying frequency and/or magnitude characteristics in the audio sample, the voice profile is associated with a tone of voice that is correlated to a possible emotion among a plurality of emotions.

6. The method of claim 5, wherein the plurality of facial expressions are associated to a plurality of templates of facial characteristics, the plurality of templates being generated during a training or calibration session or generated over time based on learned facial characteristics, wherein learned facial characteristics are identified using one or more other detected physical or physiological conditions.

7. The method of claim 6, wherein said physiological conditions include one or more of heart rate, or body heat, or blood pressure, or skin temperature, or skin galvanic resistance, or temperature of skin, or blood rush to a face of the human driver, or eye iris or retina changes, or odor/scent changes, or combinations of two or more thereof, and the physical conditions include one or more of a changes in the face of the human driver, or changes in a typing rhythm, or changes in gait, or changes in voice, changes in voice tone, or voice inflections, or voice speed or slowness, or sharp voice harmonics, or voice identifiers or patterns, or elevated heat patterns, or palm veins, or eye iris or retina changes, heat rate changes, or eye gaze patterns or motions, or combinations of two or more thereof.

8. The method of claim 1, wherein a user account with a profile for the human driver of the vehicle is provided, the profile includes a plurality of learned facial expressions and learned voice profiles that are indicative of an emotion, the learned plurality of facial expressions and learned voice profiles are updated from time to time to improve the prediction of the emotion of the human driver, wherein the user profile is synchronized from time to time with a server that manages the user account for the human driver.

9. The method of claim 1, wherein the vehicle response to the emotion includes one of waking up the human driver with a sound or air if the emotion is a sleepy emotion, generating warnings and/or signals to alert the human driver, generating recommendations to calm the human driver from an angry emotion or agitated emotion, sending a notification to a third party indicating that the human driver is tired, generating a notification to the human driver suggesting a temperature change, or generating an automatic temperature change based on the emotion, recommending the human driver stop driving when tired, reducing recommendations when the human driver when the predicted emotion is a rushed emotion, changing lighting of the vehicle automatically, changing temperature of the vehicle automatically, turn up or down a volume of music, adjust a seat position, or a combination of two or more thereof, and wherein at least one of said vehicle responses are predefined to reduce distracted driving or increase alertness of said human driver.

10. The method of claim 1, wherein the vehicle response is further based on current use of the vehicle, and use of the vehicle includes one or more of geolocation of the vehicle, speed of the vehicle, direction of the vehicle, a route of the vehicle, a time of day, occupants in the vehicle, historical use of the vehicle, online data of a user accessible to the vehicle or server, or combinations of two or more thereof, and the vehicle response to the emotion includes one of waking up the human driver with a sound or air if the emotion is a sleepy emotion, generating warnings and/or signals to alert the human driver, generating recommendations to calm the human driver from an angry emotion or agitated emotion, sending a notification to a third party indicating that the human driver is tired, generating a notification to the human driver suggesting a temperature change, or generating an automatic temperature change based on the emotion, recommending the human driver stop driving when tired, reducing recommendations when the human driver when the predicted emotion is a rushed emotion, or a combination of two or more thereof.

11. The method of claim 1, wherein a user account with a profile for the human driver of the vehicle is provided, wherein the user account of the human driver is identified based on processing of credential data obtained from the human driver, the credential data used by electronics of the vehicle to associated the human driver to the user account and to the profile, the electronics of the vehicle configured to interface over a network with a server for use of the profile and associated updates to the profile as made via use of the vehicle or updates associated with learned behavior.

12. The method of claim 1, wherein the emotion includes one or more of a normal emotion, a frustrated emotion, an agitated emotion, an upset emotion, a hurried emotion, an urgency emotion, a rushed emotion, a stressed emotion, a calm emotion, a passive emotion, a sleepy emotion, a happy emotion, or an excited emotion, or combinations of two or more thereof, and said emotion is configured to change over time based on said captured face and voice input of the human driver.

13. The method of claim 1, wherein the processing of the voice input includes identifying a dialect of the human driver, the dialect includes one or more of a language dialect, a geographic region dialect, an age dialect, or combinations of two or more thereof.

14. The method of claim 1, wherein learned behavior of the human driver is generated based on express inputs by the human driver and/or learned behavior that is inferred from inputs and/or settings made over time to a vehicle when a user account of the human driver was active on the vehicle,
wherein a server that communicates wirelessly with the vehicle from time to time stores at least some of the inputs and/or settings made to the vehicle in a database for processing said learned behavior, said processing is configured to use machine learning.

15. The method of claim 1, wherein physical characteristic of the human driver are detected using one or more sensors or devices of the vehicle or devices worn by the user of the vehicle, the physical characteristic includes one or more of heart rate of the human driver, motions of a body of the human driver, eye gaze patterns of the human driver, body heat of the human driver, stress indicators of the human driver, voice micro tremors of the human driver, voice inflections or pitches of the human driver, emotional sounds of the human driver, skin temperature of the human driver, changes in face heat of the human driver, slurred speech of the human driver, camera captured facial expressions of the human driver, touch patterns of the human driver, retina scan sensing of the human driver, gesture detection of the human driver, or a combination of two or more thereof.

16. The method of claim 1, further comprising,
executing a machine learning algorithm to process a history of inputs received from the vehicle for the human driver when using vehicle via a profile of a user account, the machine learning algorithm is used to identify patterns in inputs made by the human driver based on a context of use of the vehicle, the patterns being used to predict use patterns of the vehicle by the human driver and moderate at least one aspect of the vehicle response that is responsive to the predicted emotion;

wherein the context of use of the vehicle includes identifying geolocation data of the vehicle and inputs or actions made that correspond to said geolocation data; and capturing, via the microphone, a conversation between the human driver of the vehicle and a passenger of the vehicle, the conversation being analyzed to provide recommendations.

\* \* \* \* \*